United States Patent
Yairi et al.

(10) Patent No.: US 9,495,055 B2
(45) Date of Patent: Nov. 15, 2016

(54) USER INTERFACE AND METHODS

(71) Applicant: Tactus Technology, Inc., Fremont, CA (US)

(72) Inventors: Micah B. Yairi, Fremont, CA (US); Todd A. Culver, Fremont, CA (US); Craig M. Ciesla, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 0 days.

(21) Appl. No.: 14/711,558

(22) Filed: May 13, 2015

(65) Prior Publication Data

US 2015/0242020 A1  Aug. 27, 2015

Related U.S. Application Data

(63) Continuation of application No. 13/896,090, filed on May 16, 2013, now Pat. No. 9,063,627, and a
(Continued)

(51) Int. Cl.
*G06F 3/044* (2006.01)
*G06F 3/0489* (2013.01)
(Continued)

(52) U.S. Cl.
CPC ............ *G06F 3/044* (2013.01); *G06F 3/0202* (2013.01); *G06F 3/03547* (2013.01);
(Continued)

(58) Field of Classification Search
CPC ................ G06F 3/04895; G06F 3/0202; G06F 3/044; G06F 3/04886; G06F 3/03547; G06F 2203/04809
See application file for complete search history.

(56) References Cited

U.S. PATENT DOCUMENTS 2,885,967 A   5/1959   Vogel et al.
3,034,628 A   5/1962   Wadey
(Continued)

FOREIGN PATENT DOCUMENTS

CN   1260525 A   7/2000
CN   1530818 A   9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Patrick F Marinelli
(74) *Attorney, Agent, or Firm* — Jeffrey Schox; Padowithz Alce

(57) ABSTRACT

One variation of a method for controlling a dynamic tactile user interface includes: sensing a capacitance value across a portion of a cavity, a tactile layer defining a deformable region and a peripheral region, the peripheral region adjacent the deformable region, and the deformable region cooperating with the substrate to define the cavity; estimating a vertical position of the tactile surface at the deformable region according to the sensed capacitance value across the portion of the cavity; manipulating a fluid pressure within the cavity to modify a vertical position of the tactile surface at the deformable region according to a difference between the estimated vertical position of the tactile surface at the deformable region and a target vertical position of the tactile surface at the deformable region; and sensing an input on the tactile surface according to a change in capacitance value across the portion of the cavity.

16 Claims, 20 Drawing Sheets

Related U.S. Application Data continuation-in-part of application No. 13/456,010, filed on Apr. 25, 2012, now Pat. No. 8,947,383, which is a continuation-in-part of application No. 12/497,622, filed on Jul. 3, 2009, now Pat. No. 8,179,375, which is a continuation-in-part of application No. 12/319,334, filed on Jan. 5, 2009, now Pat. No. 8,154,527, which is a continuation-in-part of application No. 11/969,848, filed on Jan. 4, 2008, now Pat. No. 8,547,339.

(60) Provisional application No. 61/648,054, filed on May 16, 2012, provisional application No. 61/679,214, filed on Aug. 3, 2012.

(51) Int. Cl.
    *G06F 3/02*      (2006.01)
    *G06F 3/0488*    (2013.01)
    *G06F 3/0354*    (2013.01)
    *G06F 3/041*     (2006.01)

(52) U.S. Cl.
    CPC ......... *G06F 3/0416* (2013.01); *G06F 3/04886* (2013.01); *G06F 3/04895* (2013.01); *G06F 2203/04809* (2013.01)

(56) References Cited

U.S. PATENT DOCUMENTS

| | | | |
|---|---|---|---|
| 3,441,111 | A | 4/1969 | Spalding |
| 3,453,967 | A | 7/1969 | Spurlock et al. |
| 3,490,733 | A | 1/1970 | Jean |
| 3,659,354 | A | 5/1972 | Sutherland |
| 3,759,108 | A | 9/1973 | Borom et al. |
| 3,780,236 | A | 12/1973 | Gross |
| 3,818,487 | A | 6/1974 | Brody et al. |
| 4,109,118 | A | 8/1978 | Kley |
| 4,181,476 | A | 1/1980 | Malbec |
| 4,209,819 | A | 6/1980 | Seignemartin |
| 4,290,343 | A | 9/1981 | Gram |
| 4,307,268 | A | 12/1981 | Harper |
| 4,467,321 | A | 8/1984 | Volnak |
| 4,477,700 | A | 10/1984 | Balash et al. |
| 4,517,421 | A | 5/1985 | Margolin |
| 4,543,000 | A | 9/1985 | Hasenbalg |
| 4,584,625 | A | 4/1986 | Kellogg |
| 4,700,025 | A | 10/1987 | Hatayama et al. |
| 4,743,895 | A | 5/1988 | Alexander |
| 4,772,205 | A | 9/1988 | Chlumsky et al. |
| 4,920,343 | A | 4/1990 | Schwartz |
| 4,940,734 | A | 7/1990 | Ley et al. |
| 5,090,297 | A | 2/1992 | Paynter |
| 5,194,852 | A | 3/1993 | More et al. |
| 5,195,659 | A | 3/1993 | Eiskant |
| 5,212,473 | A | 5/1993 | Louis |
| 5,222,895 | A | 6/1993 | Fricke |
| 5,286,199 | A | 2/1994 | Kipke |
| 5,346,476 | A | 9/1994 | Elson |
| 5,369,228 | A | 11/1994 | Faust |
| 5,412,189 | A | 5/1995 | Cragun |
| 5,459,461 | A | 10/1995 | Crowley et al. |
| 5,470,212 | A | 11/1995 | Pearce |
| 5,488,204 | A | 1/1996 | Mead et al. |
| 5,496,174 | A * | 3/1996 | Garner ................. G09B 21/003 434/113 |
| 5,666,112 | A | 9/1997 | Crowley et al. |
| 5,717,423 | A | 2/1998 | Parker |
| 5,729,222 | A | 3/1998 | Iggulden et al. |
| 5,742,241 | A | 4/1998 | Crowley et al. |
| 5,754,023 | A | 5/1998 | Roston et al. |
| 5,766,013 | A | 6/1998 | Vuyk |
| 5,767,839 | A | 6/1998 | Rosenberg |
| 5,835,080 | A | 11/1998 | Beeteson et al. |
| 5,880,411 | A | 3/1999 | Gillespie et al. |
| 5,889,236 | A | 3/1999 | Gillespie et al. |
| 5,917,906 | A | 6/1999 | Thornton |
| 5,943,043 | A | 8/1999 | Furuhata et al. |
| 5,977,867 | A | 11/1999 | Blouin |
| 5,982,304 | A | 11/1999 | Selker et al. |
| 6,067,116 | A | 5/2000 | Yamano et al. |
| 6,154,198 | A | 11/2000 | Rosenberg |
| 6,154,201 | A | 11/2000 | Levin et al. |
| 6,160,540 | A | 12/2000 | Fishkin et al. |
| 6,169,540 | B1 | 1/2001 | Rosenberg et al. |
| 6,187,398 | B1 | 2/2001 | Eldridge |
| 6,188,391 | B1 | 2/2001 | Seely et al. |
| 6,218,966 | B1 | 4/2001 | Goodwin et al. |
| 6,243,074 | B1 | 6/2001 | Fishkin et al. |
| 6,243,078 | B1 | 6/2001 | Rosenberg |
| 6,268,857 | B1 | 7/2001 | Fishkin et al. |
| 6,271,828 | B1 | 8/2001 | Rosenberg et al. |
| 6,278,441 | B1 | 8/2001 | Gouzman et al. |
| 6,300,937 | B1 | 10/2001 | Rosenberg |
| 6,310,614 | B1 | 10/2001 | Maeda et al. |
| 6,323,846 | B1 | 11/2001 | Westerman et al. |
| 6,337,678 | B1 | 1/2002 | Fish |
| 6,354,839 | B1 | 3/2002 | Schmidt et al. |
| 6,356,259 | B1 | 3/2002 | Maeda et al. |
| 6,359,572 | B1 | 3/2002 | Vale |
| 6,366,272 | B1 | 4/2002 | Rosenberg et al. |
| 6,369,803 | B2 | 4/2002 | Brisebois et al. |
| 6,384,743 | B1 | 5/2002 | Vanderheiden |
| 6,414,671 | B1 | 7/2002 | Gillespie et al. |
| 6,429,846 | B2 | 8/2002 | Rosenberg et al. |
| 6,437,771 | B1 | 8/2002 | Rosenberg et al. |
| 6,462,294 | B2 | 10/2002 | Davidson et al. |
| 6,469,692 | B2 | 10/2002 | Rosenberg |
| 6,486,872 | B2 | 11/2002 | Rosenberg et al. |
| 6,498,353 | B2 | 12/2002 | Nagle et al. |
| 6,501,462 | B1 | 12/2002 | Garner |
| 6,509,892 | B1 | 1/2003 | Cooper et al. |
| 6,529,183 | B1 | 3/2003 | MacLean et al. |
| 6,573,844 | B1 | 6/2003 | Venolia et al. |
| 6,636,202 | B2 | 10/2003 | Ishmael et al. |
| 6,639,581 | B1 | 10/2003 | Moore et al. |
| 6,655,788 | B1 | 12/2003 | Freeman |
| 6,657,614 | B1 | 12/2003 | Ito et al. |
| 6,667,738 | B2 | 12/2003 | Murphy |
| 6,681,031 | B2 | 1/2004 | Cohen et al. |
| 6,683,627 | B1 | 1/2004 | Ullmann et al. |
| 6,686,911 | B1 | 2/2004 | Levin et al. |
| 6,697,086 | B2 | 2/2004 | Rosenberg et al. |
| 6,700,556 | B2 | 3/2004 | Richley et al. |
| 6,703,924 | B2 | 3/2004 | Tecu et al. |
| 6,743,021 | B2 | 6/2004 | Prince et al. |
| 6,788,295 | B1 | 9/2004 | Inkster |
| 6,819,316 | B2 | 11/2004 | Schulz et al. |
| 6,850,222 | B1 | 2/2005 | Rosenberg |
| 6,861,961 | B2 | 3/2005 | Sandbach et al. |
| 6,877,986 | B2 | 4/2005 | Fournier et al. |
| 6,881,063 | B2 | 4/2005 | Yang |
| 6,930,234 | B2 | 8/2005 | Davis |
| 6,937,225 | B1 | 8/2005 | Kehlstadt et al. |
| 6,975,305 | B2 | 12/2005 | Yamashita |
| 6,979,164 | B2 | 12/2005 | Kramer |
| 6,982,696 | B1 | 1/2006 | Shahoian |
| 6,995,745 | B2 | 2/2006 | Boon et al. |
| 7,004,655 | B2 | 2/2006 | Ferrara |
| 7,015,894 | B2 | 3/2006 | Morohoshi |
| 7,027,032 | B2 | 4/2006 | Rosenberg et al. |
| 7,056,051 | B2 | 6/2006 | Fiffie |
| 7,061,467 | B2 | 6/2006 | Rosenberg |
| 7,064,655 | B2 | 6/2006 | Murray et al. |
| 7,079,111 | B2 | 7/2006 | Ho |
| 7,081,888 | B2 | 7/2006 | Cok et al. |
| 7,096,852 | B2 | 8/2006 | Gregorio |
| 7,102,541 | B2 | 9/2006 | Rosenberg |
| 7,104,152 | B2 | 9/2006 | Levin et al. |
| 7,106,305 | B2 | 9/2006 | Rosenberg |
| 7,106,313 | B2 | 9/2006 | Schena et al. |
| 7,109,967 | B2 | 9/2006 | Hioki et al. |
| 7,112,737 | B2 | 9/2006 | Ramstein |
| 7,113,166 | B1 | 9/2006 | Rosenberg et al. |

(56) References Cited

U.S. PATENT DOCUMENTS

| | | |
|---|---|---|
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |

(56) References Cited

U.S. PATENT DOCUMENTS

| | | | |
|---|---|---|---|
| 8,159,461 B2 | 4/2012 | Martin et al. | |
| 8,162,009 B2 | 4/2012 | Chaffee | |
| 8,164,573 B2 | 4/2012 | Dacosta et al. | |
| 8,166,649 B2 | 5/2012 | Moore | |
| 8,169,306 B2 | 5/2012 | Schmidt et al. | |
| 8,169,402 B2 | 5/2012 | Shahoian et al. | |
| 8,174,372 B2 | 5/2012 | Da Costa | |
| 8,174,495 B2 | 5/2012 | Takashima et al. | |
| 8,174,508 B2 | 5/2012 | Sinclair et al. | |
| 8,174,511 B2 | 5/2012 | Takenaka et al. | |
| 8,178,808 B2 | 5/2012 | Strittmatter | |
| 8,179,375 B2 | 5/2012 | Ciesla et al. | |
| 8,179,377 B2 | 5/2012 | Ciesla et al. | |
| 8,188,989 B2 | 5/2012 | Levin et al. | |
| 8,195,243 B2 | 6/2012 | Kim et al. | |
| 8,199,107 B2 | 6/2012 | Xu et al. | |
| 8,199,124 B2 | 6/2012 | Ciesla et al. | |
| 8,203,094 B2 | 6/2012 | Mittleman et al. | |
| 8,203,537 B2 | 6/2012 | Tanabe et al. | |
| 8,207,950 B2 | 6/2012 | Ciesla et al. | |
| 8,212,772 B2 | 7/2012 | Shahoian | |
| 8,217,903 B2 | 7/2012 | Ma et al. | |
| 8,217,904 B2 | 7/2012 | Kim | |
| 8,223,278 B2 | 7/2012 | Kim et al. | |
| 8,224,392 B2 | 7/2012 | Kim et al. | |
| 8,228,305 B2 | 7/2012 | Pryor | |
| 8,232,976 B2 | 7/2012 | Yun et al. | |
| 8,243,038 B2 | 8/2012 | Ciesla et al. | |
| 8,253,052 B2 | 8/2012 | Chen | |
| 8,253,703 B2 | 8/2012 | Eldering | |
| 8,279,172 B2 | 10/2012 | Braun et al. | |
| 8,279,193 B1 | 10/2012 | Birnbaum et al. | |
| 8,310,458 B2 | 11/2012 | Faubert et al. | |
| 8,345,013 B2 | 1/2013 | Heubel et al. | |
| 8,350,820 B2 | 1/2013 | Deslippe et al. | |
| 8,362,882 B2 | 1/2013 | Heubel et al. | |
| 8,363,008 B2 | 1/2013 | Ryu et al. | |
| 8,367,957 B2 | 2/2013 | Strittmatter | |
| 8,368,641 B2 | 2/2013 | Tremblay et al. | |
| 8,378,797 B2 | 2/2013 | Pance et al. | |
| 8,384,680 B2 | 2/2013 | Paleczny et al. | |
| 8,390,594 B2 | 3/2013 | Modarres et al. | |
| 8,390,771 B2 | 3/2013 | Sakai et al. | |
| 8,395,587 B2 | 3/2013 | Cauwels et al. | |
| 8,395,591 B2 | 3/2013 | Kruglick | |
| 8,400,402 B2 | 3/2013 | Son | |
| 8,400,410 B2 | 3/2013 | Taylor et al. | |
| 8,547,339 B2 | 10/2013 | Ciesla | |
| 8,587,541 B2 | 11/2013 | Ciesla et al. | |
| 8,587,548 B2 | 11/2013 | Ciesla et al. | |
| 8,749,489 B2 | 6/2014 | Ito et al. | |
| 8,856,679 B2 | 10/2014 | Sirpal et al. | |
| 8,922,503 B2 | 12/2014 | Ciesla et al. | |
| 8,922,510 B2 | 12/2014 | Ciesla et al. | |
| 8,928,621 B2 | 1/2015 | Ciesla et al. | |
| 8,970,403 B2 | 3/2015 | Ciesla et al. | |
| 9,035,898 B2 | 5/2015 | Ciesla | |
| 9,075,429 B1 | 7/2015 | Karakotsios | |
| 9,116,617 B2 | 8/2015 | Ciesla et al. | |
| 9,128,525 B2 | 9/2015 | Yairi et al. | |
| 9,274,612 B2 | 3/2016 | Ciesla et al. | |
| 9,274,635 B2 | 3/2016 | Birnbaum | |
| 2001/0008396 A1 | 7/2001 | Komata | |
| 2001/0043189 A1 | 11/2001 | Brisebois et al. | |
| 2002/0063694 A1 | 5/2002 | Keely et al. | |
| 2002/0104691 A1 | 8/2002 | Kent et al. | |
| 2002/0106614 A1 | 8/2002 | Prince et al. | |
| 2002/0110237 A1 | 8/2002 | Krishnan | |
| 2002/0125084 A1* | 9/2002 | Kreuzer | B60R 21/2037 188/267.1 |
| 2002/0149570 A1 | 10/2002 | Knowles et al. | |
| 2002/0180620 A1 | 12/2002 | Gettemy et al. | |
| 2003/0087698 A1 | 5/2003 | Nishiumi et al. | |
| 2003/0117371 A1 | 6/2003 | Roberts et al. | |
| 2003/0179190 A1 | 9/2003 | Franzen | |
| 2003/0206153 A1 | 11/2003 | Murphy | |
| 2003/0223799 A1 | 12/2003 | Pihlaja | |
| 2004/0001589 A1 | 1/2004 | Mueller et al. | |
| 2004/0056876 A1 | 3/2004 | Nakajima | |
| 2004/0056877 A1 | 3/2004 | Nakajima | |
| 2004/0106360 A1 | 6/2004 | Farmer et al. | |
| 2004/0114324 A1 | 6/2004 | Kusaka et al. | |
| 2004/0164968 A1 | 8/2004 | Miyamoto | |
| 2004/0178006 A1 | 9/2004 | Cok | |
| 2005/0007339 A1 | 1/2005 | Sato | |
| 2005/0007349 A1 | 1/2005 | Vakil et al. | |
| 2005/0020325 A1 | 1/2005 | Enger et al. | |
| 2005/0030292 A1 | 2/2005 | Diederiks | |
| 2005/0057528 A1 | 3/2005 | Kleen | |
| 2005/0073506 A1 | 4/2005 | Durso | |
| 2005/0088417 A1 | 4/2005 | Mulligan | |
| 2005/0110768 A1 | 5/2005 | Marriott et al. | |
| 2005/0162408 A1 | 7/2005 | Martchovsky | |
| 2005/0212773 A1 | 9/2005 | Asbill | |
| 2005/0231489 A1 | 10/2005 | Ladouceur et al. | |
| 2005/0253816 A1 | 11/2005 | Himberg et al. | |
| 2005/0270444 A1 | 12/2005 | Miller et al. | |
| 2005/0285846 A1 | 12/2005 | Funaki | |
| 2006/0026521 A1 | 2/2006 | Hotelling et al. | |
| 2006/0026535 A1 | 2/2006 | Hotelling et al. | |
| 2006/0053387 A1 | 3/2006 | Ording | |
| 2006/0087479 A1 | 4/2006 | Sakurai et al. | |
| 2006/0097991 A1 | 5/2006 | Hotelling et al. | |
| 2006/0098148 A1 | 5/2006 | Kobayashi et al. | |
| 2006/0118610 A1 | 6/2006 | Pihlaja et al. | |
| 2006/0119586 A1 | 6/2006 | Grant et al. | |
| 2006/0152474 A1 | 7/2006 | Saito et al. | |
| 2006/0154216 A1 | 7/2006 | Hafez et al. | |
| 2006/0197753 A1 | 9/2006 | Hotelling | |
| 2006/0214923 A1 | 9/2006 | Chiu et al. | |
| 2006/0238495 A1* | 10/2006 | Davis | G06F 1/1626 345/156 |
| 2006/0238510 A1* | 10/2006 | Panotopoulos | G06F 3/0238 345/168 |
| 2006/0238517 A1 | 10/2006 | King et al. | |
| 2006/0256075 A1 | 11/2006 | Anastas et al. | |
| 2006/0278444 A1 | 12/2006 | Binstead | |
| 2007/0013662 A1 | 1/2007 | Fauth | |
| 2007/0036492 A1 | 2/2007 | Lee | |
| 2007/0085837 A1 | 4/2007 | Ricks et al. | |
| 2007/0108032 A1 | 5/2007 | Matsumoto et al. | |
| 2007/0122314 A1 | 5/2007 | Strand et al. | |
| 2007/0130212 A1 | 6/2007 | Peurach et al. | |
| 2007/0152982 A1* | 7/2007 | Kim | G06F 3/016 345/173 |
| 2007/0152983 A1 | 7/2007 | Mckillop et al. | |
| 2007/0165004 A1 | 7/2007 | Seelhammer et al. | |
| 2007/0171210 A1 | 7/2007 | Chaudhri et al. | |
| 2007/0182718 A1 | 8/2007 | Schoener et al. | |
| 2007/0229233 A1 | 10/2007 | Dort | |
| 2007/0229464 A1 | 10/2007 | Hotelling et al. | |
| 2007/0236466 A1 | 10/2007 | Hotelling | |
| 2007/0236469 A1 | 10/2007 | Woolley et al. | |
| 2007/0247429 A1 | 10/2007 | Westerman | |
| 2007/0257634 A1 | 11/2007 | Leschin et al. | |
| 2007/0273561 A1 | 11/2007 | Philipp | |
| 2007/0296702 A1 | 12/2007 | Strawn et al. | |
| 2007/0296709 A1 | 12/2007 | Guanghai | |
| 2008/0010593 A1 | 1/2008 | Uusitalo et al. | |
| 2008/0024459 A1 | 1/2008 | Poupyrev et al. | |
| 2008/0054875 A1 | 3/2008 | Saito | |
| 2008/0062151 A1 | 3/2008 | Kent | |
| 2008/0136791 A1 | 6/2008 | Nissar | |
| 2008/0138774 A1 | 6/2008 | Ahn et al. | |
| 2008/0143693 A1 | 6/2008 | Schena | |
| 2008/0150911 A1 | 6/2008 | Harrison | |
| 2008/0165139 A1 | 7/2008 | Hotelling et al. | |
| 2008/0174321 A1* | 7/2008 | Kang | G06F 3/044 324/686 |
| 2008/0174570 A1 | 7/2008 | Jobs et al. | |
| 2008/0202251 A1 | 8/2008 | Serban et al. | |
| 2008/0238448 A1 | 10/2008 | Moore et al. | |
| 2008/0248836 A1 | 10/2008 | Caine | |
| 2008/0249643 A1 | 10/2008 | Nelson | |

(56) References Cited

U.S. PATENT DOCUMENTS

| | | |
|---|---|---|
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1 | 10/2009 | Perlin et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala Vazquez |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0248947 A1 | 10/2011 | Krahenbuhl et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| GB | 190403152 A | 12/1904 |

(56) References Cited

FOREIGN PATENT DOCUMENTS

| | | |
|---|---|---|
| GB | 108771 A | 8/1917 |
| GB | 1242418 A | 8/1971 |
| JP | s63164122 A | 7/1988 |
| JP | 10255106 | 9/1998 |
| JP | H10255106 | 9/1998 |
| JP | 2006268068 A | 10/2006 |
| JP | 2006285785 A | 10/2006 |
| JP | 200964357 A | 3/2009 |
| JP | 2009064357 A | 3/2009 |
| JP | 2010039602 A | 2/2010 |
| JP | 2010072743 A | 4/2010 |
| JP | 2011508935 A | 3/2011 |
| KR | 20000010511 | 2/2000 |
| KR | 100677624 B | 1/2007 |
| KR | 20090023364 | 11/2012 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A1 | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011108382 A1 | 9/2011 |
| WO | 2011112984 A | 9/2011 |
| WO | 2011118382 A1 | 9/2011 |
| WO | 2011133604 A | 10/2011 |
| WO | 2011133605 A | 10/2011 |
| WO | 2013173624 A2 | 11/2013 |
| WO | 2014047656 A2 | 3/2014 |

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Jeong et al., "Tunable Microdoublet Lens Array," Optical Society of America, Optics Express; vol. 12, No. 11. May 31, 2004, 7 Pages.

Lind. "Two Decades of Negative Thermal Expansion Research: Where Do We Stand?" Department of Chemistry, the University of Toledo, Materials 2012, 5, 1125-1154; doi:10.33901ma5061125, Jun. 20, 2012 (Jun. 20, 2012) pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

Preumont, A. Vibration Control of Active Structures: An Introduction, Jul. 2011.

* cited by examiner

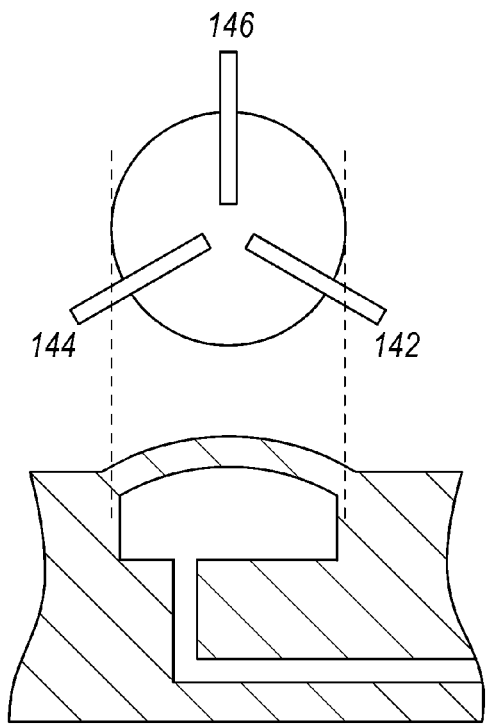
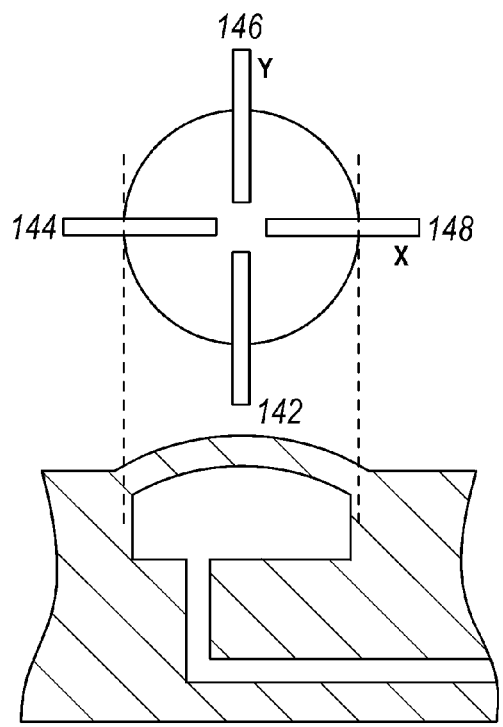
FIG. 14C  FIG. 14D
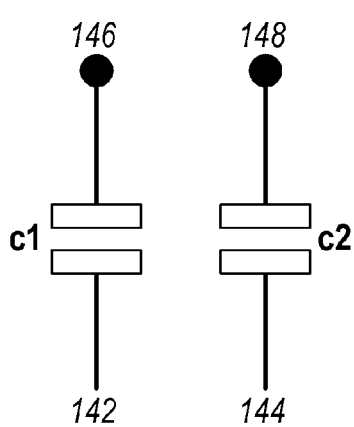
FIG. 15A
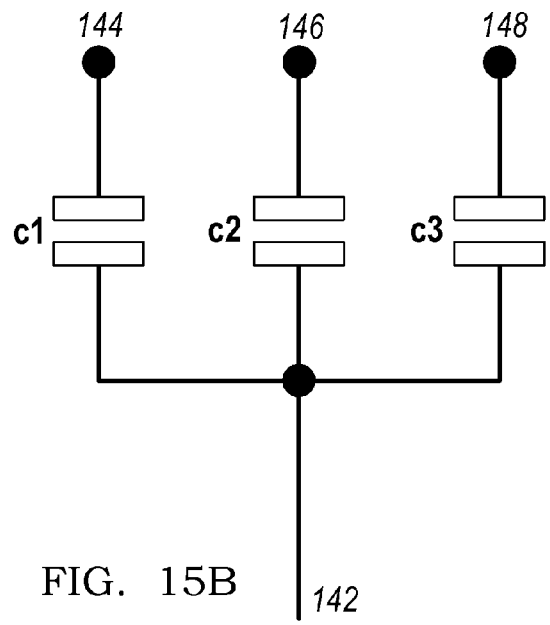
FIG. 15B

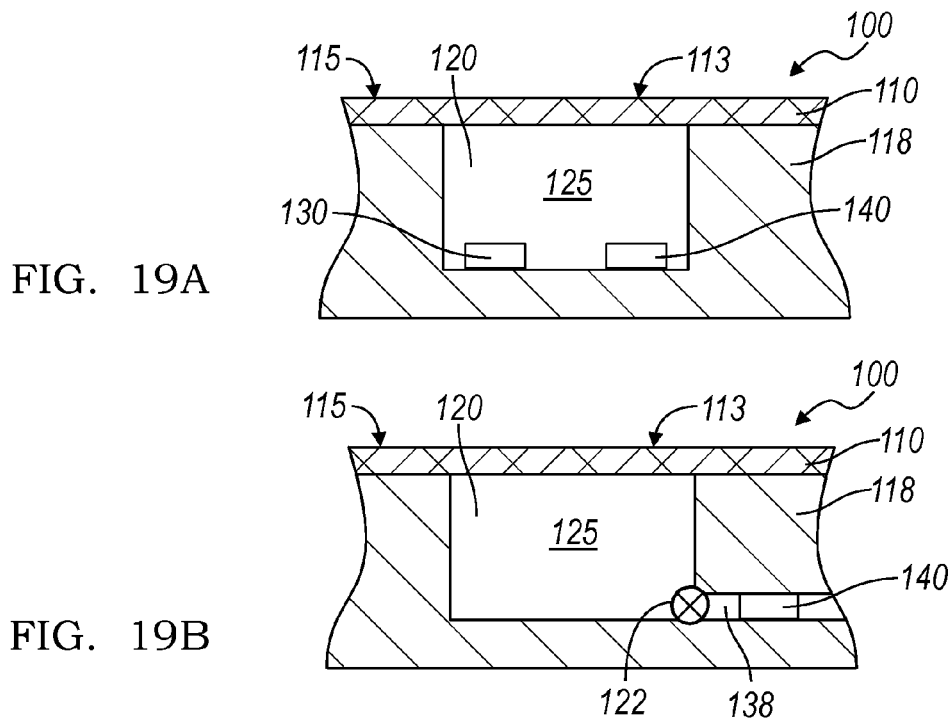
FIG. 19A
FIG. 19B
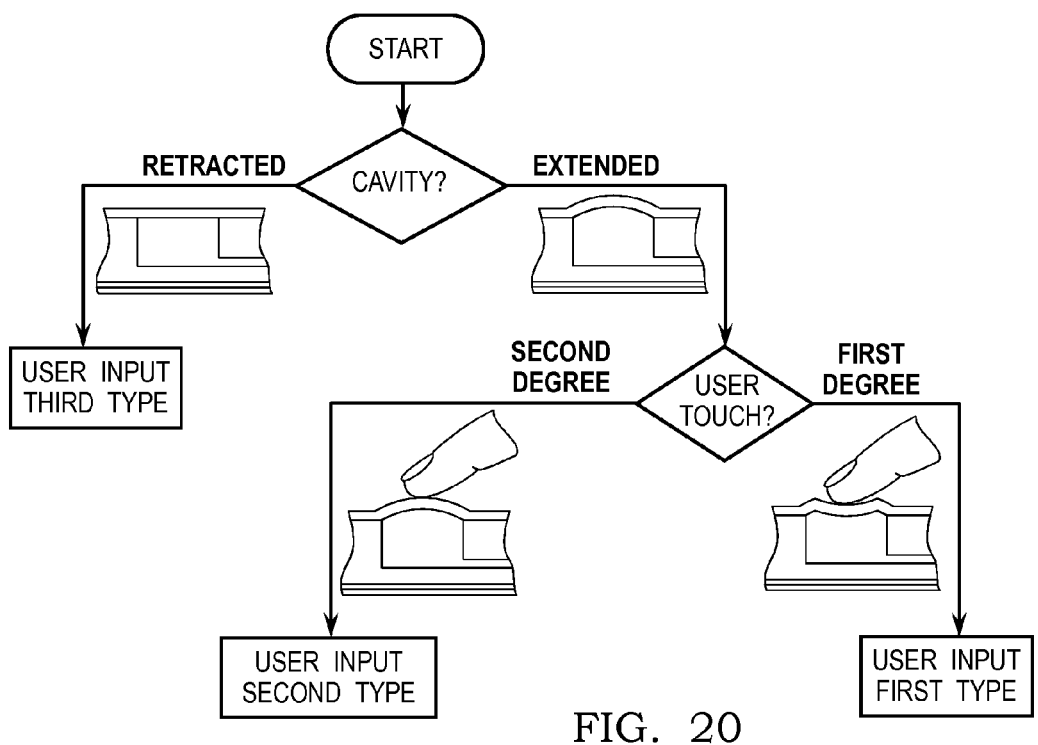
FIG. 20

USER INTERFACE AND METHODS

CROSS-REFERENCE TO RELATED APPLICATIONS

This application is a continuation of U.S. patent application Ser. No. 13/896,090, filed 16 May 2013, which is a continuation-in-part of U.S. patent application Ser. No. 13/456,010, filed on 25 Apr. 2012, which is a continuation-in-part of U.S. patent application Ser. No. 12/497,622, filed on 3 Jul. 2009, which is a continuation-in-part of U.S. patent application Ser. No. 12/319,334, filed on 5 Jan. 2009, which is a continuation-in-part of U.S. patent application Ser. No. 11/969,848, filed on 4 Jan. 2008, which are all incorporated in their entireties by this reference.

This application also claims the benefit of U.S. Provisional Application No. 61/648,054, filed on 16 May 2012, U.S. Provisional Application No. 61/679,214, filed on 3 Aug. 2012, and U.S. Provisional Application No. 61/727,083, filed on 15 Nov. 2012, which are incorporated in their entireties by this reference.

BRIEF DESCRIPTION OF THE FIGURES

FIGS. 14A-14D are schematic representations of variations of the user interface;

FIGS. 15A-15B are schematic representations of variations of the user interface;

FIGS. 19A-19B are schematic representations of variations of the user interface;

FIG. 20 is a flowchart representation in accordance with one variation of the user interface;

DESCRIPTION OF THE EMBODIMENTS

The following description of the embodiments of the invention is not intended to limit the invention to these embodiments, but rather to enable any person skilled in the art to make and use this invention.

1. User Interface

Figure 1A:
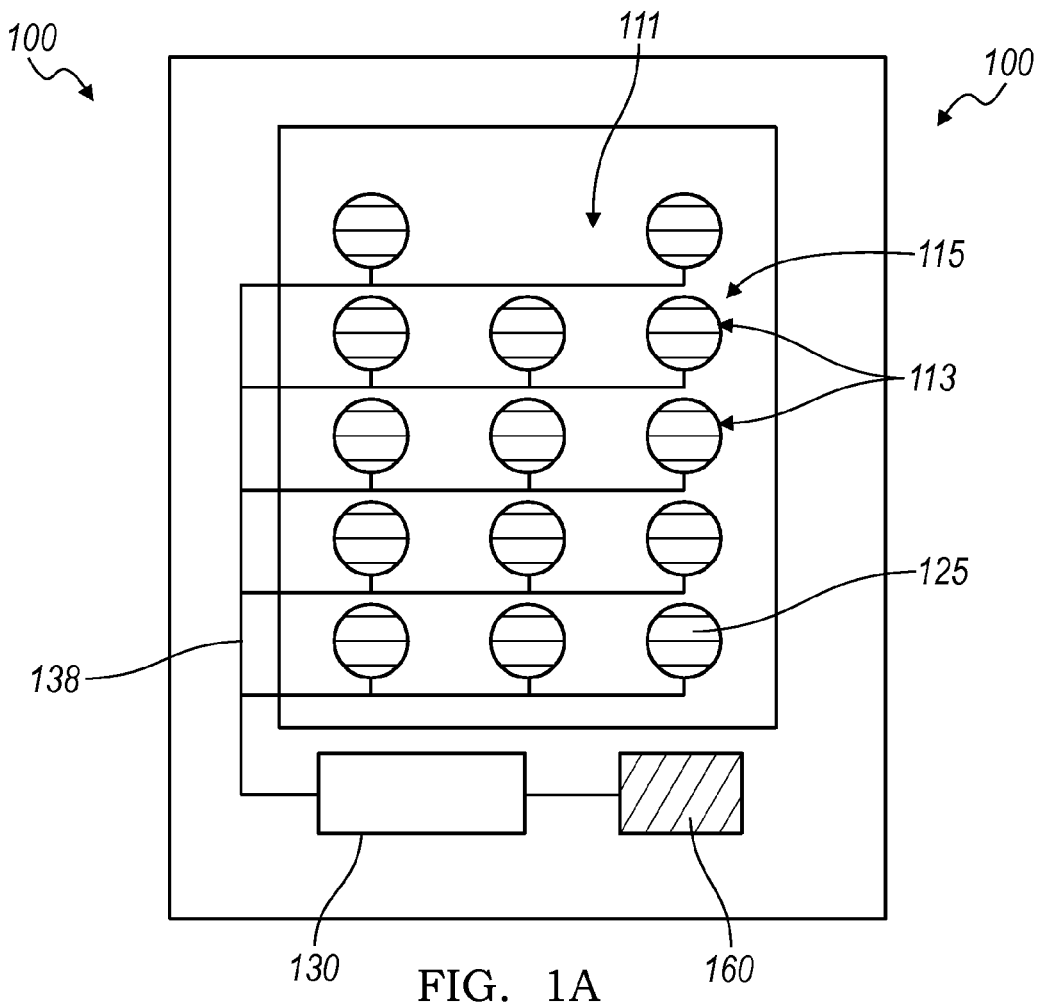
FIGS. 1A-1B are plan and elevation representations, respectively, of a user interface in accordance with one embodiment of the invention.
Figure 1B:
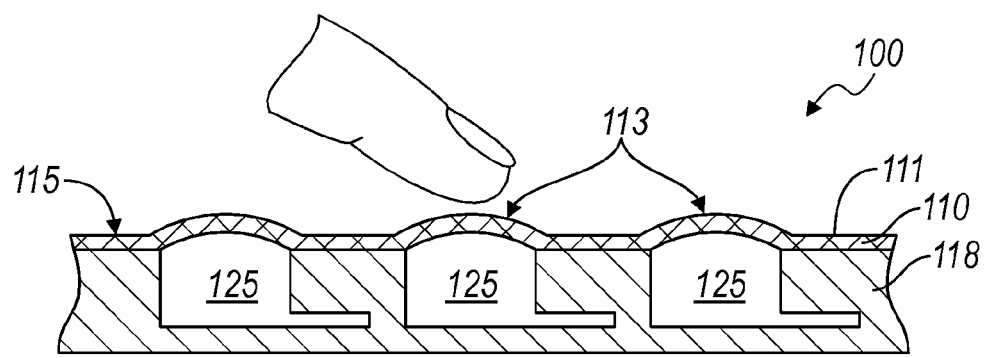

As shown in FIG. 1, a user interface includes: a substrate 118; a tactile layer 110 including a tactile surface 111, a deformable region 113 of the tactile layer 110 cooperating with the substrate 118 to define a cavity 125, and a peripheral region 115 of the tactile layer 110 coupled to the substrate 118 adjacent a perimeter of the cavity 125; a volume of fluid 120 arranged within the cavity 125; a displacement device 130 configured to manipulate the volume of fluid 120 to transition the deformable region 113 from a retracted setting to an expanded setting, the deformable region 113 flush with the peripheral region 115 at the tactile surface 111 in the retracted setting and offset from the deformable region 113 at the tactile surface 111 in the expanded setting; a sensor 140 including a set of sensing elements, each sensing element in the set of sensing elements configured to sense a capacitance value across a portion of the tactile layer 110; and a processor 160 configured to detect an input on the tactile surface 111 at the deformable region 113 in the retracted setting based on an output of the sensor 140 and a retracted setting sensor input threshold, the processor 160 further configured to detect an input on the tactile surface 111 at the deformable region 113 in the expanded setting based on an output of the sensor 140 and an expanded setting sensor input threshold that differs from the retracted setting sensor input threshold.

The user interface 100 can be applied over a display (e.g., a touchscreen) of a computing device, such as a display integrated into a smartphone, cellular phone, tablet, laptop computer, desktop computer, personal data assistant (PDA), a personal music player, an automotive console, a television, a camera, a watch, to provide tactile guidance and to capture inputs. The user interface 100 can also be applied over a flat or curved sans a display, such as a standalone keyboard, a computer mouse, a television remote, an automotive steering wheel, or a case for a mobile computing device (e.g., a smartphone, a tablet), to provide tactile guidance and to capture inputs. Generally, as shown in FIG. 2, the tactile surface 111 at the deformable region 113 can remain flush with the peripheral region 115 until tactile guidance is required or desired and/or until an input is required or anticipated on the tactile surface 111 proximal the deformable region 113, at which point the displacement device 130 manipulates fluid pressure within the cavity 125 adjacent the deformable region 113 to expand (or retract) the tactile surface 111 at deformable region. The displacement device 130 can thus expand the cavity 125 to deform (e.g., expand) the deformable region 113 outwardly, thereby forming a button-like shape or guide on the tactile surface 111. The button-like shape can thus provide a user with tactile guidance when navigating over the expanded deformable region and further enable tactile feedback for the user providing an input in the form of a force on the deformable region 113. The sensor 140 can sense an input that inwardly deforms the deformable region 113, an input that rests on the tactile surface 111 but that does not deform the deformable region 113, and/or an input that 'hovers' over the deformable region 113. However, the sensor 140 can detect any other input, input type, or input mode, such as a finger input or a stylus iput.

Generally, the phrase "the sensor 140 can detect . . . " can be equivalent to "outputs of the the sensor 140 can be implemented by the processor 160 to detect . . . " Similarly, the phrase "the sensor 140 can sense . . . " can be equivalent to "outputs of the the sensor 140 can be implemented by the processor 160 to sense . . . ," and the phrase "the sensor 140 can measure . . . " can be equivalent to "outputs of the the sensor 140 can be implemented by the processor 160 to measure . . . " Furthermore, the phrase "the sensor 140 senses . . . " can be equivalent to "the processor implements outputs of the sensor 140 to sense . . . ," and so on.

As shown in FIGS. 1 and 2, the tactile layer 110 defines the tactile surface 111, the deformable region 113 that cooperates with the substrate 118 to define the cavity 125, and the peripheral region 115 coupled to the substrate 118 adjacent a perimeter of the cavity 125. Generally, the tactile layer 110 functions to define the tactile surface 111 that interfaces with a user in a tactile manner and to cooperate with the substrate 118 to define the cavity 125. The tactile surface 111 can be continuous, such that when swiping a finger across the tactile surface 111 a user would not feel any interruptions or seams. Alternatively, the tactile surface 111 can include features that facilitate the user in distinguishing one region of the tactile surface 111 from another. The tactile surface 111 can also be planar, such as defining a flat plane in the retracted setting, through the tactile layer 110 can alternatively be arranged in a curved or warped plane. The tactile surface 111 at the deformable region 113 can deform (e.g., expand, retract) on changes in fluid pressure within the cavity 125 and can "relax" or "un-deform" back to a normal planar state when fluid pressure within the cavity 125 is equalized with an ambient air pressure.

In one implementation, the tactile layer 110 includes a first portion that is elastic and a second portion that is relatively less elastic. For example, the tactile layer no can be relatively more elastic in specific areas (e.g., at the deformable region 113) and relatively less elastic in other areas (e.g., at the peripheral region 115). In another implementation, the tactile layer 110 is generally of uniform elasticity across the deformable and peripheral regions. In yet another implementation, the tactile layer 110 includes or is made of a smart material, such as Nickel Titanium (i.e., "Nitinol") or an electro-active polymer, that has a selective and/or variable elasticity.

In a variation of the user interface 100 that includes a display coupled to the substrate 118, the tactile layer 110 can be optically transparent or translucent such that an image output from the display 150 can be communicated through the tactile layer 110 to a user. For example, the tactile layer 110 can exhibit any of the following properties: high optical transmission, low haze, wide viewing angle, minimal back reflectance, scratch resistance, chemical resistance, stain resistance, smoothness (i.e., not tacky) to the touch, minimal out-gassing, relatively low degradation when exposed to ultraviolet light, etc. The tactile layer 110 can be made from one or more layers of suitable elastic material, such as a polymer, polyurethane, and/or a silicone-based elastomer (e.g., poly-dimethylsiloxane (PDMS), RTV Silicone, etc.). In one implementation in which the tactile layer 110 includes a first portion that is elastic and a second portion that is relatively inelastic, the inelastic portion can be made from a material including polymers or glass, such as elastomers, silicone-based organic polymers (e.g., poly-dimethylsiloxane (PDMS)), thermoset plastics (e.g., polymethyl methacrylate (PMMA)), photocurable solvent resistant elastomers (e.g., perfluropolyethers), polyethylene terephthalate (PET), or any other suitable material.

The tactile layer 110 can include multiple sublayers of the same material or different materials. For example, the tactile layer 110 can include a first sublayer of one material that defines the tactile surface 111 and a second sublayer of a second material that attaches to the substrate 118. However, the tactile layer 110 can be of any other form and/or material.

The substrate 118 of the user interface 100 cooperates with the tactile layer no to define the cavity 125. The substrate 118 further functions to define an attachment surface adjacent the cavity 125, wherein the peripheral region 115 of the tactile layer 110 couples (e.g., mounts, attaches, adheres) to the attachment face to define a perimeter of the deformable region 113. As shown in FIG. 2, the cavity 125 functions to contain the volume of fluid 120, and the substrate 118 can further define a fluid channel that fluidly couples the cavity 125 to a reservoir and/or to the displacement device 130. For example, the substrate 118 can define the fluid channel 138 that is a microfluidic channel.

Figure 2A:
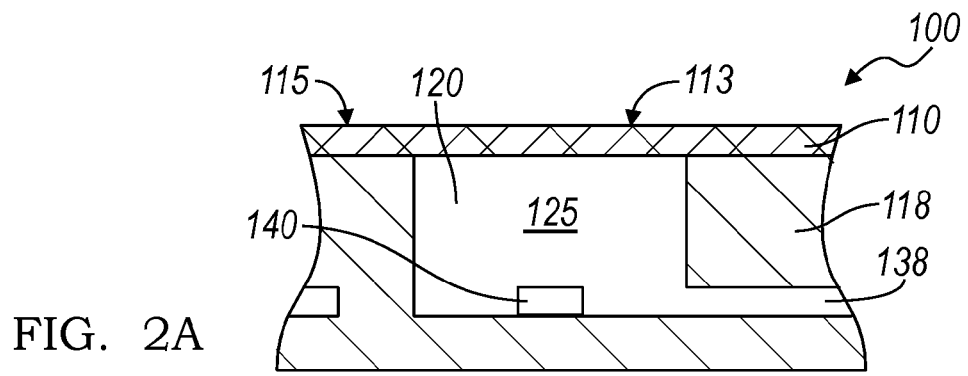
FIGS. 2A-2C are schematic representations of a retracted, expanded, and input settings of the user interface, respectively.
Figure 2B:
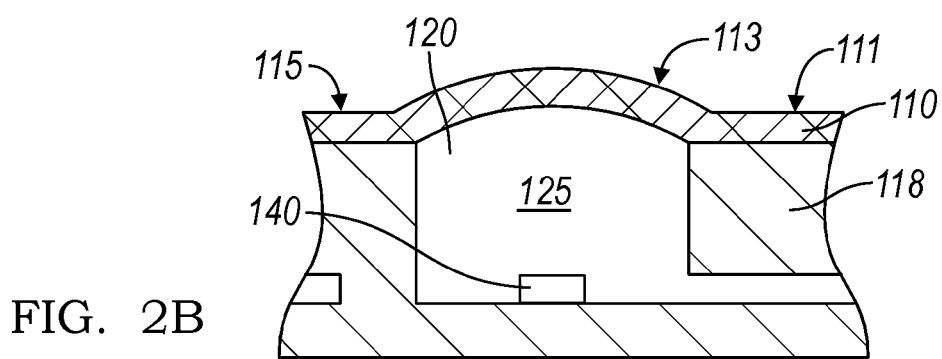
Figure 2C:
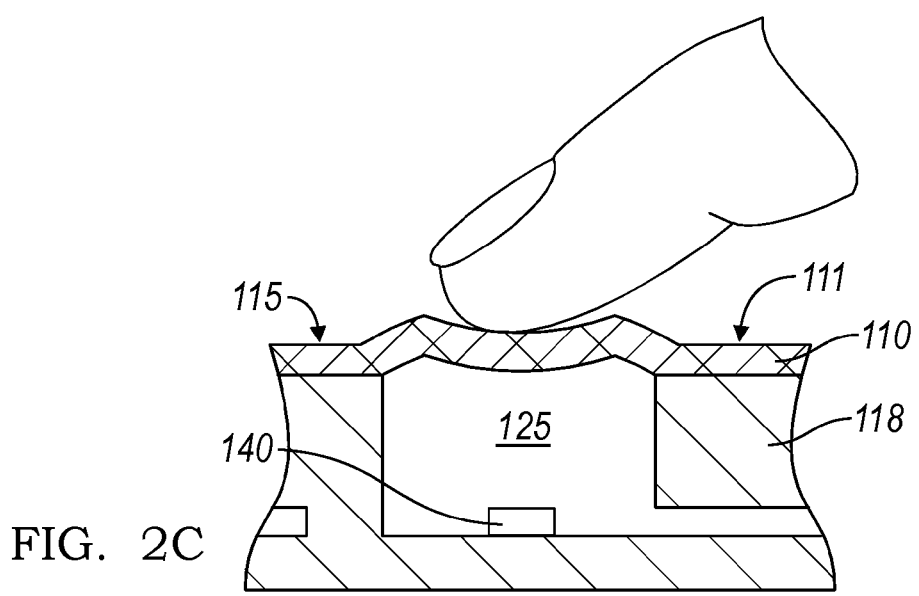
Figure 3:
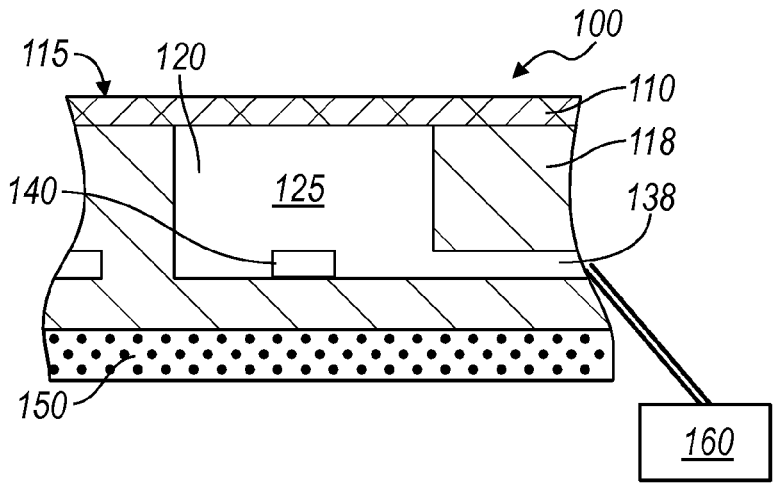
FIG. 3 is a schematic representation of one variation of the user interface.
Figure 4:
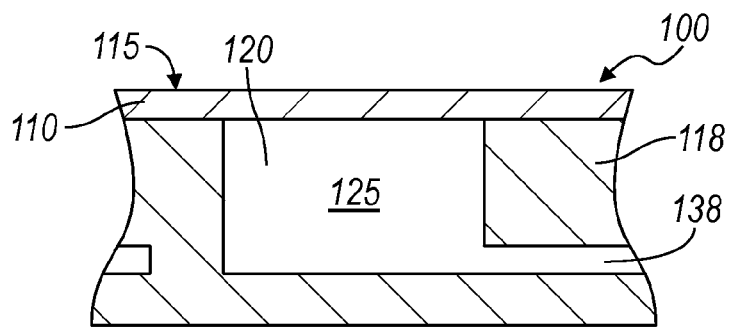
FIG. 4 is a schematic representation of one variation of the user interface.

The substrate 118 can be substantially rigid (i.e., relative to the tactile layer no) such that an increase in fluid pressure within the cavity 125 expands the deformable region 113 into an expanded setting (shown in FIG. 2B) and such that a decrease in fluid pressure within the cavity 125 retracts the deformable region 113 into a retracted setting (shown in FIG. 2A). In the expanded setting, the cavity 125 can thus expand the tactile surface 111 at the deformable region 113 above the tactile surface 111 at the peripheral region 115. For example, when implemented in a mobile computing device, the cavity 125 can define a diameter of 2 mm and the deformable region 113 can deflect outwardly by 1 mm in the expanded setting to define a 2 mm-diameter and 1 mm-tall button on the tactile surface 111. However, the cavity 125 can be of any other suitable dimension.

The volume of fluid 120 is arranged within the cavity 125, wherein manipulation of the volume of fluid 120 modifies the height of the tactile surface 111 at the deformable region 113. The volume of fluid 120 can be a substantially incompressible fluid. The fluid can be a liquid, such as water, glycerin, or ethylene glycol, or a gas, such as air, nitrogen, or argon, though the fluid can be any other suitable substance, such as a gel, aerogel, oil, alcohol, or water. The fluid can also be conductive or substantially non-conductive.

The displacement device 130 of the user interface 100 is configured to manipulate the volume of fluid 120 to transition the deformable region 113 from a retracted setting to an expanded setting, wherein the deformable region 113 is flush with the peripheral region 115 at the tactile surface 111 in the retracted setting and is offset from the deformable region 113 at the tactile surface 111 in the expanded setting. Generally, the displacement device 130 functions to manipulate the volume of fluid 120 to expand the cavity 125 from the retracted setting to the expanded setting, thereby deforming the tactile surface 111 at the deformable region 113 into a formation that is tactilely distinguishable from the tactile surface 111 at the peripheral region 115. In one example, the displacement device 130 controls the cavity 125 setting by modifying the volume of fluid 120 that is sealed within the cavity 125, such as by heating or cooling the volume of fluid 120. In another example, the displacement device 130 controls the cavity 125 setting by adding and removing fluid to and from the cavity 125. The displacement device 130 can, however, manipulate the volume of fluid 120 in any suitable way. In one example implementation in which the user interface 100 is integrated into a mobile computing device, the displacement device 130 can increase the volume of fluid 120 within the cavity 125 by approximately 0.1 ml However, the displacement device 130 can modify the volume of fluid 120 within the cavity 125 to any other degree and in any other way.

Figure 5A:
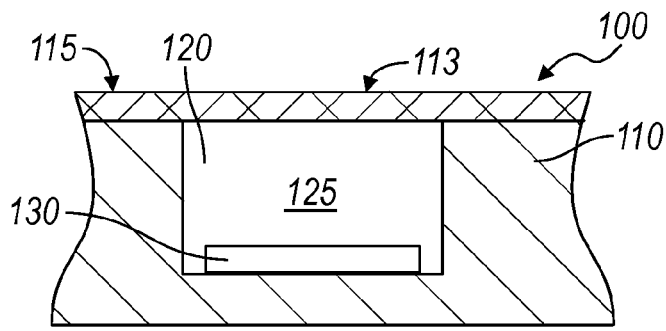
FIG. 5A-5B are schematic representations of one variation of the user interface in a retracted setting and an expanded setting, respectively.
Figure 5B:
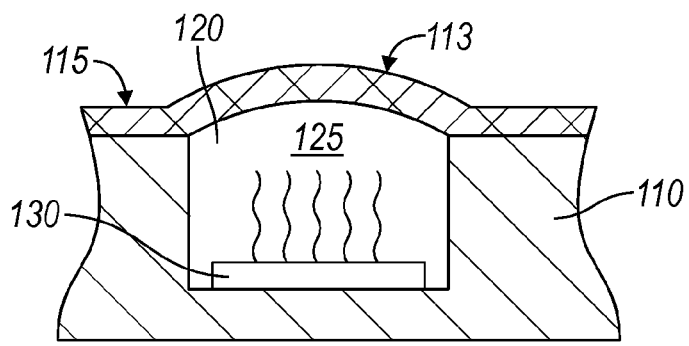

In one implementation shown in FIGS. 5A and 5B, the volume of fluid 120 can be an expandable fluid sealed in the cavity 125, and the displacement device 130 can include a heating element that heats the volume of fluid 120, thereby expanding the volume of the existing fluid in the cavity 125. For example, the heating element can be arranged within or adjacent the cavity 125 to heat the fluid and can be include resistive heating element. In this implementation, the fluid can alternatively include an expandable substance, such as plastic expandable microspheres, or can be paraffin. In this implementation, the displacement device 130 can additionally or alternatively include a cooling element that cools the volume of fluid 120, thereby retracting the volume of the existing fluid in the cavity 125.

Figure 6:
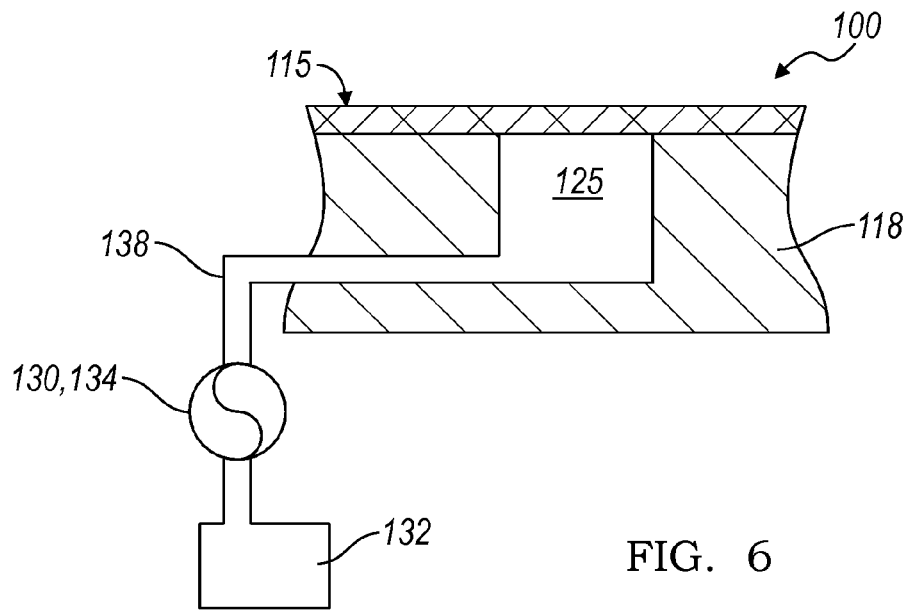
FIG. 6 is a schematic representation of one variation of the user interface in a retracted setting.
Figure 7:
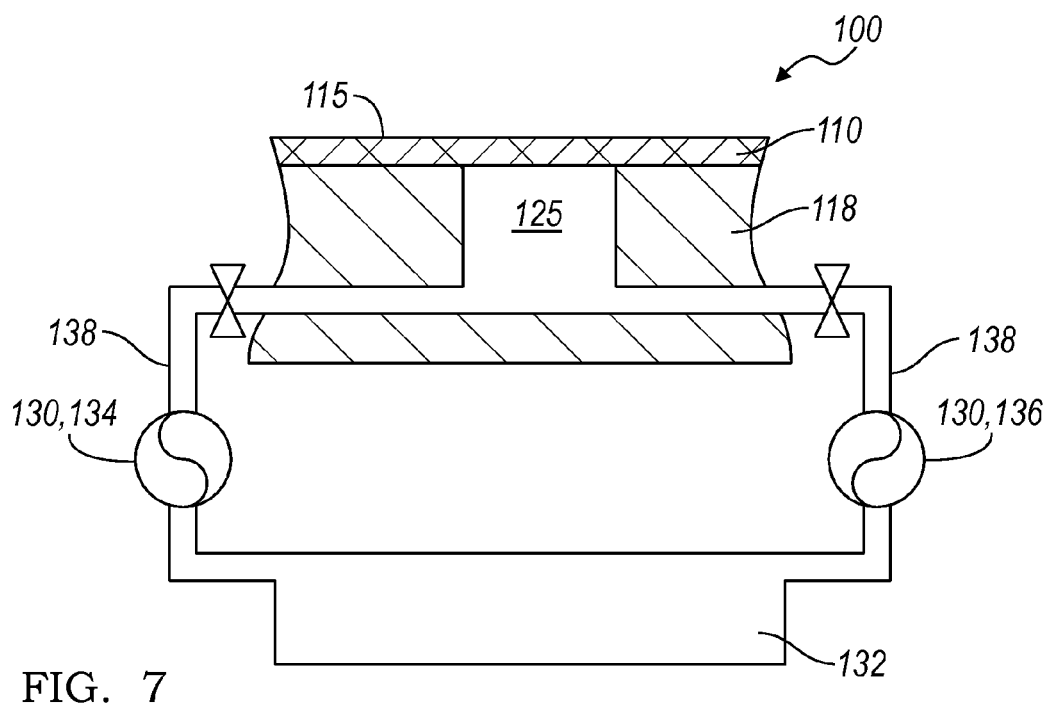
FIG. 7 is a schematic representation of one variation of the user interface in a retracted setting.

In another implementation, the displacement device 130 can displace fluid into and/or out of the cavity 125. In one example shown in FIG. 6, the displacement device 130 is fluidly coupled to a reservoir that contains additional fluid, and the displacement device 130 includes a pump (e.g., a positive displacement pump) that displaces fluid from the reservoir 132 to the cavity 125 via a fluid channel as described above. The reservoir 132 can therefore be remote from the cavity 125 but can alternatively be arranged adjacent the cavity 125 and connected directly to the cavity 125 via a short fluid channel. A portion of the channel can be a micro-fluidic channel (e.g., defining cross-sectional dimension in the range of 1 micrometer to 100 micrometers), through the channel can have any other suitable dimension. The pump 134 can be a micro-pump (such as pump #MDP2205 from ThinXXS Microtechnology AG of Zweibrucken, Germany or pump #mp5 from Bartels Mikrotechnik GmbH of Dortmund, Germany) or any other suitable device configured to displace fluid or induce a pressure differential to move fluid. Alternatively, the displacement device 130 can include a bladder and cam actuator, such as described in U.S. Provisional Application No. 61/727,083, filed on 15 Nov. 2012, which is incorporated herein by reference.

The pump 134 can be arranged remote from the cavity 125 and can be connected to the cavity 125 via the fluid channel 138. To extend the cavity 125 from a retracted setting to the expanded setting, the pump 134 can displace fluid from the reservoir 132, through the fluid channel 138, and into the cavity 125. To retract the cavity 125 from the expanded setting to the retracted setting, the pump 134 can "vent" or pump fluid in a reverse direction from the cavity 125 into the reservoir 132.

Figure 8A:
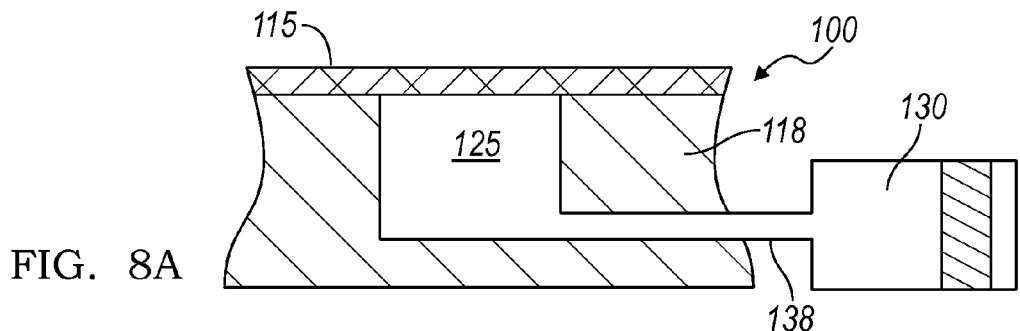
FIGS. 8A-8B are schematic representations of one variation of the user interface in a retracted setting and an expanded setting, respectively.
Figure 8B:
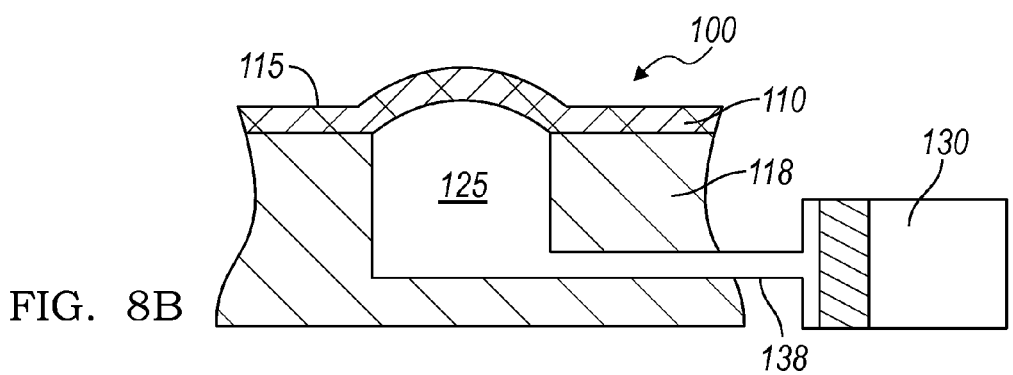

In the foregoing implementation, the user interface 100 can further include a first valve arranged between the pump 134 and the cavity 125 and a second valve located between the cavity 125 and a second pump. To extend the cavity 125 from the retracted setting to the expanded setting, the first valve can be opened and the second valve closed, and the first pump can displace fluid from the reservoir 132, through the fluid channel 138, and into the cavity 125. To retract the cavity 125 from the extended position to the retracted position, the first valve can be closed and the second valve opened, and the second pump can displace fluid from the cavity 125, through the fluid channel 138, and into the reservoir 132. The user interface 100 can alternatively retract the cavity 125 from the expanded setting to the retracted setting by opening the second valve and allowing the cavity 125 to vent or "drain" into the reservoir 132, which can assisted by elasticity of the tactile layer 110 returning to an un-deformed state. In another example, as shown in FIGS. 8A and 8B, the displacement device 130 can include an actuator (e.g., a linear actuator) that displaces fluid into and out of the cavity 125. To extend the cavity 125 from a retracted setting to the expanded setting (shown in FIG. 8A), the linear actuator displaces fluid through the channel and into the cavity 125, and to retract the cavity 125 from the expanded setting to the retracted setting (shown in FIG. 8B), the linear actuator draws fluid in a reverse direction from the cavity 125 to the reservoir 132.

The displacement device 130 can thus function to modify fluid pressure within the cavity 125 to expand and retract the cavity 125. For example, when implemented in a mobile computing device, the displacement device 130 can increase the fluid pressure within the cavity 125 by 0.1-10.0 psi to deform the tactile surface 111 at the deformable region 113. However, the displacement device 130 can be any other suitable pump or other displacement device implementing any other method to transition the cavity 125 between the retracted setting and the expanded setting.

Figure 9A:
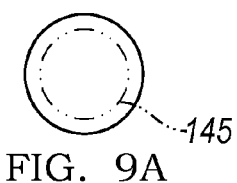
FIGS. 9A-12B are plan and elevation representations of a button deformation, a slider deformation, a slider ring deformation, a guide deformation, and a pointing stick deformation of variations of the user interface, respectively.
Figure 9B:
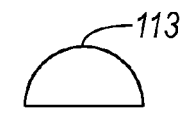
Figure 10A:
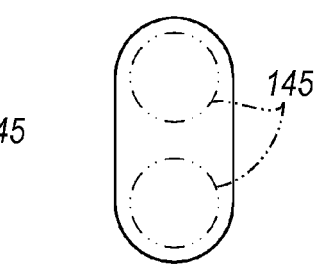
Figure 10B:
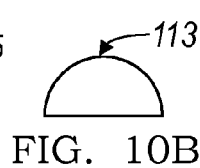
Figure 12A:
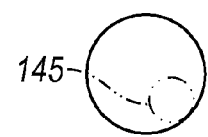
Figure 12B:
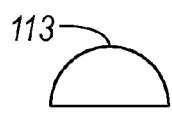
Figure 11A:
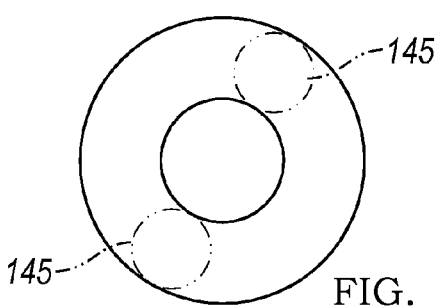
Figure 11B:
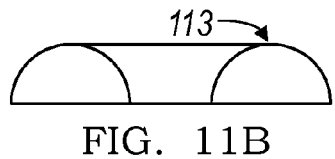

Generally, deformation (i.e., powered expansion or retraction) of the deformable region 113 functions to enable tactile feedback and tactile guidance at the tactile surface 111. Deformation of the deformable region 113 also can function to indicate a type of input or command associated with a region of the tactile surface 111. The deformable region 113, in the expanded setting, can define (1) a convex button that, when pressed by the user, signals an input to the sensor 140, (2) a convex slider that can be pressed at multiple points along deformation by the user and that signals the location of multiple inputs on the sensor 140, and/or (3) a convex pointing stick that signals the location of multiple inputs on sensor. The deformable region 113, in the retracted setting, can similarly define (1) a concave button, (2) a concave slider, and/or (3) a concave pointing stick. The convex button, as shown in FIGS. 9A and 9B, can define a dome shape, a cylindrical shape (i.e., with a flat top surface), a pyramidal or frustoconical shape, a cubic shape (i.e., with a flat top), or any other suitable button shape. As described below, the sensor 140 can recognize as an input (e.g., input 145, shown in FIGS. 9A, 10A, 11A, and 12A) on the tactile surface 111 at the deformable region 113 that defines the button. The convex slider can define an elongated ridge (shown in FIGS. 10A and 10B), a ring (shown in FIGS. 11A and 11B), a cross-shaped ridge, or ridge or slider of any other suitable shape. As described below, the sensor 140 can identify a user input at various locations across the slider and distinguish inputs at these locations using inputs of different types. In one example, the slider defining an annular shape can function as a "click wheel" of the second generation Apple iPod. The pointing stick (or pointing object), like the button, can define a domed shape, as shown in FIGS. 12A and 12B, a cylindrical shape (i.e., with a flat top surface), a pyramid-like shape, a cube-like shape (i.e., with a flat top), or any other suitable shape. The sensor 140 can identify user inputs at various locations along the pointing stick and distinguishes these user inputs as different commands or functions. In one example, in an implementation in which the pointing stick defines a domed pointing stick, depression of the pointing stick proximal an upper right quadrant can be interpreted differently than depression of the point stick proximal the lower right quadrant. The sensor 140 can also detect depression of the pointing stick in a sweeping motion, such as a "sweep" from an upper right quadrant to a lower right quadrant, which can be interpreted as a moving input similar to that of a "click wheel" of the second generation Apple iPod.

The sensor 140 of the user interface 100 includes a set of sensing elements, each sensing element in the set of sensing elements configured to sense a capacitance value across a portion of the tactile layer 110. Generally, the sensor 140 implements capacitive sensing technology to detect inputs at various locations on the tactile surface in, including the tactile surface 111 at the deformable region 113. The sensor 140 can detect the presence of a finger or stylus touch on the tactile surface 111, depression of the deformable region 113 in the expanded setting, and/or any other suitable type of input. The sensor 140 can also detect a direction of an input, the location of an input, the rate at which an input is applied to the deformable region 113, a level to which the input inwardly deform the deformable region 113, a type of user input (e.g., input by a finger, input by a stylus), etc.

The sensor 140 can be a capacitive sensor that includes at least two conductors that cooperate to detect a fluctuation in an electric (or electromagnetic) field across a portion of the tactile layer 110, the electric field emanating from at least two conductors (i.e., conductive pads) of the sensor 140. A fluctuation in the electric field can be the result of a touch with a finger or stylus, deformation of the deformable region 113, a change in fluid volume or position within the substrate 118 and/or cavity, etc.

The sensor 140 can include any number of sensing elements configured to detect inputs at various locations on the tactile surface 111. Each sensing element can be a surface capacitance sensing elements including a single conductive pad, wherein an input implement (e.g., a finger) proximal the tactile surface 111 absorbs charge from the conductive pad. Alternatively, each sensing element can be a projected capacitance sensor including two or more adjacent conductive pads driven with a fluctuating voltage over time to yield a rising and decaying voltage across the conductive pads over time, a rise and/or decay time of the voltage correlated with capacitive coupling between the conductive pads, wherein an input on the tactile surface 111 affects the capacitive coupling between the conductive pads. However, each sensing element can be any other type of sensing element, electrode, conductor, etc.

In one implementation, the sensor 140 includes a projected capacitance touch sensor including a first layer of a first set of parallel electrodes and a second layer of a second set of parallel electrodes, wherein the second layer is offset from the first layer by a vertical distance, and wherein the second set of electrodes bisects the first set of electrodes. In this example implementation, each electrode in the first set of parallel electrodes and each electrode in the second set of parallel electrodes can define a plurality of conductive pads with one conductive pad in the first set of parallel electrodes and an adjacent conductive pad in the second set of parallel electrodes cooperate to define a sensing element. The conductive pads can be square, rectilinear, or of any other shape and patterned across the substrate 118, the tactile layer 110, a display adjacent the substrate 118, or any other component of the user interface 100 or associated device in a uniform distribution. Alternatively, the conductive pads can be patterned in a non-uniform distribution, such as with a greater conductive pad distribution proximal the deformable region 113 and a relatively lower conductive pad distribution proximal the peripheral region 115. Similarly, the conductive pads can be patterned in a non-uniform distribution with a greater total conductive pad surface area proximal the deformable region 113 and a relatively lower total conductive pad surface area proximal the peripheral region 115. In one example implementation, the sensor 140 includes a first sensing element and a second sensing element coupled to the substrate 118, wherein the first sensing element senses a capacitance value across a portion of the cavity 125 and the second sensing element senses a capacitance value across a portion of the peripheral region 115. For example, the first sensing element can sense capacitance values that include at least one of a charge voltage, a charge current, a charge time, a discharge time, and a transmit frequency across a first conductive pad and a second conductive pad arranged on the substrate 118 proximal the deformable region 113. However, the sensor 140 can include any other number of conductive pads patterned in any other way proximal the tactile surface 111 and configured to sense any other capacitance value in any other way.

Conductive pads (e.g., the first conductor) of the sensor 140 that is a capacitive touch sensor can be copper, micro- or nanowire, or a transparent conductor such as indium tin oxide (ITO). For example, the substrate 118 can be masked across both broad faces, and ITO can be sputtered across both broad faces to create perpendicular electrodes including a uniform or varying density of conductive pads. However, that conductive pads of the sensor 140 can include any type of conductive material (or conductive fluid).

Figure 14A:
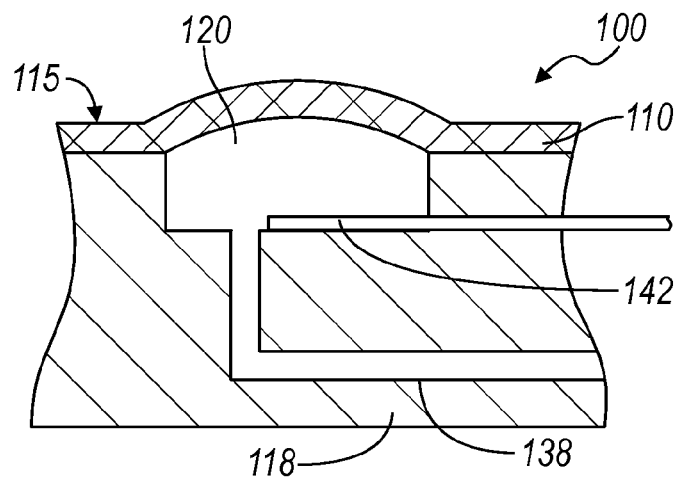

The sensor 140 that includes a capacitive touch sensor can further function to sense a height of the tactile surface 111 at the deformable region 113 in addition to the presence of a finger, stylus, or other implement on or adjacent the tactile surface 111. As shown in FIG. 14A, a first conductor (e.g., a first conductive pad) can be arranged within or adjacent the cavity 125 such that inward deformation of the deformable region 113 changes a height of the fluid within the cavity 125 relative to the first conductor, thereby affecting a capacitance sensed by the capacitive sensor. For example, the first conductor can be arranged on a bottom of the cavity 125 opposite the tactile surface 111, thereby enabling the capacitive sensor to sense height changes of the fluid as the deformable region 113 expands, retracts, and/or is inwardly deformed responsive to an input. Alternatively, the first conductor can be arranged on the within or on a back surface of the tactile layer 110 such that the first conductor deforms with the particular surface as the deformable region 113 expands, retracts, and/or is deformed by an input, thereby enabling detection of fluid height changes in the cavity 125. However, the first conductor can be arranged in any suitable location within or adjacent the cavity 125, the substrate 118, or the tactile layer 110.

Figure 14B:
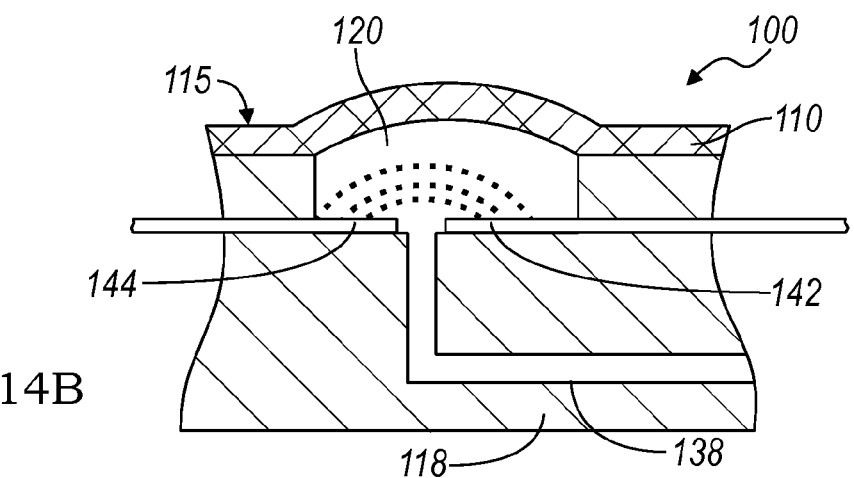

As shown in FIG. 14B, the capacitive touch can also include a second conductor arranged within the cavity 125.

The second conductor 144 can detect a change in capacitance across the first conductor and the second conductor 144 as an input is applied to the deformable region 113. For example, as a user inwardly deforms the deformable region 113, the amount of fluid and/or the height of the fluid in between the first conductor and the second conductor 144 can change, yielding a change in sensed capacitance between the first conductor and the second conductor 144. A gradient of height differences between the first conductor and the second conductor 144 can further yield a measurable change in the capacitance between the first conductor and the second conductor 144. For example, an input on the deformable region 113 can reduce a distance between the first and second conductors, thereby changing a capacitance reading by the second conductor 144. This change can facilitate determination of the location of an input relative to the geometry of the deformable region 113.

The second conductor 144 can be also sense height changes of the fluid in the region above the second conductor 144 in tandem with the first conductor to yield more local capacitive measurement of height changes within the cavity 125. Measuring local capacitive changes within the cavity 125 with two sensing elements can enable a relative height difference in the fluid to be measured. For example, when an input deforms the deformable region 113, the height of fluid over the first conductor can be different than a height of the fluid over the second conductor 144, resulting in a difference in a sensed capacitance value of the first conductor and a sensed capacitance value of the second conductor 144. Capacitance between the first conductor and a first portion of the second conductor 144 can also be compared to the capacitance between the first conductor and a second portion of the second conductor 144 to determine the relative difference in the height of the fluid. The relative difference in capacitance values between the two conductors can thus facilitate determination of the location of an input relative to the geometry of the deformable region 113. The first and second portions of the second conductor 144 can be continuous sections along the second conductor 144 but can alternatively be separated by a third portion of a different material from the first and second portions or a break in the second conductor 144. The second conductor 144 can also be identical to the first conductor in material and manufacturing process, though the first and second conductive pads can be of any other similar or dissimilar material, geometry, or arrangement.

As shown in FIG. 14C and FIG. 14D, the sensor 140 that includes a capacitive touch sensor can also include a third conductor and/or a fourth conductor. The third and/or fourth conductors can also be arranged proximal the deformable region 113 and thus enable more accurate input detection proximal the deformable region 113. For example, for the sensor 140 that includes four conductors proximal the deformable region 113 (shown in FIG. 14D), the deformable region 113 can be divided into a four-quadrant coordinate system through an X- and Y-axis with origin proximal the center of the deformable region 113. In this example, the location of an input relative to the geometry of the deformable region 113 can be measured in a variety of ways. In one example implementation shown in FIG. 15A, capacitance and/or relative capacitance between the first conductor and the third conductor 146 are measured to determine the location of an input along the X-axis, and capacitance and/or relative capacitance between the second conductor 144 and the fourth conductor 148 are measured to determine the location of an input along the Y-axis. Measured X-axis and Y-axis input locations can then be used to determine the location of an input within the four-quadrant coordinate system. In another example implementation shown in FIG. 15, three capacitance and/or relative capacitance values are measured, including between the first conductor and the second conductor 144, between the first conductor and the third conductor 146, and between the first conductor and the fourth conductor 148. The three capacitance values can then be used to determine the location of an input within the four-quadrant coordinate system (which can be superimposed over a "tridrant" coordinate system). However, the sensor 140 can include any other number of conductors proximal or remote the deformable region 113 to detect inputs proximal the deformable and/or peripheral regions in any other suitable way.

Figure 16A:
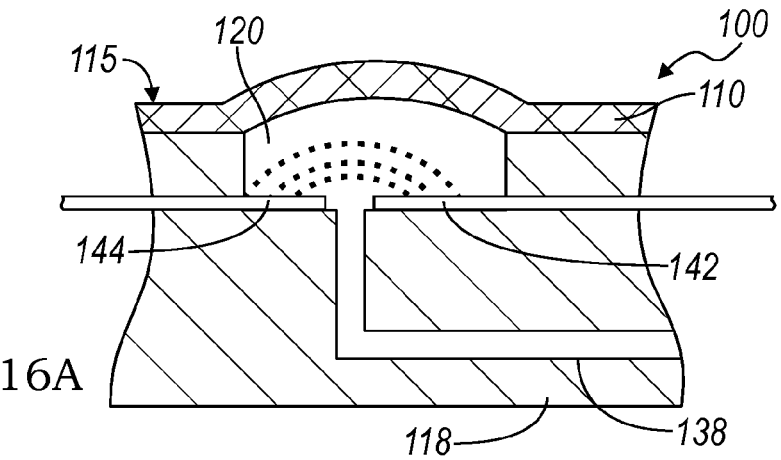
FIGS. 16A-16C are schematic representations of variations of the user interface.
Figure 16B:
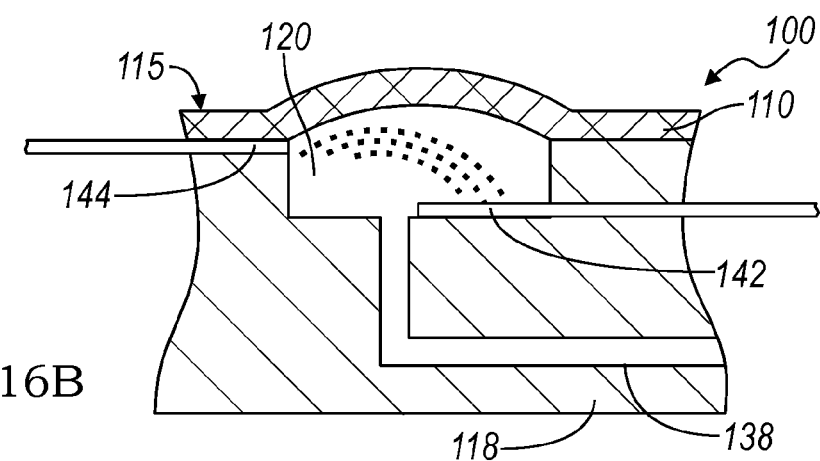
Figure 16C:
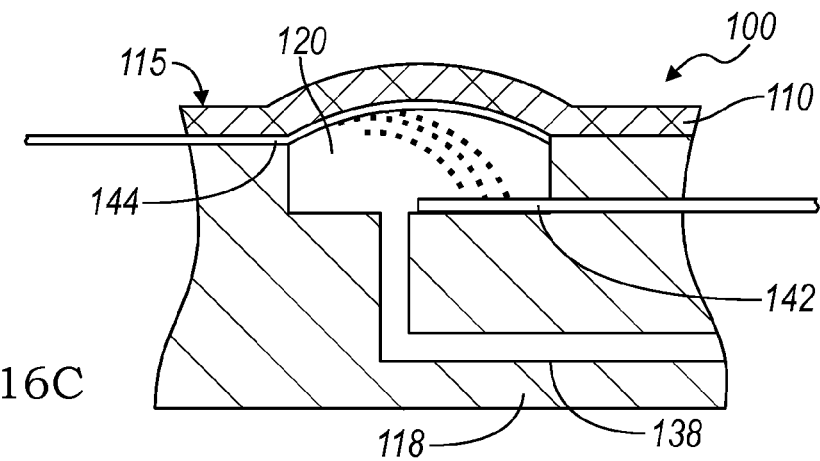

As shown in FIG. 16A, the first conductor the second conductor 144, third conductor, etc. can be arranged at a first level relative to the cavity 125. Alternatively, as shown in FIG. 16B, the first conductor can be arranged at a first level relative to the cavity 125 and the second conductor 144 can be arranged at a second level relative to the cavity 125. The third, fourth conductors, and/or any other suitable number of conductors can also be arranged at the second level or other levels relative to the cavity 125. Placement of the conductors within the cavity 125 at various heights relative to the cavity 125 can facilitate input location and magnitude detection. Additionally or alternatively, the first conductor can be arranged on or within the substrate 118 and the second conductor 144 can be arranged on or within the tactile layer 110, as shown in FIG. 16C. However, the sensor 140 can include any other combination or arrangement of conductors.

Figure 17A:
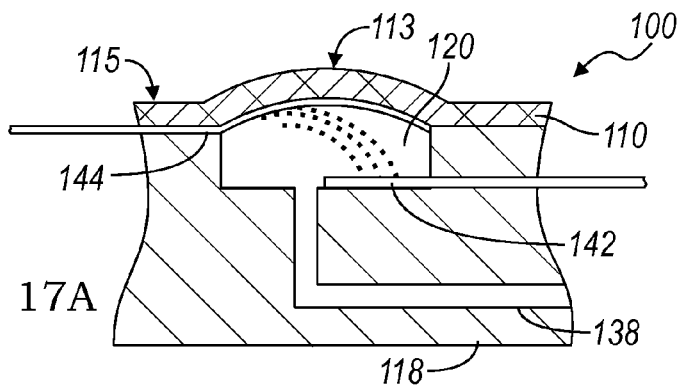
FIGS. 17A-17B are schematic representations of variations of the user interface.
Figure 17B:
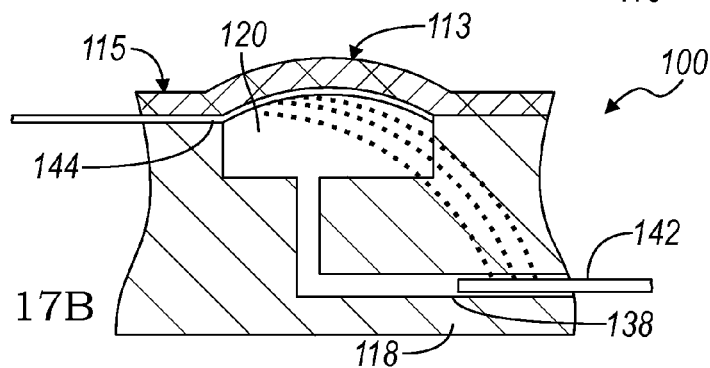
Figure 18A:
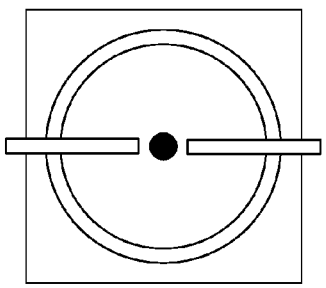
FIGS. 18A-18E are schematic representations of variations of the user interface.
Figure 18B:
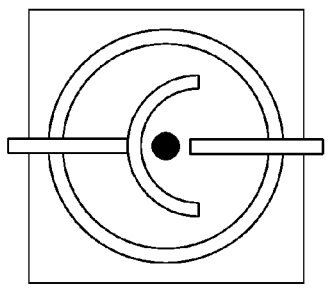
Figure 18C:
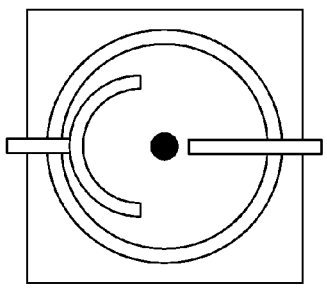
Figure 18D:
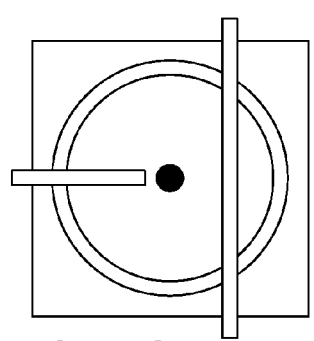
Figure 18E:
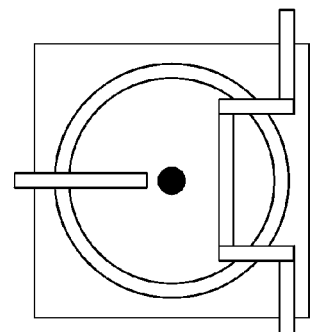
Figure 21A:
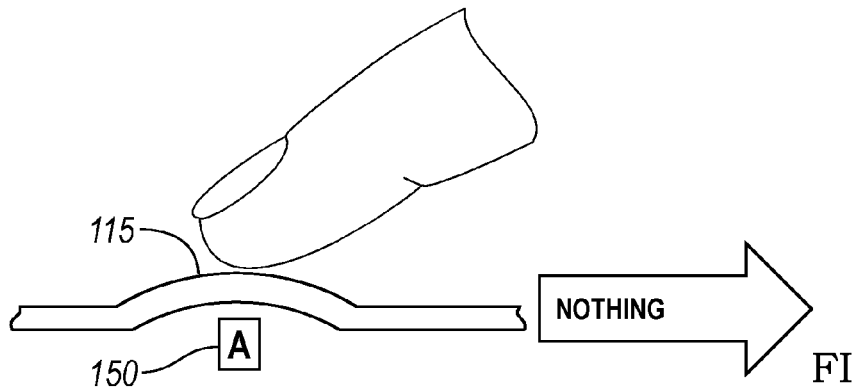
FIGS. 21A-21D are schematic representations of variations of the user interface.
Figure 21B:
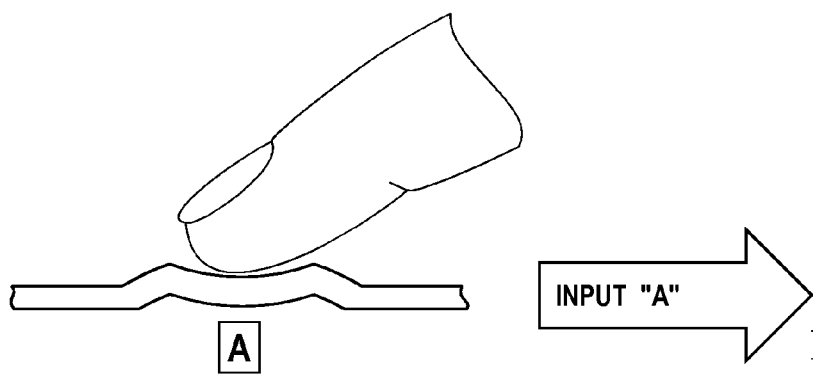
Figure 21C:
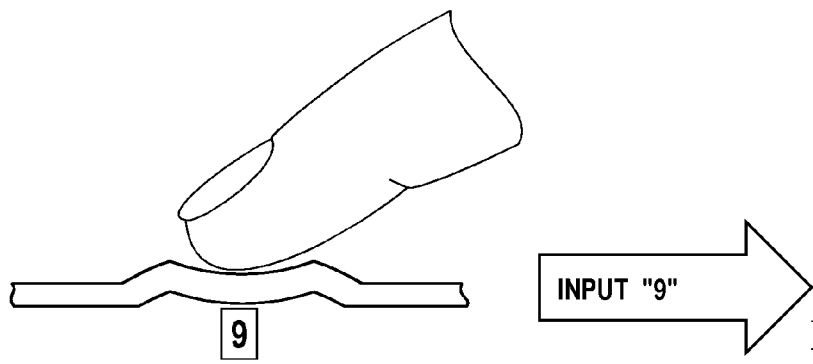
Figure 21D:
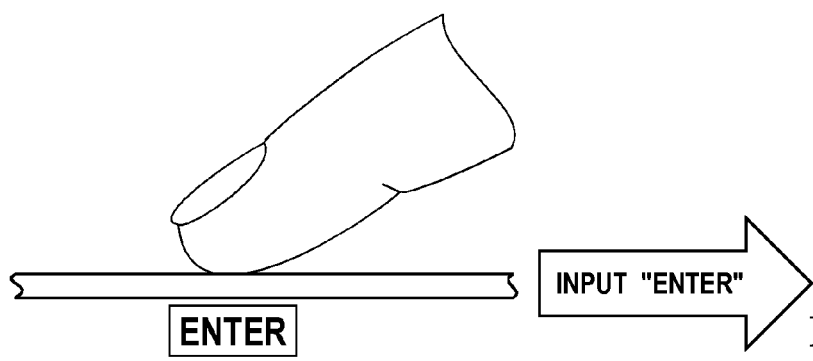

As shown in FIGS. 17A and 17B, the sensor 140 that includes a capacitive touch sensor can sense deformable region height changes through a first conductor and a second conductor. In this implementation, the first conductor can be arranged in a location that moves when a user inwardly deforms the deformable region 113 and the second conductor 144 can be arranged in a location that remains relatively stationary when the user inwardly deforms the deformable region 113. The second conductor 144 can also be arranged within the cavity 125, as shown in FIG. 17A, or in a relatively stationary location within the user interface 100, as shown in FIG. 17b. In this implementation, a change in the distance between the first and second conductors can change the measured capacitance between the first and second conductors, indicating an input. The first conductor can also be a flexible conductor such that the inward deformation of the deformable region 113 causes the first conductor to similarly deform. Movement of the first conductor can be detected by measuring a capacitance value between the first conductor and the second conductor 144 and a capacitance value between the first conductor and the third conductor 146. A difference between these capacitance values can thus indicate the location of an input relative to the deformable region 113. Alternatively, a capacitance value between the first conductor and a first portion of the second conductor 144 can also be compared to the capacitance value between the first conductor and a second portion of the second conductor 144 to determine the relative difference in the height of the fluid. A relative difference in capacitance values between the two conductors can thus facilitate determination of the location of an input relative to the deformable region 113. The second conductor 144 can be arranged near a perimeter of the deformable region 113, near a center of the deformable region 113, or in any other suitable location. Alternatively, as shown in FIGS. 18D and 18E, the second conductor 144 can be arranged perpendicular to the first conductor to enable deformations to be detected both along an axis of the first conductor and along an axis of the second conductor 144, thereby increasing sensor sensitivity.

As shown in FIG. 18, the sensor 140 that includes a capacitive touch sensor can therefore include multiple conductors, such as in the form of conductive pads patterned across the substrate 118, patterned across the tactile layer 110, and/or arranged on or within the cavity 125. As shown in FIG. 18A, the conductive pads can be of the same or similar size and/or shape. Alternatively, as shown in FIGS. 18B-18E, the conductive pads can be of different or dissimilar size, shape, and/or geometry, such as based on proximity to the deformable region 113. For example, one conductive pads can define a geometry that follows a geometry of the cavity 125 and/or the deformable region 113, as shown in FIGS. 18B and 18C. However, any suitable arrangement or geometry of the first and second conductors can be used.

Figure 24A:
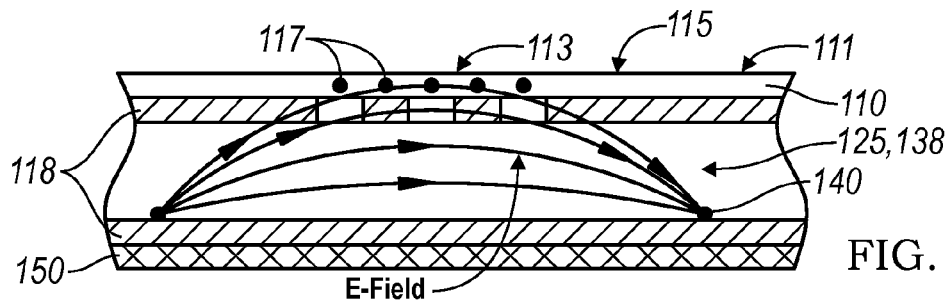
FIGS. 24A-24D are schematic representations of one variation of the user interface.
Figure 26:
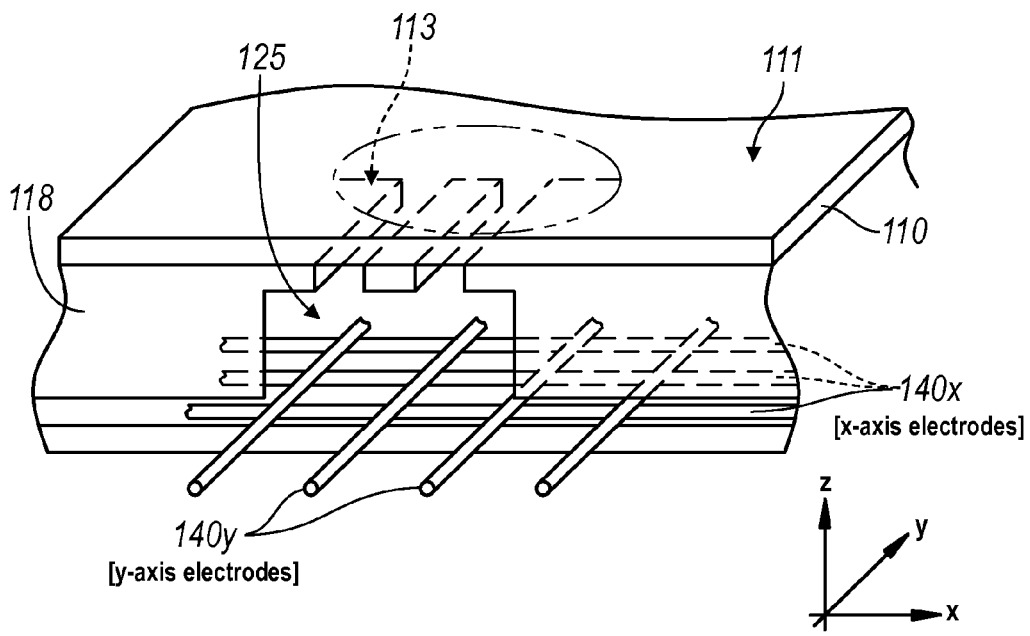
FIG. 26 is a schematic representation of one variation of the user interface.
Figure 27A:
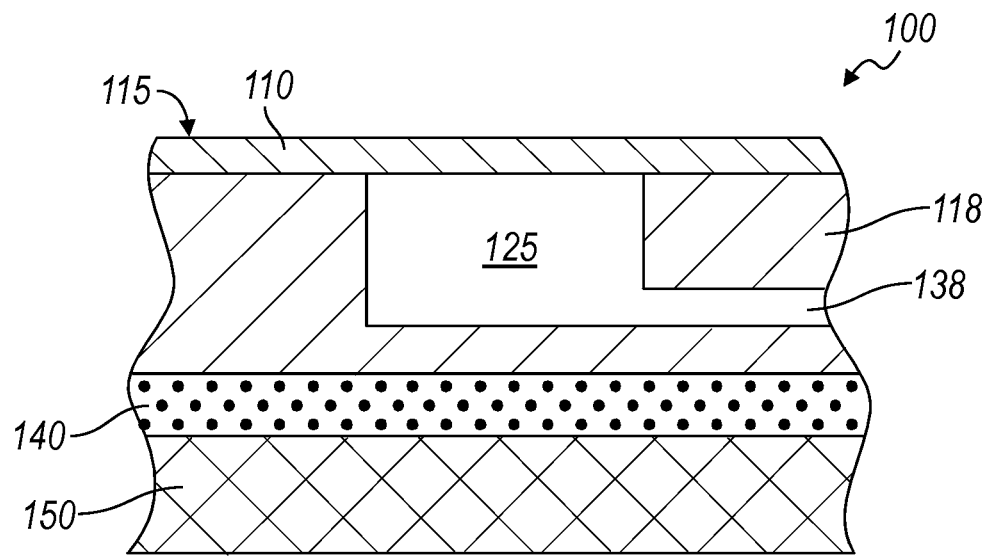
FIGS. 27A-27B are a schematic representation of one variation of the user interface.
Figure 27B:
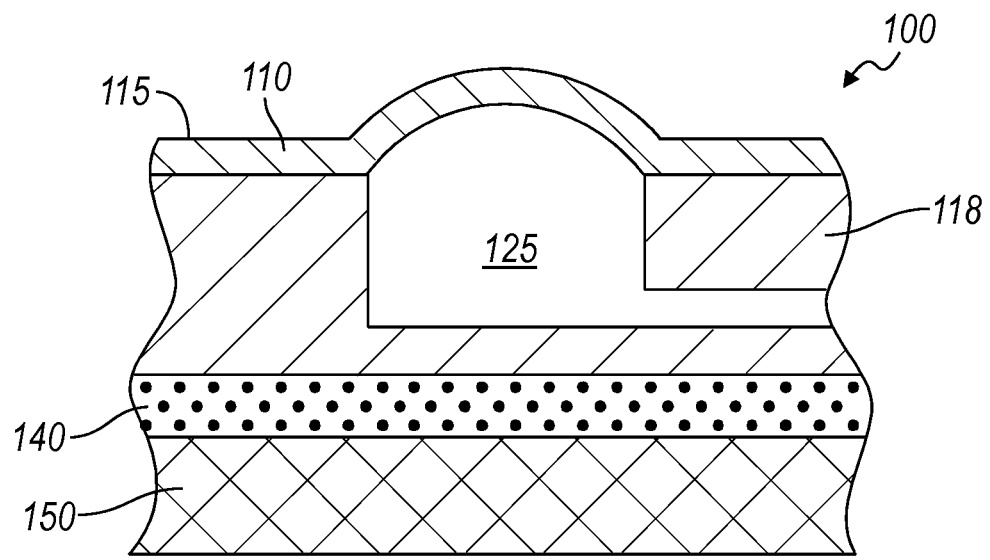

As described above, the sensor 140 can include a projected capacitance touch sensor including a first layer of a first set of parallel electrodes 140X and a second layer of a second set of parallel electrodes 140Y, wherein the second layer is offset from the first layer by some vertical distance, and wherein the second set of electrodes bisects the first set of electrodes, such as at a right angle, as shown in FIG. 26. In this implementation, the electrodes can be arranged below the tactile layer 110 and can be configured to generate an electric field that extends through the tactile layer 110, as shown in FIGS. 24A-24D. Generally, in this implementation, a field electrode (e.g., a first conductor) can generate the electric field and a paired sensor electrode (e.g., a second conductor) can detect the electric field through capacitive coupling, and the processor 160 can characterize changes in the magnitude of capacitive coupling between the field electrode and the paired sensor electrode as an input on the tactile surface 111. The electrodes can be arranged adjacent the substrate 118 opposite the tactile layer 110, arranged within the substrate 118 (e.g., within the fluid channel 138 and/or within the cavity 125, as shown in FIG. 24A), or arranged elsewhere within the user interface 100. The tactile layer 110 and/or volume of fluid can be of a dielectric different than that of air such that the tactile layer 110 and/or fluid can enhance penetration of the electric field through the cavity 125 and/or the tactile layer 110 in the expanded setting. Therefore, the fluid, tactile layer material, and/or substrate material can be selected based on magnetic and/or electrical properties thereof in order to optimize electric field distribution through the tactile layer 110 in the retracted and expanded settings. Additionally or alternatively, the sensor 140 can include a charge-transfer or surface capacitive touch sensor, wherein charge (i.e., electrons) are transferred between an electrode (e.g., a conductive pad) and a finger, stylus, or other touch implement that contacts the tactile layer 110. However, the sensor 140 can be any other suitable type of capacitive touch sensor.

Furthermore, as shown in FIGS. 24A-24D, the tactile layer 110 and/or the volume of fluid 120 can contain magnetic, metallic, or polarized elements or ions 117 that further focus the electric field through the cavity 125 and/or tactile layer, which can increase sensitivity of the sensor 140 to an input on the tactile surface 111 in the expanded setting. In one example, the volume of fluid 120 contains microscopic or nanoscopic metallic particles in solution. In another example, the tactile layer 110 includes a column that extends into the cavity 125 and that incorporates a magnetic, metallic, or polarized element or ion. In yet another example, the tactile layer 110 is substantially uniform in thickness and includes magnetic, metallic, or polarized elements or ions 117 implanted within the tactile layer 110. In this example, the magnetic, metallic, or polarized elements or ions 117 can be localized to the deformable region 113 as shown in FIG. 24A, distributed substantially uniformly across the tactile layer 110, or arranged within the tactile layer 110 in any other way. In still another example, the tactile layer 110 can include a magnetic, metallic, or polarized strip across at least one of the back surface of the tactile layer 110 and the tactile surface 111. However, magnetic, metallic, or polarized element or ion(s) can be arranged in another way within the user interface 100.

Figure 24B:
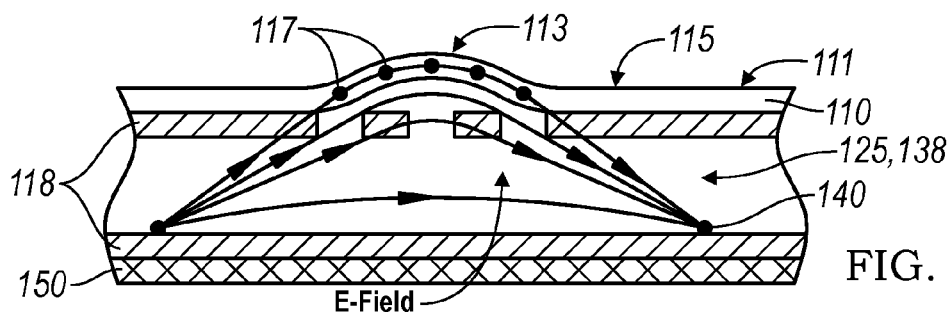
Figure 24C:
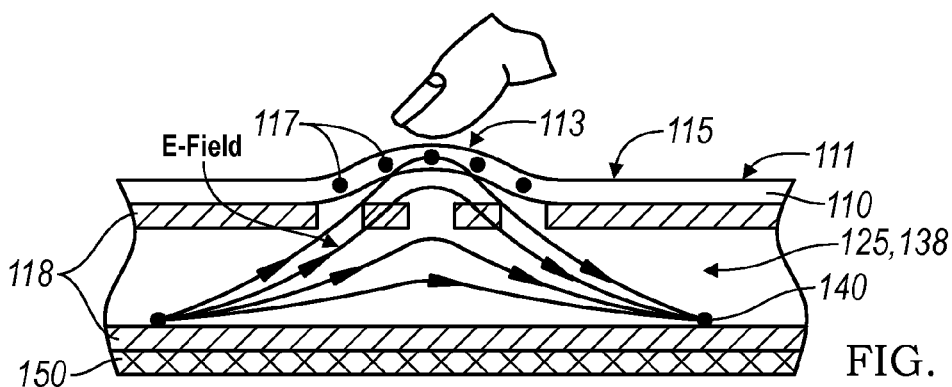
Figure 24D:
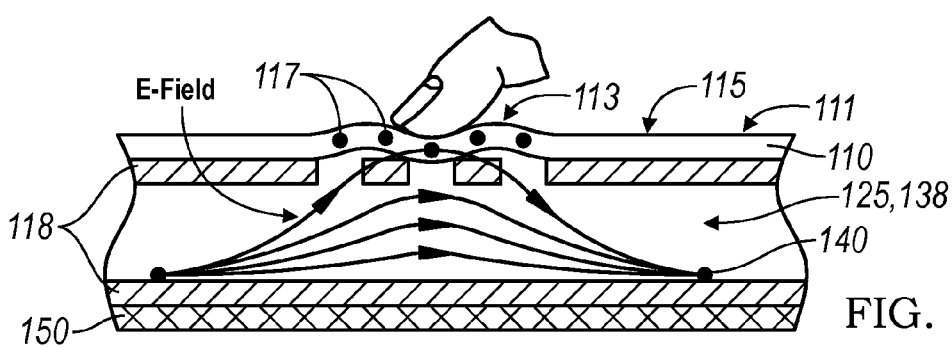

In one example implementation, the sensor 140 detects an input that is a change in electric field distribution through the tactile layer 110 due to the presence of a finger, stylus, or other touch implement proximal the tactile surface 111. For example, the sensor 140 can detect a change in electric field, such as depicted in FIGS. 24B and 24C. In another example implementation, the sensor 140 detects changes in the position of the tactile layer 110 as a magnetic, metallic, or polarized element or ion in the tactile layer 110 or the volume of fluid 120 disrupts the electric field distribution while moving through the electric field, such as depicted FIGS. 24A and 24B. In this example implementation, the sensor 140 can thus detects motion of the tactile layer 110 and/or the fluid rather than the presence of a finger, stylus, or other touch implement directly.

In an implementation in which the sensor 140 is a projected capacitance sensor, the sensor 140 can function in various modes. When the deformable region 113 is in the retracted setting, the sensor 140 operates in a first mode in by generating a substantially uniform electric field across the tactile layer 110. When the deformable region 113 is in the expanded setting, the sensor 140 can operate in a second mode by generating a non-uniform electric field across the tactile layer 110. In the second mode, capacitive coupling between sensor elements can be stronger proximal to the deformable region 113 but otherwise unchanged elsewhere across the tactile layer 110 between the first and second modes. For example, the magnitude of the electric field at the deformable region 113 can be increased, such as by increasing a voltage potential across two adjacent electrodes proximal the deformable region 113. Alternatively, the magnitude of the electric field at other portions of the tactile layer 110 can be decreased, which can reduce input sensitivity at the other portions of the tactile layer 110 while substantially maintaining input sensitivity at the deformable region 113. Similarly, the sensor 140 can withhold electric field generating at portions of the tactile layer 110 outside of the deformable region 113 such that inputs are only sensed at the deformable region 113.

In the foregoing implementation, the sensor 140 can operate in modes that are distinct, wherein each mode is associated with a particular vertical position or setting of the deformable region 113. Alternatively, the sensor 140 can operate in various modes that define a continuum of sensor settings for a continuum of deformable region positions between the fully-retracted setting and the fully-expanded setting. However, the sensor 140 that includes a projected capacitance sensor can function in any other way in the retracted and expanded settings. Furthermore, the sensor 140 can be any other suitable type of sensor.

The sensor 140 can also output a capacitance map (i.e., stored initial capacitance values and difference values) of capacitance values across the tactile surface 111. For example, the capacitance map can include data indicative of electric field distribution across all or a portion of the tactile surface 111. The position (i.e. X-Y coordinates) of an input on the tactile surface 111 can then be determined by analyzing the capacitance map (shown in see FIG. 26). The magnitude, rate, timing, etc. of the input can be similarly determined from the capacitance map, such as by comparing the capacitance map with a previous capacitance map. Generally, the processor 160 can analyze the capacitance map to ascertain a centroid (e.g., 'center of mass') of a change in the capacitance map and thus correlated the centroid of the change with an input. Therefore, any of the location, magnitude, timing, and/or rate of an input can be correlated with a capacitive map at one or more given times and/or correlated with a change or rate of change of the capacitive map over a given time period.

The sensor 140 can alternatively include a resistance sensor. Similar to the capacitive sensor, the resistance sensor can include at least two conductors and can function to sense a resistance between the two conductors. In one example, the two conductors can be arranged in two different locations within the cavity 125. The resistance between the two conductors can be of a first value in the retracted setting and of a second value in the expanded setting. Responsive to an input that inwardly deforms the deformable region 113, a resistance between the two conductors can adjust to a third value between the first and the second values. By reading this resistance value, the sensor 140 can detect an input, inward deformation of the expanded deformable region, and/or a degree of inward deformation of the deformable region 113.

The resistance sensor that spans the deformable region 113 and an adjacent non-deformable region can be uniformly sensitive. For example, a size and density of sensor electrodes can be constant throughout the sensor 140, such as across the substrate 118 and/or the tactile layer 110. Alternatively, the sensor 140 can exhibit non-uniform sensitivity, such as with varying electrode size and/or density. The sensor 140 can implement non-uniform sensitivity to enable detection of an input on the deformable region 113 in various settings. Generally, because an effective thickness of the tactile layer 110 at the deformable region 113 can be substantially greater in the expanded setting than in the retracted setting, an input on the tactile surface 111 at the deformable region 113 in the expanded setting can be dispersed across a larger area of the sensor 140, thus limiting a magnitude of a sensor signal at any particular electrode adjacent the deformable region 113, thus necessitating increased input sensitivity proximal the deformable region 113.

Additionally or alternatively, to limit dispersion of an input at the deformable region 113 across a broader sensor area, elasticity of the tactile layer 110 and/or substrate can be non-uniform. For example, the tactile layer 110 can be more elastic (i.e., flexible) proximal the center of the deformable region 113. In this example, the tactile layer 110 can be thinner in cross-section proximal the center of the deformable region 113 than proximal its perimeter. Alternatively, material properties of the tactile layer 110 can vary across the deformable region 113, the most elastic or flexible portion of the tactile layer 110 being proximal the center of the deformable region 113. In this implementation, the increased elasticity of a portion of the tactile layer 110 at the deformable region 113 can focus an input force across a smaller area of the sensor 140, thus increasing sensitivity to the input proximal the deformable region 113. Furthermore, varying elasticity of the tactile layer 110 can enable ordered activation of particular electrodes of the sensor 140, wherein the number or order of activated electrodes can indicate the magnitude of displacement of the deformable region 113 resulting from the input. Coupled with a time component, the number or order of activated electrodes can further suggest a rate of deformation of the deformable region 113 resulting from the input. However, the resistive sensor can function in any other way and the tactile layer 110 and substrate can be of any other geometry or material to enable the foregoing functionalities.

The sensor 140 can additionally or alternatively include a pressure sensor, as shown in FIG. 19A. In this implementation, the volume of fluid 120 can substantially fill the cavity 125 and can of a substantially compressible fluid and the cavity 125 can be sealed such that the pressure sensor can sense an increase in the pressure within cavity responsive to an inward deformation of the deformable region 113. The pressure sensor can be an absolute pressure sensor, a differential pressure sensor, or any other suitable type of pressure sensor. The pressure sensor can alternatively be a strain gauge mounted within and partially defining the cavity 125, which deforms responsive to inward deformation of the deformable region 113. The pressure sensor can, however, be of any suitable type configured to sense pressure change within the cavity 125 due to inward deformation of the deformable region 113.

As shown in FIG. 19B, the sensor 140 can additionally or alternatively include a flow sensor. The flow sensor can sense directional flow of the fluid responsive to an input on the deformable region 113. In this implementation, the cavity 125 can be coupled to a fluid channel. Responsive to inward deformation of the deformable region 113, the overall volume of the cavity 125 can decrease, forcing fluid out of the channel. The flow sensor can thus detect and/or sense the flow of the fluid through the fluid channel 138 to identify deformation of the deformable region 113 and/or the magnitude of deformation of the deformable region 113. The flow sensor can be fluidly coupled to the fluid channel 138. In one example, the channel can also include a valve that is normally closed to maintain a constant volume of fluid within the cavity 125. When there is inward deformation of the deformable region 113, the valve is opened, enabling backflow to the rest of the channel. The flow sensor can be a flow rate sensor that senses the flow rate of the fluid. The volume of fluid 120 that flows through the channel can be calculated from the known cross sectional area of the channel and the flow rate. For example, the valve and/or sensor can be arranged near the cavity 125, as shown in FIG. 19b, though the valve and/or sensor can be arranged in any other suitable location relative to the cavity 125. The pressure sensor can alternatively be a Hall effect sensor or any other type of sensor that senses opening of the valve due to backflow of fluid. However, the flow sensor can be any other type of fluid sensor configured to detect and/or sense flow of the fluid into and/or out of the cavity 125.

In one implementation, the volume fluid can include a fluid suspension or solution, such as including metallic, magnetic, polarized, or ionic particulate, and the sensor 140 can include one or more electrodes configured to sense fluid flow based on an interaction with the particulate. In one example, the fluid channel 138 is a microfluidic channel, wherein fluid flow through the fluid channel 138 is characterized by displacement of ion, wherein ions affect the electric field distribution around the fluid channel 138. The sensor 140 can detect changes in the electric field across the fluid channel 138, and the processor 160 can correlate electric field changes with inputs. In example, the sensor 140 includes electrodes arranged adjacent a portion of the fluid channel 138, wherein the electrodes track motion of ionized, polarized, and/or magnetic particulate passing through a portion of the fluid channel 138, and wherein the number or volume of particulate is indicative of fluid flow volume or rate, which can be correlated with an input. However, the sensor 140 that is a fluid flow sensor can function in any other way.

The sensor 140 can additionally or alternatively include a strain sensor configured to sense strain across the deformable region 113 of the tactile surface 111. By detecting a nominal strain across the deformable region 113 of the tactile surface 111 in the retracted setting and in the expanded setting, the strain sensor can identify when the deformable region 113 of the surface is depressed in the expanded setting. A plurality of strain sensors can also facilitate determining locations of inputs relative to the deformable region 113. Multiple strain sensors can be electrically coupled, such as on, under, or within the tactile layer 110.

Figure 13:
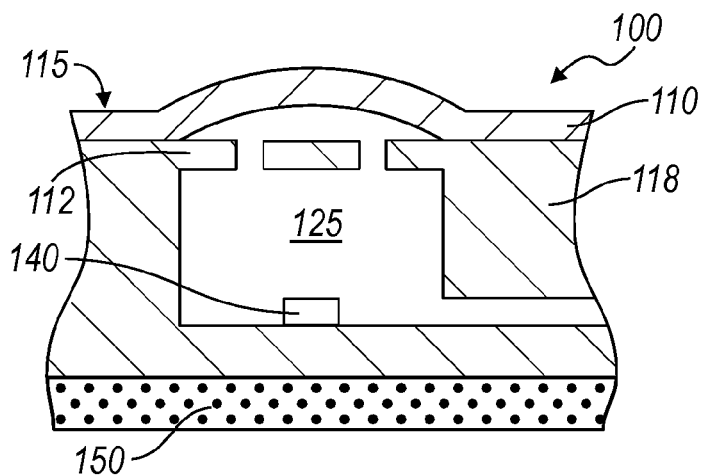
FIG. 13 is a schematic representation of one variation of the user interface in an expanded setting.

The sensor 140 can also include any number of capacitive, resistance, pressure, flow, and/or strain sensors to detect and/or verify inputs on the tactile surface 111. The sensor 140 can be arranged within or the substrate 118, a display, or the tactile layer 110, can be arranged between the substrate 118, display, and/or tactile layer, or arranged in whole or in part in or between any other component(s) of the user interface 100. Additionally or alternatively, all or a portion of the sensor 140 (e.g., electrodes for the sensor 140 that is a capacitive sensor) can be etched, printed, or otherwise fabricated directly on or within the tactile layer 110 or the substrate 118. Arrangement, form, or distribution of the sensor 140 or electrodes can also be matched or paired with the one or more deformable regions of the tactile layer 110, matched or paired with fluid channels in the substrate 118, matched or paired with a support member 112 (shown in FIG. 13) adjacent the deformable regions, matched or paired with cavities, or matched with any other feature or element of the user interface 100. For example, the sensor 140 can be orientated, aligned, or positioned relative to the deformable region 113, the cavity 125, the fluid channel 138, or any other feature or component of the user interface 100 in order to minimize an effect of the element on the electric field of output by the sensor 140 that includes a capacitive touch sensor. However, the sensor 140 can be of any other type, arrangement, form, or orientation.

One variation of the user interface 100 includes a display 150 coupled to the substrate 118 opposite the tactile layer 110 and configured to visually output an image through the tactile surface 111. The display 150 can function to display an image of a visual guide or an input key that is substantially aligned with the deformable region 113.

The processor 160 of the user interface 100 is configured to detect an input on the tactile surface 111 at the deformable region 113 in the retracted setting based on an output of the sensor 140 and a retracted setting sensor input threshold and to detect an input on the tactile surface 111 at the deformable region 113 in the expanded setting based on an output of the sensor 140 and an expanded setting sensor input threshold that differs from the retracted setting sensor input threshold.

The processor 160 can receive input data from the sensor 140 and control the displacement device 130 to transition the deformable region 113 between settings. For example, as shown in FIG. 20, the processor 160 can recognize a force of a first degree or magnitude applied by to the deformable region 113 as an input of a first type, and the processor 160 can recognize a force of a second degree or magnitude applied to the deformable region 113 as an input of a second type, wherein the second degree is less than the first degree. In this example, if an input of the second degree is the result of a user resting his or her finger on the deformable region 113, then the processor 160 can ignore inputs of the second type. The processor 160 can thus enable a user to rest a finger on portions of the tactile surface 111 without actuating an input by selectively ignoring inputs less than a threshold input value. Alternatively, if an input of the second degree is the result of a user lightly applying force to the deformable region 113, then the processor 160 can interpret an input of the second type as an input of a lower magnitude than an input of the first type. However, the processor 160 can implement any other suitable relationship between an input of the first type and the second type, and this relationship can be set or modified by a manufacturer, the processor 160, and/or a user. When the deformable region 113 is in the retracted setting, the processor 160 can recognize an input at the deformable region 113 in as an input of a third type that is distinguishable from an input of the first type and the second type. For example, the processor 160 can ignore an input of the third type. The processor 160 can also identify any degree of force applied to the deformable region 113 as any suitable type of input and response to the input accordingly.

The processor 160 can also function to detect the rate at which the user applies a force to the deformable region 113. When the deformable region 113 is in the expanded setting, the processor 160 can recognize a force applied at a first rate of change onto the deformed deformable region as an input of a first type. The processor 160 can recognize an applied force of a second rate of change on the deformed deformable region as an input of a second type, wherein the second rate is higher than the first rate. For example, the processor 160 can interpret an inward deformation of the deformable region 113 as a command to scroll through a webpage. When a force is applied at the first rate, the processor 160 can thus scroll through webpage at a first speed. When a force is applied at the second rate, the processor 160 can scroll through the website at a second speed, wherein the second speed is faster than the first speed. Thus, the sensor 140 and the processor 160 can determine a various types and magnitudes of inputs on the deformable region 113. However, the processor 160 can implement any other suitable relationship between an input of the first type and the second type. How the processor 160 handles a force applied to the deformable region 113 can be set or modified by a manufacturer, the processor 160, or a user. Furthermore, when the deformable region 113 is in the retracted setting, the processor 160 can recognize an input at the deformable region 113 as an input of a third type that is distinguishable from an input of the first type and the second type. For example, the processor 160 can ignore an input of the third type. However, the processor 160 can handle an input on the deformable region 113 in any other suitable way.

In one implementation, the processor 160 adjusts settings of the sensor 140 based on a vertical position of the deformable region 113. As described above, the processor 160 can modify the mode of the sensor 140 to adjust the magnitude and/or distribution of the electronic field across the tactile layer 110, such as proximal the deformable region 113. For example, for the sensor 140 that includes a first set of parallel electrodes and a second set of parallel electrodes perpendicular to the first set of parallel electrodes, the processor 160 can set a first drive voltage across a subset of sensor electrodes response to the deformable region 113 in the retracted setting and can set a second drive voltage across the subset of electrodes response to the deformable region 113 in the expanded setting. Additionally or alternatively, the processor 160 can shut down or turn off portions of the sensor 140 to eliminate signals from the portion of the sensor 140 associated with particular portions of the tactile surface 111 outside of one or more regions of interest. For example, when the deformable region 113 is in the expanded setting and is a designated as an input region adjacent a designated non-input region (e.g., 'dead zone'), a portion of the sensor 140 proximal the dead zone can be shut down and/or the magnitude of the electric field proximal the deformable region 113 increased. This can yield the benefit of improving a signal-to-noise ratio (SNR) of the system, wherein generation of sensor signals related to inputs on the tactile surface 111 are limited to specific input regions by modifying control or operation of the sensor 140. However, the processor 160 can implement similar functionality through signal analysis of sensor outputs.

In another implementation, the processor 160 ignores inputs at portions of the tactile surface 111 outside of specified input regions. For example, when the deformable region 113 is in the expanded setting and defines a specific input region, the processor 160 can accept inputs at the deformable region 113 but ignore inputs outside of the deformable region 113. Furthermore, in this example, a first portion of the tactile layer 110 can include a plurality of deformable regions, and the processor 160 can ignore inputs within the first portion and outside of the deformable regions but accept inputs across a second portion of the tactile layer 110 adjacent the first portion of the tactile layer 110. Therefore, input regions of the tactile layer 110 can be associated with discreet portions of the sensor 140 and/or discretized at the processor 160, such as for the sensor 140 with uniform sensing element distribution. This can yield the benefit of improving the SNR of the system, thus reducing Type I (false negative) and Type II (false positive) errors in input capture.

Figure 28A:
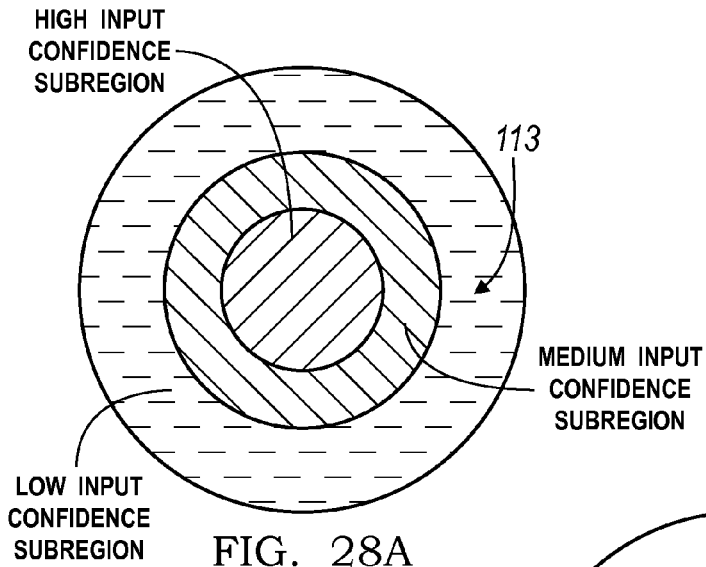
FIGS. 28A-28C are schematic representations of one variation of the user interface.
Figure 28B:
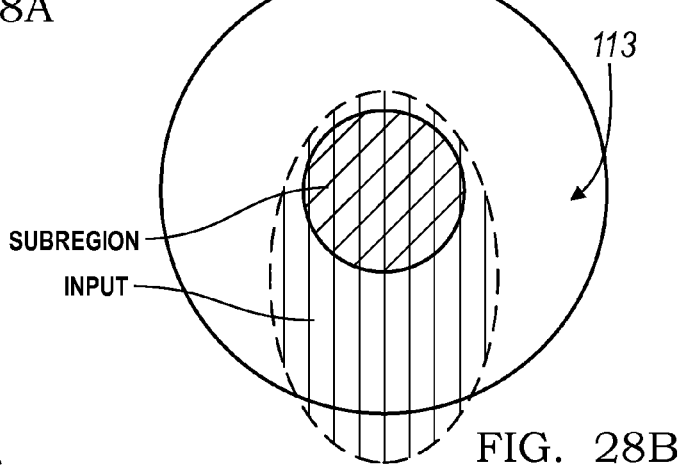
Figure 28C:
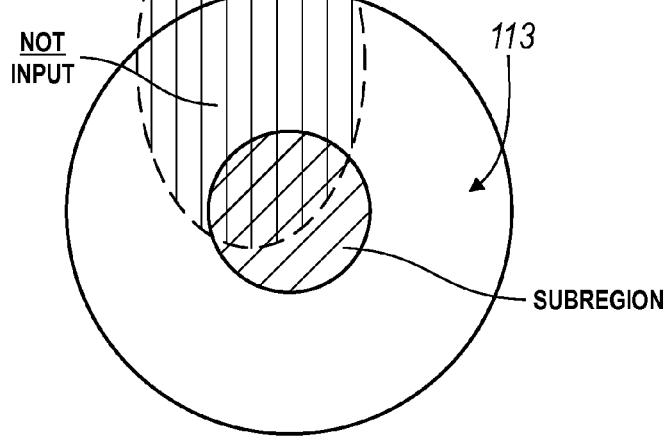

In the foregoing implementation and as shown in FIGS. 28A, 28B, and 28C, the processor 160 can accept inputs at a particular portion of the tactile surface 111 that is larger than or smaller than the deformable region 113. In one example, the processor 160 ignores inputs outside of a subregion of the deformable region 113. In this example, the subregion can be smaller in area and fully contained within the deformable region 113 such that an input must contact the subregion to register as an input despite appearance of the entire deformable region as an input region. Similarly, subregions of the tactile surface 111 can be associated with particular confidence levels for correlation with inputs. For example, as shown in FIG. 28A, a first subregion smaller in area than and centered over the deformable region 113 can require minimal contact area (or time) with a finger, stylus, or other input implement to qualify as an input, whereas a second subregion on a border of the deformable region 113 can require substantially greater contact area (or time) with a finger, stylus, or other input implement to qualify as an input, as compared with the first subregion. In yet another example and as shown in FIG. 28, due to a mode in which the electronic device is held by a user (e.g., with a left hand in portrait, with a right hand in landscape), the processor 160 can set a typical input contact profile to include an area proximal the center of the deformable region 113 and extending downward to substantially outside a perimeter of the deformable region 113, as shown in FIG. 28B. To distinguish between an input on a first deformable region A and on a second deformable region B below the first deformable region A, an input that contacts the tactile surface 111 proximal the center of a deformable region and extends below the deformable region 113 qualifies as an input on that deformable region (shown in FIG. 28B), whereas an input that contacts proximal the center of a deformable region but does not extend below the deformable region 113 does not qualify as an input on that deformable region (shown in FIG. 28C). However, the processor 160 can filter out inputs on any other portions of the tactile surface 111 according to any other rule or schema.

The processor 160 can additionally or alternatively modify a trigger threshold for an input on the tactile surface 111 at the deformable region 113 based on the position of the deformable region 113. For example, a convex curvature of the tactile surface 111 at the deformable region 113 in the expanded setting can result in a smaller contact patch for the finger, stylus, or other input device than when the finger, stylus, or other input device contacts the deformable region 113 in the retracted setting. Therefore, the processor 160 can set a lower input trigger threshold for the deformable region 113 in the expanded setting than in the retracted setting. In another example, the deformable region 113 in the expanded setting can distribute the electric field across the expanded tactile layer above the cavity 125, thus focusing the electric field distribution across the deformable region 113 and concentrating a capacitive gradient at the deformable region 113 when a finger, stylus, or other input device is proximal thereto. Therefore, the processor 160 can modify an input trigger threshold for the deformable region 113 based on a setting or height. In yet another example, the processor 160 can isolate inputs at specific locations on the tactile surface 111 when the deformable region 113 is in the retracted setting, and the processor 160 can isolate an input at a general location that is the deformable region 113 when the deformable region 113 is in the expanded setting. In this example, the deformable region 113 in the expanded setting can define a general input region in which the processor 160 qualifies any input substantially on any portion of the deformable region 113 as a proper input, and a specific location of an input can be substantially irrelevant once the input is determined to be on or proximal the general deformable region. This can yield the benefit of reducing requisite sensor resolution when the deformable region 113 is in the expanded setting. The processor 160 can also change noise cancellation, input sensitivity, or any other signal analysis schema according to a vertical position or X-Y location of the deformable region 113, a sensor mode, or any other relevant variable.

In the implementation described above in which the volume of fluid 120 and/or the tactile layer 110 includes a magnetic, metallic, or polarized element or ion, the processor 160 can isolate an input at the deformable region 113 based on disruption (e.g., modification) of an electric field across a portion of the cavity 125, the substrate 118, and/or the tactile layer 110 in response to motion of the magnetic, metallic, or polarized element or ion relative to the electric field. In this implementation, the processor 160 can record an input at the deformable region 113 over time, wherein deformation of the deformable region 113 over time informs the processor 160 of an input type. For example, a velocity of the input (a time-dependent quantity) can indicate a magnitude or speed of a desired function of an electronic device incorporating the system. Therefore, the processor 160 can associate dynamic changes to the position and/or shape of the deformable region 113 with particular input types and/or user commands based on a time, rate, or duration of an input.

In another example, the processor 160 can control and maintain a vertical position of the deformable region 113 by implementing closed-feedback loop to detect a vertical position of the deformable region 113 based on a sensor output and modify a vertical position of the deformable region 113 by controlling the displacement device 130, such as described above and shown in FIG. 25. Furthermore, the processor 160 can estimate a position of the deformable region 113 following an input, wherein the magnitude of inward deformation of the deformable region 113 (i.e. from the initial estimated position to a new estimated deformed position) informs a magnitude of a desired function of the electronic device. Therefore, the processor 160 can associate various magnitudes of deformation of the deformable region 113 with particular input types and/or user commands. Additionally or alternatively, the processor 160 can isolate an input at the deformable region 113 based on disruption of the magnetic field due to the presence of a finger, stylus, or other input device proximal the deformable region 113. However, the processor 160 can function in any other way to recognize an input at the tactile surface 111.

In another implementation, the sensor 140 includes two or more sensing elements, such as a capacitive touch sensor and a pressure sensor. In one example, the processor 160 determines a location of an input on the tactile surface 111 based on an output of the capacitive touch sensor, and the processor 160 determines the velocity and/or magnitude of the input based on an output of the pressure sensor. In another example, the processor 160 determines the location, magnitude, and/or velocity of an input on the tactile layer 110 based on an output of the capacitive touch sensor, and the processor 160 manipulates an output of the pressure sensor to verify the determined location, magnitude, and/or velocity of the input. However, the sensor 140 can include any other combination of sensor types, and the processor 160 can manipulate the output(s) of the sensor 140 in any other way to estimate and/or verify a location, magnitude, and/or velocity of an input.

The processor 160 can also compensate for changes in the effective thickness of the tactile layer 110 when correlating an output of the sensor 140 with an input on the tactile surface 111. The processor 160 can access a first setting when the deformable region 113 is in the retracted setting, a second setting with the deformable region 113 is in the expanded setting, any other number of settings dependent upon a state of any one or more other deformable regions, and/or any other number of settings dependent an "in-between" state of the deformable region 113. The processor 160 can additionally or alternatively access various settings for various types of input implements, such as a stylus or finger. Each setting can be defined by a different look-up table implemented by the processor 160 to isolate the location, magnitude, rate, etc. of an input, a different filter setting implemented by the processor 160 to reduce sensor output noise or ignore portions of the tactile surface 111, a different algorithm or correction coefficient implemented by the processor 160 to convert an output of the sensor 140 to a meaningful input location, magnitude, rate, etc. The setting(s) can be pre-set, such as at a factory, or can be learned, updated, and/or improved over time. For example, the processor 160 can implement supervised, semi-supervised, or unsupervised machine learning to tailor processor settings for an input style of a particular user. However, the processor 160 can function in any other way and implement any other algorithm, setting, machine learning, or process to correlate a sensor output with the location, magnitude, rate, etc. of an input. Additionally or alternatively and as described above, layer thickness change compensation can be performed at the sensor 140 level, such as by switching the sensor 140 between pre-configured settings or by adjusting sensor settings in real-time according to the position of the deformable region 113.

Figure 25:
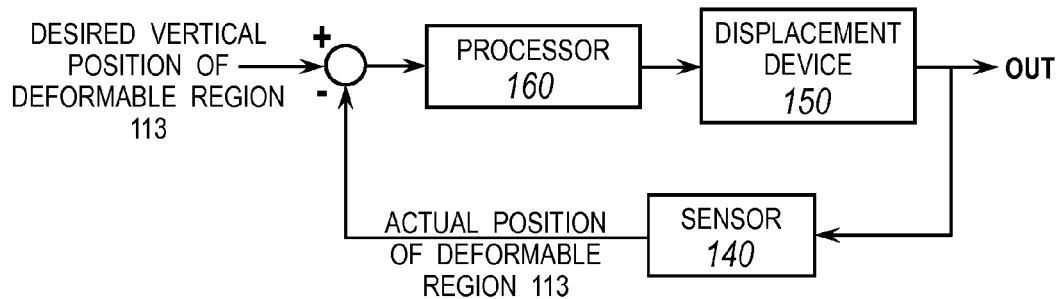
FIG. 25 is a flowchart representation of one variation of the user interface.

The processor 160 can also control the displacement device 130. As shown in FIG. 25, the processor 160 can implement a closed-feedback loop to control the displacement device 130 and vertical position of the deformable region 113 by interfacing with the sensor 140 and/or any other number of sensing elements. Generally, by accessing an output of the sensor 140, the processor 160 can estimate an actual vertical position of the deformable region 113 (i.e. the deformable region 113), which can be compared against a desired vertical position of the deformable region 113. The processor 160 can thus control the displacement device 130 to reduce a different between the actual (i.e., estimated) and desired vertical positions of the deformable region 113. In one implementation in which the sensor 140 is a capacitive touch sensor including electrodes that generate and sense changes in an electric field proximal the deformable region 113, as shown in FIG. 24A, the volume of fluid 120 and/or the tactile layer 110 can have dielectric constants differing from that of air such that each position of the deformable region 113 can be associated with a different electric field distribution proximal the deformable region 113. In another implementation in which the sensor 140 is a pressure sensor, the processor 160 can control displacement of fluid into the cavity 125 to maintain at a desired fluid pressure (e.g., relative to an ambient air pressure), wherein the desired fluid pressure is associated with a desired position of the deformable region 113. In this implementation, fluid pressure can also be correlated with temperature of the fluid and/or ambient air temperature proximal the system. In yet another implementation in which the sensor 140 is a strain sensor, each position of the deformable region 113 is associated with a particular strain (e.g., at or proximal the tactile surface 111). In still another implementation in which the sensor 140 is a resistive touch sensor, each position (or range of positions) of the deformable region 113 is associated with contact between a particular number and/or arrangement of sensor electrodes.

In a one example, in extremely low temperatures, it can be impossible or require excessive power consumption to transition the deformable region 113 between settings, and the processor 160 receive temperature data from a temperature sensor and thus disable the displacement device 130 under such temperature conditions. In another example, in high altitude conditions (or in an airplane with reduced air pressure), it can be impossible or require excessive power consumption to transition the deformable region 113 between settings, and the processor 160 receive ambient pressure data from a pressure sensor and can either disable the displacement device 130. Alternatively, in this example, the processor 160 can control the displacement device 130 to meet a specific pressure differential between measured ambient pressure and fluid pressure within the cavity 125. However, the sensor 140 can be any other type of sensor generating any other output, and the processor 160 can manipulate the sensor 140 output to create a closed-loop feedback system for regulating the position of the deformable region 113.

As shown in FIGS. 21A-21D, the processor 160 can also control various input graphics displayed on the display 150 proximal (e.g., under) the deformable region 113. For example, when the deformable region 113 is in the expanded setting (shown in FIG. 21A), the display 150 can output an input graphic of a first type (e.g., a letter) aligned with the deformable region 113, the sensor 140 can detect an input on the deformable region 113, and the processor 160 can identify an input associated with the input graphic (e.g., a command to input the letter). In this example, the display 150 can output an input graphic of a second type (e.g., a number) aligned with a second deformable region, the sensor 140 can detect an input on the second deformable region, and the processor 160 can identify an input associated with the second input graphic (e.g., a command to input the number). The display 150 can similarly output input graphics aligned with the deformable region 113 in the retracted setting and/or aligned with the peripheral region 115, and the processor 160 can associate inputs on deformable region and the peripheral region 115 with various input types based on input graphics output by the display 150.

The processor 160 can also function to alter an output of the display 150, such as to correct or adjust for optical distortion caused by deformation of the deformable region 113. For example, expansion of the deformable region 113 into the expanded setting can cause a "fish eye" effect for a user viewing the display 150. The processor 160, through empirical data, can thus adjust the output of the display 150 to accommodate (i.e., reduce) the fish eye effect.

The processor 160 can therefore include a touchscreen processing unit, a tactile processing, and a host processing unit. The touchscreen processing unit can be configured to control the display 150 and to detect inputs on the tactile surface 111 by interfacing with the sensor 140. The tactile processing unit can be configured to control the displacement device 130, such as by implementing closed-loop feedback controls to maintain a desired height of the deformable region 113. The host processing unit can be configured to implement a command based on inputs identified by the tactile processing unit. However, the processor 160 can include any other processing unit(s) and can function in any other way to an inputs on the tactile surface 111 of the deformable region 113.

As shown in FIG. 1, the substrate 118 can cooperate with the tactile layer 110 to further define a second cavity, and/or any number of additional cavities. The second and/or additional cavities can be substantially identical to the cavity 125 or differ mildly or significantly in construction, geometry, size, shape, etc. Each of the cavity 125 can be independently controlled to selectively transition various deformable regions between expanded, retracted, and intermediate settings, thereby enabling the user interface 100 to be adapted to a variety of user input scenarios. Alternatively, various cavities can be grouped, wherein groups of cavities outwardly deform together. For example, each cavity in a group of cavities can be assigned to one character in of a dial pad on a mobile phone or as an alphanumeric QWERTY keyboard. The processor 160 can thus selectively control expansion and retraction of the deformable region 113 associated with each cavity.

Figure 22:
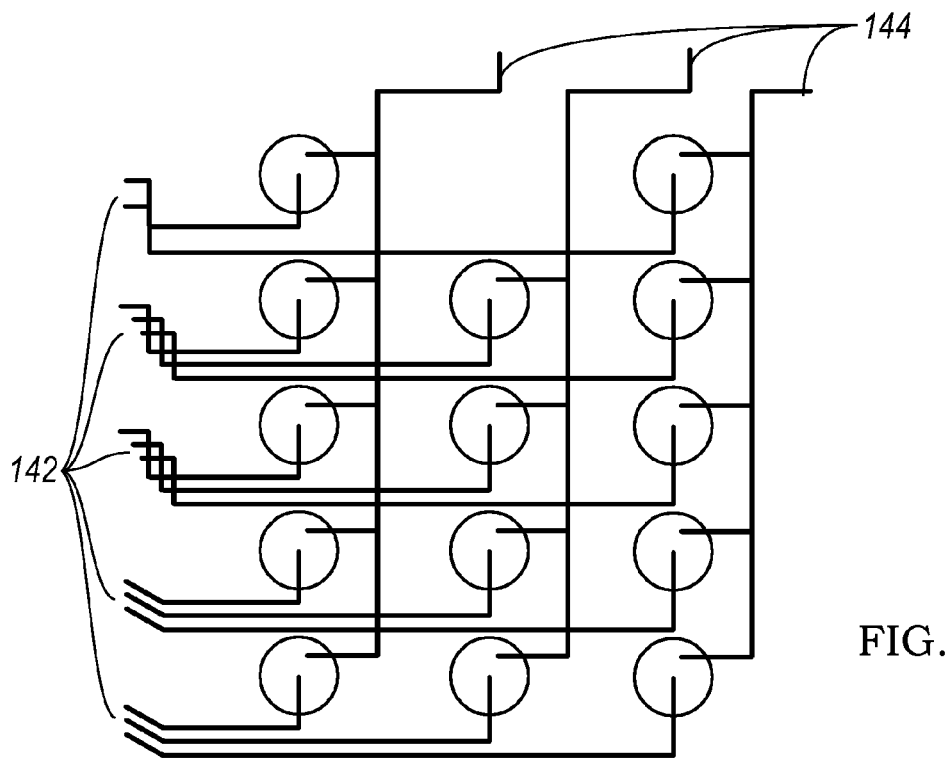
FIGS. 22 and 23 a are schematic representations of variations of the user interface.
Figure 23:
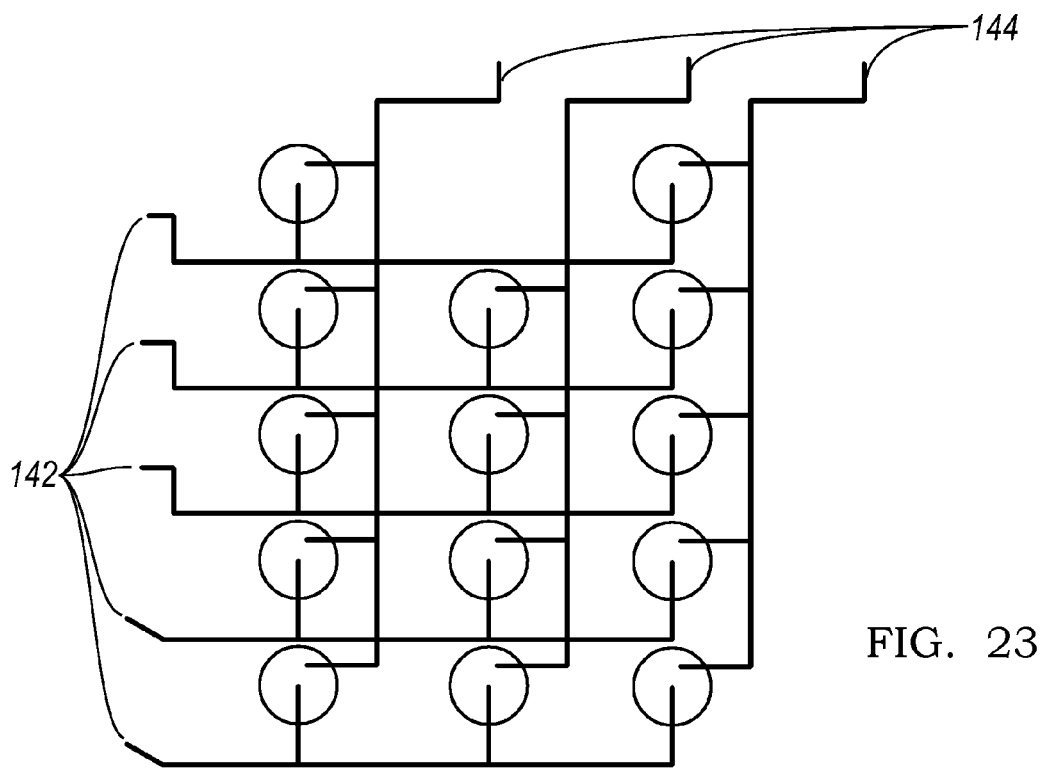

The processor 160 can also selectively receive and/or interpret sensor signals indicating inputs applied to select deformable regions. The sensing element corresponding to each cavity can be arranged in an array network that can communicates a location of the respective sensing element to the processor 160 to enable the processor 160 to selectively receive and/or interpret signals associated with each deformable region. In the implementation of the sensor 140 that is a capacitive touch sensor (shown in FIGS. 22 and 23), the sensor 140 can include an array of conductors including a first number of X-conductors and a second number of Y-conductors. For example, the first number of X-conductors can be equivalent to the number of cavities, wherein each X-conductor corresponds to one cavity, and the second number of Y-conductors can be equivalent to the number of columns of cavities, wherein each Y-conductor corresponds to all the cavities within one column of cavities. In this example, the location of an input can be determined by detecting a change in a sensed capacitance value between one X-conductor and the corresponding Y-conductor for a particular cavity. In this example, because each cavity is associated with one X-conductor, the processor 160 can detect the location of the cavity 125 over which the user applies a force. The processor 160 can similarly detect the location of the cavity 125 over which the user hovers (i.e., does not touch) a finger, styles, or other implement. The processor 160 can further interpolate a user touch on a peripheral region of the tactile surface (e.g., between deformable regions) by comparing sensed capacitance values across X-conductors and corresponding Y-conductors for two or more cavities.

In another example (shown in FIG. 23), the first number of X-conductors can be equivalent to the number of rows of cavities, wherein each X-conductor corresponds to all the cavities within one row of cavities, and the second number of Y-conductors can be equivalent to the number of columns of cavities, wherein each Y-conductor corresponds to all the cavities within one column of cavities. In this example, the location of an input can be determined by detecting a change in the sensed capacitance value between one X-conductor and one Y-conductor. Because each cavity corresponds to a different intersection of the X-conductors and the Y-conductors, the processor 160 can detect a location of a cavity corresponding to an input on the tactile surface 111. In yet another example, the first number of X-conductors and the second number of Y-conductors can be equivalent to the number of cavities with one X-conductor and one Y-conductor correspond to one cavity. In this example, the location of an input can be determined by detecting a change in a sensed capacitance value between one X-conductor and one Y-conductor, such as based on a previous sensed capacitance value stored in a previous capacitance map. Because each cavity corresponds to a different pair of the X-conductors and the Y-conductors, the processor 160 can thus detect a location of a cavity corresponding to a user input on the tactile surface 111.

Alternatively, the sensor 140 can include an array network of sensing elements, each sensing element in the array of sensing elements coupled to a cavity, wherein each sensing element outputs a signal specific to a corresponding cavity. For example, a sensing element corresponding to a first cavity can output a signal of 0.5 nF when an input is detected and a signal of 1 nF when no user input is detected, a sensing element corresponding to a second cavity can output a signal of 5 nF when an input is detected and a signal of 10 nF when no user input is detected, and a sensing element corresponding to a third cavity can output a signal of 50 nF when an input is detected and a signal 100 nF when no user input is detected, etc. Because each sensing element outputs a unique signal, the processor 160 can thus detect a location of an input based on the type and/or value of a signal received from various sensing elements. The sensing elements can also be arranged in a parallel relationship (e.g., such that the overall capacitance value for a plurality of capacitors in parallel equate to the sum of the individual capacitance values) to facilitate processor sensing element outputs to determine input location. For example, using the aforementioned example values for the signals from the sensing elements of a first, second, and third cavities, the processor 160 can receive a combined signal of 55.5 nF from the sensing elements when an input is detected from all of the first, second, third, and fourth cavities and a signal 111 nF from the sensing elements when no user input is detected from any of the first, second, third, and fourth cavities. When an input is detected from the third cavity and not from the first, second, and fourth cavities, then the combined signal to the processor 160 can be 61 nF. Similarly, when an input is detected from both the second and third cavities, then the combined signal to the processor 160 can be 56 nF. The processor 160 can thus interpret a locations of an input directly from a value of aggregated signals received from a various sensing elements adjacent various cavities. The sensing elements can also be arranged in series or in any other suitable electrical arrangement.

However, an input onto a first deformable region can affect sensor readings for a second deformable region. Therefore, the processor 160 can generate capacitance maps of sensing element outputs cyclically over time and compare new and previous capacitance maps to identify inputs on the tactile surface 111. For example, the processor 160 can map capacitive discharge times across a first set of electrically-coupled conductive pads in a longitudinal array (e.g., 144, FIG. 23) and a second set of electrically-coupled conductive pads in a lateral array (e.g., 142, FIG. 23) patterned across the substrate 118. In this example, the processor 160 can build a new capacitance map or modify an existing capacitance map at a frequency corresponding to a refresh rate of the sensor 140. During each sensing period, the processor 160 can record a first capacitance value and a second capacitance value, wherein the first capacitance value includes a capacitive discharge time between a first conductive pad in the first array and a first conductive pad in the second array proximal the cavity 125, and wherein the second capacitance value includes a capacitive discharge time between a second conductive pad in the first array and a second conductive pad in the second array proximal the peripheral region 115 (though the refresh rate of the sensor 140 can define a bound on a capacitive discharge time between conductive pads of a sensing element). The processor 160 can thus cyclically generate capacitance maps that include capacitive discharge times for sensing elements proximal the deformable region 113 in the retracted and expanded settings, the peripheral region 115, and/or any other region of the tactile layer 110 in suitable setting. The processor 160 can implement capacitance maps that additionally or alternatively include charge voltages, charge currents, charge times, electric field distribution, and/or transmit frequencies across two or more conductive pads.

As described above, the processor 160 can compare a most-recent capacitance map with previous capacitance map (e.g., generated one cycle prior to the most-recent capacitance map) to identify a change in a capacitive value between two or more conductive pads indicative of an input on the tactile surface 111. Alternatively, the processor 160 can select a stock or static capacitance map against which to compare a most-recent capacitance map to identify a capacitive value between two or more conductive pads indicative of an input on the tactile surface 111. For example, the processor 160 can select a stock capacitance map from a set of stock capacitance maps based on an estimated or measured vertical position of the deformable region 113 and/or an estimated or measured vertical position of one or more other deformable regions of the tactile layer 110, wherein each stock capacitance map is associated with a particular configuration of deformable region positions. The processor 160 can also select the stock capacitance map based on an ambient air temperature, an ambient or barometric pressure, or an ambient humidity, wherein each stock capacitance map is associated with a particular range of ambient air temperatures, an ambient or barometric pressures, or ambient humidities.

A type of input implement (e.g., a finger, a stylus) can similarly affect sensor readings for various deformable regions. The processor 160 can also predict an input mode (i.e., a type of input implement), select an input model based on the predicted input mode, and identify an input on the tactile surface 111 further based on an output of the input model corresponding to a difference between the capacitance map and a sensed capacitance value across a portion of the tactile surface 111 and/or the cavity 125. Alternatively, as described above, the processor 160 can select a stock capacitance map based on predicted input mode, wherein each stock capacitance map is associated with a particular type of input implemented.

Therefore, by collectively analyzing readings from multiple sensing elements, the processor 160 detect inputs on the tactile surface 111 at both the peripheral region 115 and the deformable region 113 in the retracted, expanded, and intermediate settings. The processor 160 can also cooperate with the sensing elements to identify multiple simultaneous inputs on the tactile surface 111, such as multiple time-dependent inputs of varying magnitude and/or rate. However, the processor 160 and the sensor 140 can function in any other way to detect one or more inputs on the tactile surface 111.

2. Tactile Touchscreen System:

A tactile touchscreen system includes: a user interface 143; a capacitive touchscreen (e.g., the sensor 140) coupled to the user interface 143 and including touchscreen electronics (e.g., the touchscreen processing unit) configured to detect a grounded conductive object proximal a tactile surface of the user interface.

The user interface can be a variation of the user interface 100 described above. In particular, the user interface can include a tactile layer with deformable regions ("tactile elements") that dynamically change shape to selectively define elevated surfaces above the touchscreen, thereby providing tactile feedback to a user. For example, the tactile touchscreen system can be applied to an electronic device to aid a user in tactilely discerning a button, slider, or scroll wheel that defines an input mechanism for the device. The tactile touchscreen system can also be applied to an electronic device to aid a user in tactilely discerning a condition of a system event of the electronic device, such as by elevating an area of the touchscreen surface to indicate that the device is on. The tactile touchscreen system can include a processor that functions as a host CPU to execute an operating system of the electronic device and low level software drivers that communicate to the system electronics (e.g., the user interface). The host CPU can also control operation of the tactile touchscreen system, such as vertical positions of various tactile elements.

The tactile touchscreen system can detect the presence of a grounded conductive object of a minimum pre-defined diameter that touches or comes into proximity with the tactile surface 111 of the user interface. The user interface includes one or more substrate layers (e.g., glass, PET film) with a transparent, translucent, or substantially-visually-imperceptible conductive material (e.g. ITO) deposited on one or more layers thereof in a pattern that defines multiple capacitive sensing elements. For example, a capacitive sensing element can be created on the substrate 118 with a transparent conductive material deposited on a single side of a substrate in a location of and in the same size as a tactile element. Alternatively, a capacitive sensing element can be defined by a transparent conductive film (e.g., indium-tungsten oxide, or 'ITO') including linearly-pattern canted (e.g., at 45 degrees) square pads rotated with abutting and connected corners thus forming chains of square pads across multiple rows on one layer of substrate and across multiple columns on a second layer of or alternate side of the substrate 118. In this example, the ITO film can define an X-Y grid pattern, wherein rows and columns of ITO pads overlap at intersections of adjacent pads. However, the transparent conductive material can be deposited across the substrate 118 in any other suitable pattern, such as a snowflake pattern.

Furthermore, in this example, the capacitive sensing elements can be pairs of individual squares, one in each row and column, despite the serial connections between pads in each row and in each column. For example, a sensor with ITO deposited in a 20×10 X-Y grid pattern using rows and columns of connecting squares can include 200 capacitive sensing elements but only necessitate thirty connections to a touchscreen processing unit (as described above), including one for each row and one for each column rather than 200 connections for each capacitive sensing element that is directly connected to the touchscreen processing unit. To connect the conductive pattern to the touchscreen processing unit, each row and column on the sensor 140 (e.g., tactile touchscreen) can be routed, such as around the boarder of the sensor 140 outside of the active area of the sensor 140 (shown in FIG. 29), to a common area at the edge of the sensor 140 substrate using silver ink, metal, or any other conductive material. A flexible printed circuit (FPC) can be bonded with conductive adhesive to this common area to connect the conductive sensor pattern to touchscreen processing unit. During operation of the sensor 140, the touchscreen processing unit can sense the capacitance of each capacitive sensing element, such as with a relaxation oscillator or with a switched capacitance front-end.

The number of capacitive sensing elements required to detect a touch through a tactile touchscreen system may be based on a requisite sensor resolution, a physical size of an active area of the capacitive sensing element, the size of a smallest conductive object to be detected, and/or the pattern of the conductive pads deposited on the substrate 118(*s*). The pattern of the conductive material deposited on the substrate 118 can be designed to detect a conductive object with a pre-defined size and/or shape, such as a person's finger that is ~7 mm in diameter. However, the pattern of the deposited conductive material can be configured to detect conductive objects of any other size or type, such as a stylus made of conductive material with a 2 mm tip. Generally, the surface area of the conductive material that defines the capacitive sensing element can also affect an ability of the sensor 140 (and/or tactile touchscreen electronics or the touchscreen processing unit) to accurately detect a grounded conductive object and to determine a touch location. Increasing the surface area of each capacitive sensing element may also increase sensitivity to a grounded conductive object, thus enabling detection of smaller objects, though this may reduce sensor resolution and/or reduce touch location accuracy. Alternatively, reducing surface area of a capacitive sensing element may increase sensor resolution and touch location accuracy but may reduce sensitivity of capacitive sensing elements to a grounded conductive object, thus limiting the size of the grounded conductive object that can be detected. For example, it may be desirable to detect only large fingers and ignore small fingers on the tactile surface 111. The surface area of each capacitive sensing element can therefore be sized to account for such system requirements.

Tactile elements of the user interface can define three-dimensional tactile elements in expanded settings. Fluid channels within the substrate 118 stack can communicate non-conductive fluid to the tactile elements to elevate the tactile surface ins of the tactile elements. When elevated, the tactile elements can define three-dimensional buttons, sliders, and/or scroll wheels. Each tactile element can also be of a common or unique shape, size, and/or elevated height above the tactile surface 111.

As described above, the height of a tactile element can be controlled. In one example, a tactile element is elevated to 25% of its maximum height and then shifted to 100% of its maximum height after some time period. In another example, a tactile element is initialized to 100% of its elevated height on system power up but slowly lowers to 0% elevation (i.e., flush with a peripheral region of the tactile surface 111) due to lack of user input within a certain period of time.

Areas of the tactile surface 111 can include materials of various physical properties that affect the ability of the tactile touchscreen system to detect a grounded conductive object in proximity to a capacitive sensing element. For example, a change in capacitance measured at a capacitive sensing element in response to a finger touching the tactile surface 111 of tactile element can be less than a change in capacitance measured when the finger depresses the tactile element. Therefore, capacitive sensing elements can be assigned to particular physical areas of the sensor 140 bounded by tactile elements.

Figure 30:
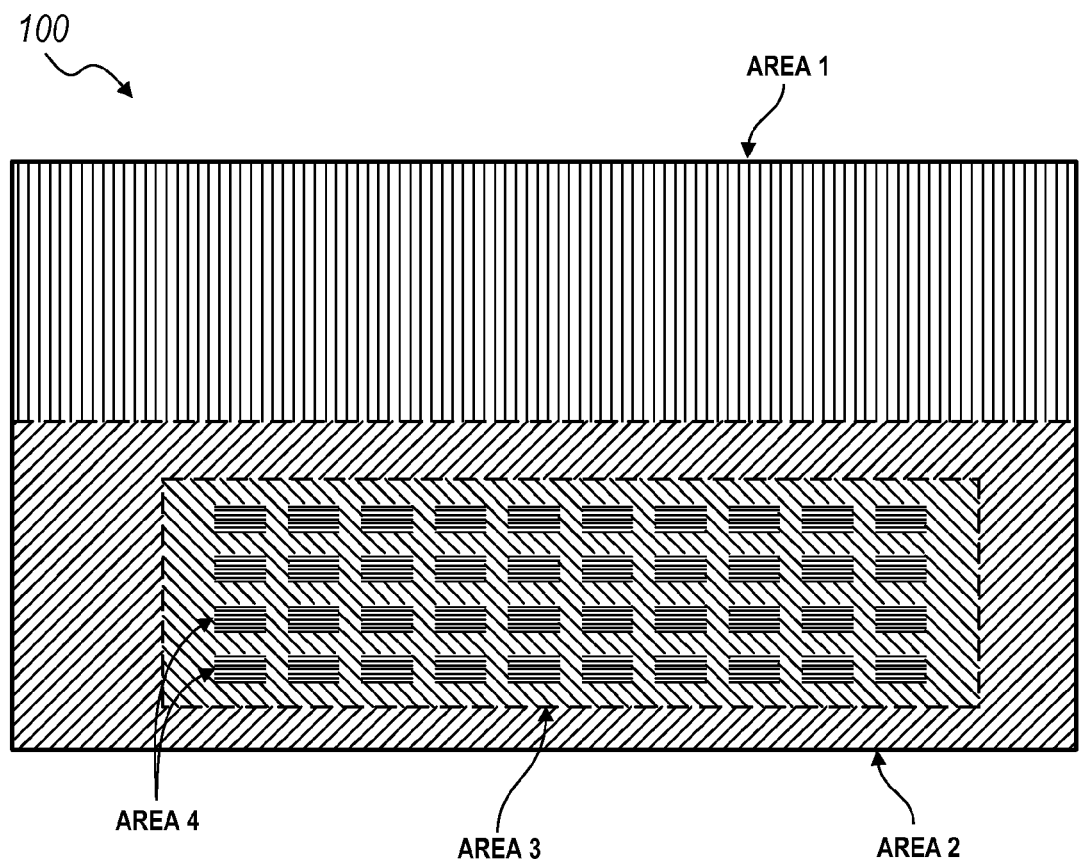
FIG. 30 is a schematic representation of one variation of the user interface.

In one example shown in FIG. 30, the sensor 140 can define an Area 1, an Area 2, an Area 3, an Area 4, and/or an Area 5. Area 1 can be defined as a sensor area without a user interface, wherein a capacitive sensing element is located within Area 1 if no user interface is attached to the sensor 140 adjacent a touch screen surface over the capacitive sensing element. Area 2 can be defined as a sensor area including a portion of the user interface that excludes routing channels or tactile elements, wherein a capacitive sensing element is located in Area 2 if a portion of the user interface without routing channels or tactile elements is adjacent (e.g., directly above) the surface of the capacitive sensing element. Area 3 can be defined as a sensor area including a portion of the user interface that includes routing channels containing (conductive or non-conductive) fluid but excluding tactile elements, wherein a capacitive sensing element is located in Area 3 if a portion of the user interface with routing channels and without tactile elements is adjacent the surface of the capacitive sensing element. Area 4 can be defined as a sensor area attached to the user interface that includes a tactile element in a retracted position; a capacitive sensing element is defined as located in Area 4 if the center of the area of the capacitive sensing element is substantially aligned with the center of a retracted tactile element or if the surface of the capacitive sensing element is substantially bounded by a border of the retracted tactile element. Area 5 can be defined as a sensor area attached to the user interface that includes a tactile element in an elevated (e.g., UP) position, wherein a capacitive sensing element is defined to be in Area 5 if the center of the surface of the capacitive sensing element is aligned with the center of an adjacent elevated tactile element or if the surface of the capacitive sensing element is completely bounded by the elevated tactile element.

Generally, the size of a tactile element can be smaller than, larger than, or equal to the surface area of an adjacent capacitive sensing element. The pitch (distance between the centers) of adjacent tactile elements can also be greater than the size of the smallest conductive object to be detected by the sensor 140. The center of the tactile element can be aligned with the center of its paired adjacent capacitive sensing element. For example, for a tactile element that is larger in surface area than its paired capacitive sensing element, a single tactile element that is 10 mm in diameter may be paired with and completely cover a 7 mm diameter capacitive sensing element. Alternatively, tactile elements can be paired with more than one capacitive sensing element, and the center of the tactile element can be aligned with the center of at least one capacitive sensing element. For example, as described above, the displacement device 130 can displace fluid into cavity to expand the cavity, thereby transitioning the deformable region into the expanded setting. In this example, the sensing element can include a first component arranged within or adjacent the cavity and second and third components coupled to the tactile layer proximal the deformable region such that the second and third components of the sensing element disperse (i.e., spread apart) when the deformable region expands into the expanded setting. This can increase an effective surface area of the sensing element, which can increase sensitivity of the sensing element to a grounded conductive object touching or proximal the tactile surface 111.

Furthermore, by adding an amount of transparent conductive material (e.g., ITO) to the back surface of the tactile layer 110 opposite the tactile surface 111 at the tactile element can further increase sensitivity of the capacitive sensing element. This can improve a capacitive sensing circuit 141's ability to detect fingers resting on a tactile element in the expanded setting.

In another implementation, the user interface contains a complex sensor that defines multiple unique sense locations capable of detecting a user input. For example, the complex sensor can define a scroll wheel, slider, rotary, or cursor control that requires user input at multiple different locations. The pitch (i.e., distance between centers) of these locations within the complex sensor can be greater than a size of the smallest conductive object to be detected by the sensor 140. For example, a cursor control tactile element can be in the shape of a plus ("+") sign with Up, Down, Left, and Right cursor control functions. In this example, the tactile touch screen system can distinguish between Up, Down, Left, or Right touches when the tactile "+" sign is elevated. The size of the "+" tactile element can be such that a pitch between the Up, Down, Left, or Right locations is not less than a size of the smallest conductive object to be detected by the tactile touch screen system. The sensing elements, such as sensing elements adjacent the slider element or scroll element, can detect both the height of a touch on the sensor 140 surface and a direction of motion of a touch across the sensor 140 surface, as described above.

Figure 29:
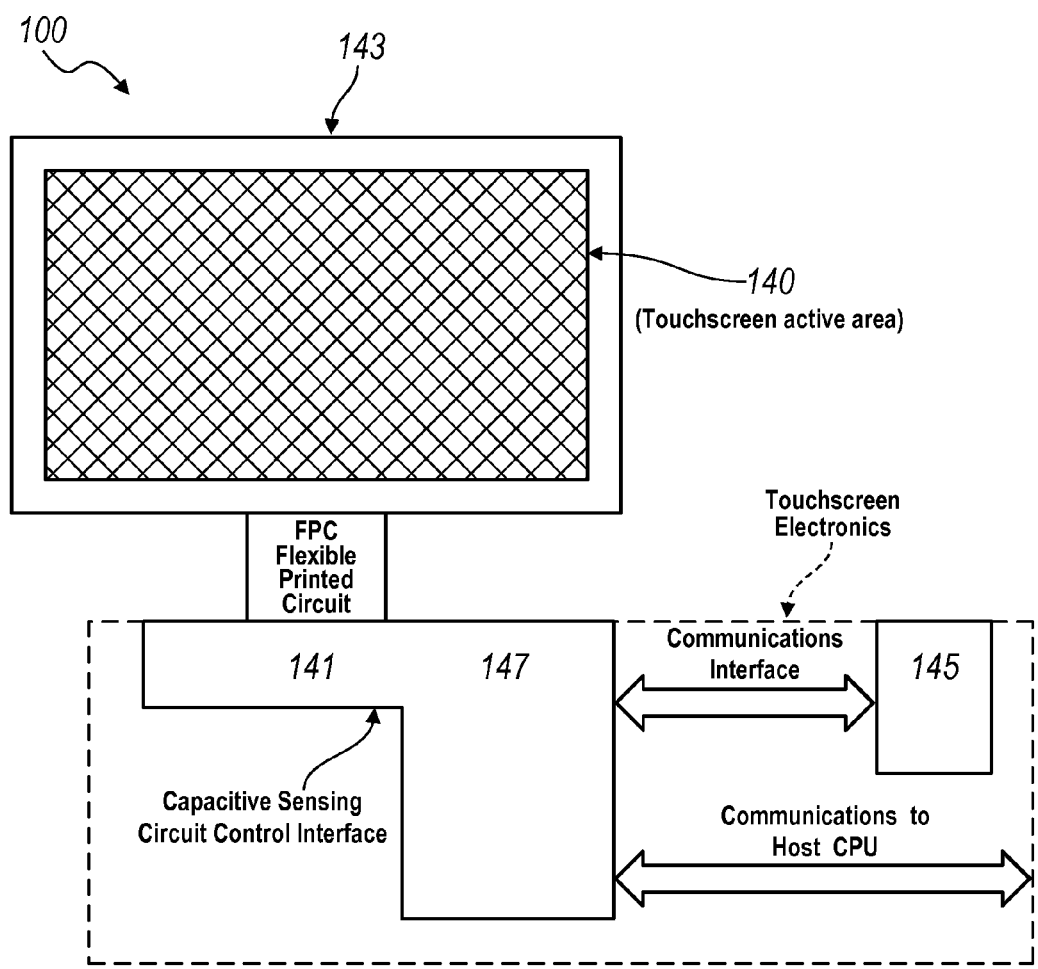
FIG. 29 is a graphical representation of one variation of the user interface.

3. Touchscreen Processing Unit:

As shown in FIG. 29, a tactile touchscreen processing unit includes: a capacitive sensing circuit 141 (e.g., the sensor 140), a tactile central processing unit (CPU) 145, and a touchscreen CPU 147. The tactile touchscreen processing unit can be implemented with multiple discrete components and/or combined into a single circuit component. The tactile touchscreen system can incorporate the touchscreen processing unit, and a host CPU can function as a main computer processor of the tactile touchscreen system that implements tactile elements. The host CPU can further calculate touch locations from data received from the tactile CPU 145. Also, the touchscreen CPU can integrate or combine one or more of the elements of the tactile CPU 145 and the host CPU.

The capacitive sensing circuit 141 can sense the capacitance of each capacitive sensing element (e.g., of the sensor 140). Each capacitive sensing element can include a unique capacitance measurement. Changes in operating environment of the tactile touchscreen system can change a capacitance value measured for each capacitive sensing element during a normal operating mode. For example, changes in the physical state of the conductive material that defines the capacitive sensing element pattern, environmental changes, or changes in the electrical properties within the tactile touchscreen system can cause changes in the capacitance measured by the capacitive sensing circuit 141. Furthermore, when a grounded conductive object makes contact or comes into proximity with capacitive sensing circuit 141, the grounded conductive object can impact a capacitance value sensed by the capacitive sensing circuit 141.

The capacitive sensing circuit 141 therefore can include adjustable circuit elements that are reconfigurable during a normal operating mode of the tactile touchscreen system to control operation of the tactile touchscreen. This can enable the tactile touchscreen processing unit to accurately sense capacitance values across capacitive sensing elements, such as dependent on a type of area assigned to each capacitive sensing element, a mode or position of an adjacent tactile element, or an operating mode of the tactile touchscreen system. Examples of adjustable circuit elements within the capacitive sensing circuit 141 include charge voltage, charge current, charge time, discharge time, and transmit frequency. In one example, a voltage or current used to charge a capacitive sensing element is adjusted. In another example, the amount of time to charge or discharge a voltage or current to or from a capacitive sensing element is adjusted.

A unique set of adjustable circuit element values can be associated with each or a subset of capacitive sensing elements. For example, a capacitive sensing element in Area 3 can be driven at a lower voltage or current than a capacitive sensing element in Area 5. Additionally or alternatively, a capacitive sensing element in Area 2 can require a different charge time than a second capacitive sensing element in the same Area 2. Depending on the Area in which a capacitive sensing element is located, the capacitive sensing element can be associated with more than one set of values for the adjustable circuit elements. For example, a capacitive sensing element adjacent a tactile element in the elevated position (i.e. in Area 5) can require greater charge voltage than when the tactile element is in the retracted position (i.e. Area 4). The set of values used to detect a touch on the user interface can therefore depend on a type of area assigned to a capacitive sensing element, a usage mode of a tactile element adjacent a capacitive sensing element, and/or an operating mode of the tactile touchscreen system.

In the tactile touchscreen processing unit, the touchscreen CPU 147 can control the capacitive sensing circuit 141 and the state of the user interface. Generally, the touchscreen CPU 147 can control the adjustable circuit elements of the capacitive sensing circuit 141 to sense the capacitance value of each capacitive sensing element, processes the data received from the capacitive sensing circuit 141, and calculates the location of any touch detected on the user interface and/or sensor surface. The touchscreen CPU 147 can communicate with the touchscreen CPU 147 and/or the tactile CPU 145 via a standard communication interface or protocol, such as i2C, USB, SPI, RF, digital I/O, or any other suitable interface or protocol.

In the tactile touchscreen processing unit, the touchscreen CPU 147 can further control a motor, pump, or other displacement device configured to displace fluid into the tactile elements to transition the tactile elements between elevated (UP), retracted (DOWN), and/or partially elevated (PE) states. For example, the touchscreen CPU 147 can transmit commands to the tactile CPU 145 to set the elements in the UP, DOWN, or partially elevated (PE) state. When in the PE state, the touchscreen CPU 147 can set the height of the tactile elements. The touchscreen CPU 147 can read the state of the tactile elements from the capacitive sensing circuit 141 and store the states in memory for subsequent transmission to the host CPU. The host CPU can then read the state of each tactile element from the touchscreen CPU 147, such as to calculate touch gestures or user events for system applications that implement a tactile feature. In some applications, the touchscreen CPU 147 can calculate gestures and user events for system applications and transmit this information to the host CPU.

The host CPU can be physically connected to the touchscreen CPU 147 via a standard communications interface such as i2C, USB, SPI, RF, or other user defined interface. In implementations in which the communications interface defines a master/slave communication protocol, the host CPU can be the master and the touchscreen CPU 147 can be the slave. The host CPU can control the operation of the touchscreen CPU 147. The host CPU can therefore also control the capacitive sensing circuit 141 and the tactile CPU 145 via the touchscreen CPU 147 by implementing commands sent over the communications interface. For example, the host CPU can notify the touchscreen CPU 147 when to initialize the tactile touchscreen system, reset the tactile touchscreen system to a default state or initial factory setting, or command the tactile touchscreen system to raise and lower the tactile elements. The host CPU can also retrieve, via a software command sent over the communications interface, the location of any one or more fingers or touches adjacent the capacitive sensing circuit 141 or tactile layer. The host CPU can additionally or alternatively retrieve the location of any finger or touch removed from adjacent the capacitive sensing circuit 141 or tactile layer that was previously reported as a touch. The host CPU can analyze finger location data to calculate a gesture, such as by comparing states of a tactile element over time to discern a user gesture on the user interface.

4. Tactile Element:

In the tactile touchscreen system, tactile elements can operate in any one or more of a binary mode, a binary with variable height control mode, a force mode, or a force with variable height mode.

In the binary mode, the height of an elevated tactile element is substantially static such that the tactile element can define a standard on/off pushbutton. For example, when in the UP state the tactile element can be considered "off," and when in the DOWN state the tactile element can be considered "on." During tuning of the capacitive sensing circuit 141, parameters for the adjustable circuit elements can be determined to enable accurate detection of a finger or grounded conductive object touching (or grazing) the tactile surface 111 of a tactile element, proximal but not touching the surface of a tactile element, or pressing down on the tactile element to a level greater than a threshold "on" level. These parameters can be stored in the touchscreen CPU memory.

In the binary mode with variable height control mode, a tactile element can implement two height modes (i.e., an expanded setting and a retracted setting) but with adjustable elevated tactile element height. For example, some applications can require the tactile element to be elevated to 50% of a maximum height while another application can require the button to be elevated to the maximum height. The host CPU can send data to the tactile CPU 145, via the touchscreen CPU 147, identifying the tactile element and indicating a desired height of the tactile element. The capacitive sensing circuit 141 can then forward this data to the tactile CPU 145, wherein the tactile CPU 145 raises or lowers the tactile element to the desired height based on data received from the capacitive sensing circuit 141. During tuning of the capacitive sensing circuit 141, parameters for the adjustable circuit elements can be determined that enable accurate detection of a finger or grounded conductive object proximal or touching the tactile surface 111 of a tactile element, not touching the surface of the tactile element, or pressing down on the tactile element to a level that is considered "on" for each pre-defined height in a set of predefined heights of the tactile element. These parameters can be stored in the touchscreen CPU 147 memory.

In the force mode, the height of an elevated tactile element can be static. However, the tactile touchscreen processing unit can also report a downward force applied by a finger or grounded conductive object to an elevated tactile element. During tuning of the capacitive sensing circuit 141, parameters for the adjustable circuit elements can be determined to enable accurate detection of a force that a finger or grounded conductive object exerts on an elevated tactile element.

In the force with variable height control mode, the tactile touchscreen processing unit can control the elevated height of a tactile element and report a downward force applied by a finger or grounded conductive object to the tactile element in the elevated position. The host CPU can send data, to the tactile touchscreen CPU 147, identifying the tactile element and indicating the desired height of the tactile element. The capacitive sensing circuit 141 can forward this data to the tactile CPU 145, wherein the tactile CPU 145 raises or lowers the tactile element to a desired height. During tuning of the capacitive sensing circuit 141, parameters for the adjustable circuit elements can be determined to enable accurate detection of the force applied by a finger or grounded conductive object to an elevated tactile element in each of a set of pre-defined heights. These parameters can be stored in memory of the tactile CPU 145.

In one example implementation, the tactile touchscreen processing unit tracks the magnitude of a force applied by a finger or grounded conductive object to an elevated tactile element. CapNorm is defined as a sensed capacitance value of a capacitive sensing element adjacent the center of a tactile element without a finger or grounded conductive object touching the tactile element. CapForce is defined as a sensed capacitance value of a capacitive sensing element adjacent the center of a tactile element when a finger or grounded conductive object touches or pressing down on the tactile element. TactileForce is defined as the difference between CapNorm and CapForce and is a sense of inward displacement of a tactile element from an expanded setting due to a force applied to the tactile element by a finger or grounded conductive object. TactileForce can be greatest when the tactile element is fully depressed and substantially less when a finger or grounded conductive object is lightly resting on the tactile element.

To detect a force applied to a tactile element by a finger or grounded conductive object during a normal operating mode of the tactile touchscreen system, reference values for TactileForce can be established after tuning the tactile touchscreen processing unit for capacitive sensing elements adjacent force-type tactile elements in Area 5. During tuning of the tactile touchscreen system, CapNorm and CapForce values can be measured at multiple (e.g., four) deflection distances for each tactile element. Pre-defined deflection distances can be substantially exact measurements of deflection distances or percentages of the maximum deflection distances, such as from 0-99%, wherein 99% deflection defines the tactile element as flush with the tactile surface 111 and wherein 0% deflection defines an instance of a finger or grounded conductive object lightly touching or resting on a tactile element. TactileForce can then be calculated for each deflection distance and subsequently associated with a tactile element deflection distance. Each TactileForce value and associated deflection distance can be stored in non-volatile memory of the touchscreen CPU 147 as TactileForcexx, wherein xx is the deflection percentage. During normal operation of the tactile touchscreen system, the touchscreen CPU 147 can calculate new TactileForce values and compare them to the saved TactileForce values to determine the deflection values for each tactile element. The deflection values can be used by the touchscreen CPU 147 or transmitted to the host CPU as required by a native application that uses tactile elements for user feedback or system control. For example, in a user interface that enables tactile element height control, the touchscreen CPU 147 can use deflection data from one tactile element to raise or lower the height of a second tactile element. In another example, the host CPU can use deflection data of a tactile element in an application that requires user feedback to control the brightness level of a color pallet used in a graphic arts application executing on a digital device incorporating the tactile touchscreen system.

5. Method for Tuning the Sensor:

When a (tactile) user interface is applied to a tactile touchscreen system, new conditions may exist that should to be accounted for when tuning the capacitive sensing circuit 141 for optimum sensitivity and when processing the capacitive touch data to determine the presence of a touch. For example, it may be important to distinguish between a finger resting on or applying a force to an elevated tactile button. In some applications, it may be further useful to discern how much force a finger or object is exerting on the surface of an elevated tactile element. Generally, the state of the tactile element may affect the capacitive sensing circuit 141, firmware running in the touchscreen CPU 147, the touchscreen CPU 147, and/or applications executing on the host CPU. The tactile touchscreen processing unit can account for these and/or other effects arising from the application of a user interface on a sensor. In the tactile touchscreen system and tactile touchscreen processing unit, capacitive sensing elements can be tuned for each state of each tactile element and each conductive object to be detected, which may be based at least in part on a mode of each tactile element (e.g., with paired capacitive sensing element).

Settings for the adjustable circuit elements of the capacitive sensing circuit 141 can be determined, set, and/or specified in various ways and with various techniques. For capacitive sensing elements located in Area 4 or in Area 5, the technique for tuning the capacitive sensing circuit 141 can include a first, second, third, fourth, and fifth steps, any of which can be implemented by a skilled operator and/or a machine.

In the first step, sense the capacitance value of the capacitive sensing element without any conductive object touching the tactile surface and not close enough to the tactile surface to minimally affect the capacitance value measured from the capacitive sensing element. Call this value CapValue1.

In the second step, sense the capacitance value with a grounded conductive object touching the tactile surface 111 directly above the specific capacitive sensing element. The size of the conductive object can be the size specified for system use. For example, if a person's finger is used for system input, use a solid metal slug that is the same diameter as the smallest finger the system is specified to detect. Call this value CapValue2.

In the third step, calculate the difference between CapValue1 and CapValue2. Call this value DiffCount.

In the fourth step, modify the adjustable circuit elements of the capacitive sensing circuit 141 and repeat steps 1-3 until DiffCount reaches its maximum value.

In the fifth step, store settings for the adjustable circuit elements of the capacitive sensing circuit 141 in memory of the touchscreen CPU 147. The touchscreen CPU 147 can retrieve the stored values during normal operation of the tactile touchscreen system depending on the state and operating mode of the capacitive sensing circuit 141.

6. Setting Initial Capacitive Sensing Element Conditions:

Prior to operating the tactile touchscreen system in the normal operating mode, the initial state of the capacitance values of each capacitive sensing element can be determined. Generally, initial capacitive sensing element capacitive values and finger difference counts can be stored in the touchscreen CPU 147 memory. This data can then be used by the touchscreen CPU 147 during normal operation of the capacitive sensing circuit 141 to determine if a touch is detected and the position of the touch:

The area of the capacitive sensing circuit 141 outside of the area where the user interface is attached is called TSA1. For each capacitive sensing element within TSA1, the capacitive sensing circuit 141 can sense the capacitance value without a finger or other conductive object touching any portion of the user interface or sensor surface and substantially remote from the user interface or sensor surface to minimally affect an electric field proximal the capacitive sensing element. The touchscreen CPU 147 can retrieve the capacitance value from the capacitive sensing circuit 141 and save this value in memory with the name CVxA1D, wherein x is the number of the specific capacitive sensing element. This capacitance value can be used by the touchscreen CPU 147 to determine if and where a touch has occurred in TSA1.

For each capacitive sensing element within TSA1, the capacitive sensing circuit 141 can sense the capacitance value with a finger or grounded conductive object of a specified minimum size that is touching the tactile surface adjacent a specific capacitive sensing element. The touchscreen CPU 147 can retrieve the capacitance value from the capacitive sensing circuit 141 and save this value in memory with the name FCVxA1, wherein x is the number of the specific capacitive sensing element. This capacitance value can be used by the touchscreen CPU 147 to determine if and where a touch has occurred in TSA1. If the tactile touchscreen system has been designed to detect grounded conductive objects of different sizes and dielectric materials, repeat this measurement for each specified object. Prior to each measurement, the touchscreen CPU 147 can initialize the configurable elements of the capacitive sensing circuit 141 with the values stored during tuning of each capacitive sensing element with the desired conductive object.

The touchscreen CPU 147 can calculate a difference between CVxA1 and FCVxA1 for each capacitive sensing element in TSA1. This value is the capacitive finger difference threshold and can be stored in the touchscreen CPU 147 memory as FDxA1, wherein x is the number of the specific capacitive sensing element. This value can represent the change in capacitance for the specific capacitive sensing element when a finger touches the tactile surface 111 adjacent the capacitive sensing element. This value can be used by the touchscreen CPU 147 to determine if and where a touch has occurred in TSA1.

The area of the capacitive sensing circuit 141 in which the user interface is attached that excludes routing channels or tactile elements is called TSA2. For each capacitive sensing element within TSA2, the capacitive sensing circuit 141 can sense the capacitance value without a finger or other conductive object touching any portion of the user interface or sensor surface and substantially remote from the user interface or sensor surface to minimally affect an electric field proximal the capacitive sensing element. The touchscreen CPU 147 can retrieve the capacitance value from the capacitive sensing circuit 141 and save this value in memory with the name CVxA2, wherein x is the number of the specific capacitive sensing element. This capacitance value can be used by the touchscreen CPU 147 to determine if and where a touch has occurred in TSA2.

For each capacitive sensing element within TSA2, the capacitive sensing circuit 141 can sense the capacitance value with a finger or grounded conductive object of a specified minimum size touching the tactile surface adjacent the specific capacitive sensing element. The touchscreen CPU 147 can retrieve the capacitance value from the capacitive sensing circuit 141 and save this value in memory with the name FCVxA2, wherein x is the number of the specific capacitive sensing element. This capacitance value can be used by the touchscreen CPU 147 to determine if and where a touch has occurred in TSA2.

The touchscreen CPU 147 can calculate the difference between CVxA2 and FCVxA2 for each capacitive sensing element in TSA2. This value is the capacitive finger difference threshold and can be stored in the touchscreen CPU 147 memory as FDxA2, wherein x is the number of the specific capacitive sensing element. This value can represent the change in capacitance measured for the capacitive sensing element when a finger touches the tactile surface 111 adjacent the capacitive sensing element. This value can be used by the touchscreen CPU 147 to determine if and where a touch has occurred in TSA2.

The area of the capacitive sensing circuit 141 attached to the user interface and including routing channels containing non-conductive fluid and no tactile element is called TSA3. For each capacitive sensing element within TSA3, the capacitive sensing circuit 141 can sense the capacitance value without a finger or other conductive object touching any portion of the user interface or sensor surface and substantially remote from the user interface or sensor surface to minimally affect an electric field proximal the capacitive sensing element. The touchscreen CPU 147 can retrieve the capacitance value from the capacitive sensing circuit 141 and save this value in memory with the name CVxA3, wherein x is the number of the specific capacitive sensing element. This capacitance value can be used by the touchscreen CPU 147 to determine if and where a touch has occurred in TSA3.

For each capacitive sensing element within TSA3, the capacitive sensing circuit 141 can sense the capacitance value with a finger or grounded conductive object of a specified minimum size touching the user interface adjacent the specific capacitive sensing element. The touchscreen CPU 147 can retrieve the capacitance value from the capacitive sensing circuit 141 and save this value in memory with the name FCVxA3, wherein x is the number of the specific capacitive sensing element. This capacitance value can be used by the touchscreen CPU 147 to determine if and where a touch has occurred in TSA3.

The touchscreen CPU 147 can calculate the difference between CVxA3 and FCVxA3 for each capacitive sensing element in TSA3. This value is the capacitive finger difference threshold and can be stored in the touchscreen CPU 147 as FDxA3, wherein x is the number of the specific capacitive sensing element. This value can represent the change in capacitance of the capacitive sensing element when a finger touches the user interface located above the capacitive sensing element. This value can be used by the touchscreen CPU 147 to determine if and where a touch has occurred in TSA3.

The area of the capacitive sensing circuit 141 attached to the user interface and including tactile elements in the retracted position is called TSA4. For each capacitive sensing element within TSA4, the capacitive sensing circuit 141 can sense the capacitance value without a finger or other conductive object touching the user interface or sensor surface and substantially remote from the user interface or sensor surface to minimally affect an electric field proximal the capacitive sensing element. The touchscreen CPU 147 can retrieve the capacitance value from the capacitive sensing circuit 141 and save this value in memory with the name CVxA4, wherein x is the number of the specific capacitive sensing element. This capacitance value is used by the touchscreen CPU 147 to determine if and where a touch has occurred in TSA4.

For each capacitive sensing element within TSA4, the capacitive sensing circuit 141 can sense the capacitive sensing element capacitance value with a finger or grounded conductive object of a specified minimum size touching the surface of a retracted tactile element adjacent the capacitive sensing element. The touchscreen CPU 147 can retrieve the capacitance value from the capacitive sensing circuit 141 and save this value in memory with the name FCVxA4, wherein x is the number of the specific capacitive sensing element. This capacitance value can be used by the touchscreen CPU 147 to determine if and where a touch has occurred in TSA4.

The touchscreen CPU 147 can calculate the difference between CVxA4 and FCVxA4 for each capacitive sensing element in TSA4. This value is the capacitive finger difference threshold and can be stored in the touchscreen CPU 147 memory as FDxA4, wherein x is the number of the specific capacitive sensing element. This value can represent the change in capacitance of the capacitive sensing element when a finger touches the surface of a retracted tactile element adjacent the capacitive sensing element. This value can be used by the touchscreen CPU 147 to determine if and where a touch has occurred in TSA4.

The area of the capacitive sensing circuit 141 attached to the user interface and including tactile elements in the elevated (UP) position is called TSA5. For each capacitive sensing element within TSA5, the capacitive sensing circuit 141 can sense the capacitance value without a finger or other conductive object touching the user interface or sensor surface and substantially remote from the user interface or sensor surface to minimally affect an electric field proximal the capacitive sensing element. The touchscreen CPU 147 can retrieve the capacitance value from the capacitive sensing circuit 141 and save this value in memory with the name CVxA5, wherein x is the number of the specific capacitive sensing element. This capacitance value can be used by the touchscreen CPU 147 to determine if and where a touch has occurred in TSA5.

For each capacitive sensing element within TSA5, the capacitive sensing circuit 141 can sense the capacitance value with a finger or grounded conductive object of a specified minimum size touching but not applying pressure to an elevated tactile element adjacent the capacitive sensing element. The touchscreen CPU 147 can retrieve the capacitance value from the capacitive sensing circuit 141 and save this value in memory with the name FRCVxA5, wherein x is the number of the specific capacitive sensing element. This capacitance value can be used by the touchscreen CPU 147 to determine if a finger is resting on the elevated tactile element and the location of the touch.

The touchscreen CPU 147 can calculate the difference between CVxA5 and FRCVxA5 for each capacitive sensing element in TSA5. This value is the capacitive finger difference threshold and can be stored in the touchscreen CPU 147 memory as FRDxA5, wherein x is the number of the specific capacitive sensing element. This value can represent the change in capacitance of the capacitive sensing element when a finger touches but does not depress the elevated tactile element (i.e. when the finger "rests" on the tactile element). This value can be used by the touchscreen CPU 147 to determine if a finger is resting on the tactile element in the UP position and the location of the touch.

For each capacitive sensing element within TSA5, the capacitive sensing circuit 141 can sense the capacitance value with a finger or grounded conductive object of a specified minimum size touching and depressing the tactile element into the tactile surface 111. The touchscreen CPU 147 can retrieve the capacitance value from the capacitive sensing circuit 141 and save this value in memory with the name FDCVxA5, wherein x is the number of the specific capacitive sensing element. This capacitance value can be used by the touchscreen CPU 147 to determine if a finger is depressing the tactile element in the UP position.

The touchscreen CPU 147 can calculate the difference between CVxA5 and FDCVxA5 for each capacitive sensing element in TSA5. This value is the capacitive finger difference threshold and can be stored in the touchscreen CPU 147 memory as FDDxA5, wherein x is the number of the specific capacitive sensing element. This value can represent the change in capacitance of the capacitive sensing element when a finger is pressing down on the tactile element in the UP position and can be used by the touchscreen CPU 147 to determine if a finger is pressing down on the tactile element in the UP position.

In applications, the state of the tactile elements can affect the capacitance measurements of capacitive sensing elements in Area 1, Area 2, and Area 3. Therefore, the foregoing methods or techniques can be repeated for tactile elements Area 1, Area 2, and Area 3 with the tactile elements in Area 5 elevated. These values can be stored in the touchscreen CPU 147 memory within a table labeled TactileUp_x, where x represents the Area where the capacitive sensing element is located.

7. Operation

After the electronic device including the tactile touchscreen system powers on, the host CPU can send a command to the touchscreen CPU 147 to initialize the tactile touchscreen system, such as to set the initial expanded and/or retracted settings of the tactile elements. The touchscreen CPU 147 can send a command to the touchscreen CPU 147 to raise or lower the tactile elements as directed by the host CPU. The touchscreen CPU 147 can control fluid displacement that raises and lowers the tactile elements. The capacitive sensing circuit 141 can communicate with the touchscreen CPU 147 via various communication methods, such as i2C interface, serial interface, SPI, or digital I/O. The touchscreen CPU 147 can communicate the state of the tactile elements (e.g., expanded, retracted) to the capacitive sensing circuit 141. The capacitive sensing circuit 141 can use the state of the tactile elements to select an area of the capacitive sensing circuit 141 to scan when processing sensor data (e.g., determining the presence and/or location of a touch or depression on an elevated tactile element).

The touchscreen CPU 147 can set initial conditions for sensing elements (e.g., programmable sensing elements) of the capacitive sensing circuit 141 used by the capacitive sensing circuit 141 to sense the capacitance values of each capacitive sensing element. Under a normal operating mode and dependent on the state of the tactile elements, the capacitive sensing circuit 141 can adjust the circuit elements to control sensitivity of the capacitive sensing electronics used to sense capacitive sensing element capacitance values. These circuit elements can include voltage and current driven onto the capacitive sensing elements, scan time of each capacitive sensing element, or reference voltage used by analog and/or digital electronics of the capacitive sensing circuit 141. These adjustments can change the sensitivity, signal-to-noise ratio, and/or scan time of the capacitive sensing circuit 141 for certain physical and/or environmental conditions that may impact system performance during the normal operation of the tactile touchscreen system.

The touchscreen CPU 147 can send a command to the capacitive sensing circuit 141 to scan capacitive values of the capacitive sensing elements on the capacitive sensing circuit 141. Capacitive sensing elements located in Area 4 can be only scanned when the tactile elements are in the DOWN position and capacitive sensing elements located in Area 5 can be only scanned when the tactile elements are in the UP position. The capacitive sensing circuit 141 can halt operation once every capacitive sensing element in the active sensor area of the sensor 140 has been scanned. After the capacitive sensing circuit 141 completes the scan of each capacitive sensing element in the sensor 140, the capacitive sensing circuit 141 can retrieve the capacitance value from the capacitive sensing circuit 141 and process the data. During this data processing stage, the capacitive sensing element capacitive value can be filtered (e.g. compared with previously-saved capacitance values) by the capacitive sensing circuit 141 to remove electrical noise, detect ESD events, and/or adjust for temperature effects or other physical conditions that impact sensor performance. This can result in a new capacitance value for each capacitive sensing element. The capacitive sensing circuit 141 can save the new capacitive sensing element capacitive value in memory with the name New_CVxAy, wherein x is the capacitive sensing element number and y is the capacitive sensing circuit 141 area in which the capacitive sensing element is located. Since the capacitive sensing circuit 141 can compare the new capacitive sensing element capacitance value with the capacitance value stored in memory from the previous scan, the capacitive sensing circuit 141 can scan sensor Area 4 and Area 5 twice after changing the state of the tactile element.

In one example implementation, the capacitive sensing circuit 141 determines the presence of finger touches on the capacitive sensing circuit 141 by calculating the difference between NewCVxAy and CVxAy. This result can be stored as DIFFCVxAy, wherein x is the capacitive sensing element number and y is the capacitive sensing circuit area where a capacitive sensing element is located. The capacitive sensing circuit 141 can then determine that a touch exists for a specific capacitive sensing element in Area 1, Area 2, or Area 3 if DIFFCVxAy is greater than or equal to the capacitive finger difference threshold, previously stored in memory as FDxA1, FDxA2, FDxA3, for the capacitive sensing element. The capacitive sensing circuit 141 can alternatively determine that a touch exists for any capacitive sensing element in Area 4 if the tactile element is in the DOWN state and if DIFFCVxA4 is greater than FDxA4, wherein x is the capacitive sensing element number. The capacitive sensing circuit 141 can alternatively determine that a touch exists for any capacitive sensing element in Area 5 if the tactile element is in the UP state and if DIFFCVxA5 is greater than FRDxA5 or FDDxA5. The capacitive sensing circuit 141 can also determine that a finger is resting on the tactile element if the tactile element is in the UP state and if DIFFCVxA5 is greater than FRDxA5 but less than FDDxA5. The capacitive sensing circuit 141 can further determine that a finger is pressing on the tactile element if the tactile element is in the UP state and if DIFFCVxA5 is greater than FDDxA5. If no touch is detected, the capacitive sensing circuit 141 can update the capacitive sensing element capacitance values stored in memory (CVxAy) with the latest capacitance values (NewCVxAy). For each capacitive sensing element in which a touch is detected, the capacitive sensing circuit 141 can calculate the X-Y location of the touch and save the location data in memory with the name TOUCH_x_y, wherein x and y are the X- and Y-coordinates of the touch, respectively. The range of x and y may be system dependent and defined by the size of the capacitive sensing circuit 141 and the touch resolution required.

In implementations that allow for a direct h/w connection to an interrupt pin on the host CPU, the capacitive sensing circuit 141 can include a digital output pin connected to the interrupt pin on the host CPU. On detection of a touch event or removal of a previously-reported touch, the capacitive sensing circuit 141 can set the output pin to the state needed by the host CPU to trigger an interrupt. The host CPU can then recognize the interrupt and read the updated touch data from the capacitive sensing circuit 141. The host CPU can further send a command to the capacitive sensing circuit 141 to re-start the capacitive sensing element scan process.

In implementations that do not allow for a direct connection to an interrupt pin on the host CPU, a software-based messaging protocol can be used between the host CPU and capacitive sensing circuit 141 to transfer the touch data from the capacitive sensing circuit 141 to the host CPU. This messaging protocol can allow the host CPU to start the capacitive sensing element scan process, wait for the scan to complete by reading the state of the scan from the capacitive sensing circuit 141, and retrieve any new touch data from the capacitive sensing circuit 141. However, any one of more of these methods or techniques can be implemented without interfering with the operation of the capacitive sensing circuit 141.

The foregoing techniques and methods can be implemented by the systems and methods to define and store finger thresholds useful for accurate and repeatable touch detection on the tactile surface. However, foregoing techniques and methods can be implemented by the systems and methods to define and store noise thresholds useful in filtering unwanted noise from electrode outputs and/or distinguishing noise from a potential touch on the tactile surface. The systems and methods can similarly implement data processing algorithms to compensate for finger or noise threshold drift, such as due to temperate changes or other environmental effects. The systems and methods can implement any one or more of auto-tuning, manual tuning, filtering (in hardware or software), compensation algorithms, qualification testing requirements, etc. to overcome noise in the sensing elements.

The foregoing systems and methods can interpolate the location of a touch on the tactile surface by triangulating, averaging, or calculating the centroid of capacitive sensing circuit 141 (e.g., sensor 140) outputs at multiple electrodes or sensing elements. The systems and methods can further implement any one or more of sampling filter (e.g., collecting and averaging data), integration filtering (e.g., adjusting time of measured capacitance), touch detection filtering (e.g., a finger threshold), coordinate filtering (e.g., averaging set of sequential touch coordinate values), or any other suitable filtering method or technique to identify and/or locate a touch on the tactile surface over the capacitive sensing circuit 141. The systems and methods can also adjust touch sensor sensitivity based on an impending, on-going, or recent touch on the tactile surface, and the systems and methods can further implement multiplexing to minimize the number of processor or CPU inputs necessary to read the electrode states of multiple rows or columns. However, the systems and methods can additionally or alternatively implement any other suitable elements, component, techniques, or methods to detect and locate a touch on a tactile surface.

In the foregoing implementations, systems and method can be configured to detect a finger or stylus that is not grounded. Furthermore, capacitive sensing elements can be arranged in other areas of the capacitive sensing circuit 141 or tactile touchscreen system. For example, capacitive sensing elements can be arranged within or form part of a liquid crystal display (LCD), such as the electronic drive lines between LCD pixels. Alternatively, capacitive sensing elements can be located adjacent the liquid crystal display opposite the tactile surface 111 or integrated into the display 150 system. The capacitive sensing elements can therefore implement in-cell, on-cell, hybrid, or any other suitable type of capacitive sensing.

Furthermore, the capacitive sensing elements can be 'pressed-capacitive' sensors that detect changes in capacitance when a distance between a set of electrodes changes due to a user input. The foregoing systems and methods (e.g., for projected capacitance sensors) can therefore be similarly applied to pressed capacitance sensors, wherein differences in the pressures transmitted through the tactile layer 110 with elevated buttons compared to retracted buttons can be associated with different types of user inputs. The foregoing systems and methods (e.g., for projected capacitance sensors) can be similarly applied to capacitive sensing elements that are resistive touch sensors, which rely on changes in distance between sensing layers to detect user inputs, or any other suitable type of resistive or capacitive touch sensor.

However, the capacitive sensing elements can alternatively be any other suitable type of touch sensor. For example, the capacitive sensing elements can be light-sensing sensors arranged within a pixel-based display incorporating a tactile surface. In this example, light-sensing capacitive sensing elements can detect a change in finger height on a tactile surface (e.g., for a resting finger and depressing finger) by monitoring reflected or transmitted light patterns on a light-sensing grid of the capacitive sensing elements. The capacitive sensing elements can alternatively include resistive touch sensor elements, electromagnetic sensing elements, surface acoustic wave touch sensors, optical touch sensors, or any other suitable type of touch sensor, and any of the foregoing systems and methods can be similarly applied to or adapted for any suitable type of capacitive sensing element or sensor.

8. First Method

Figure 31:
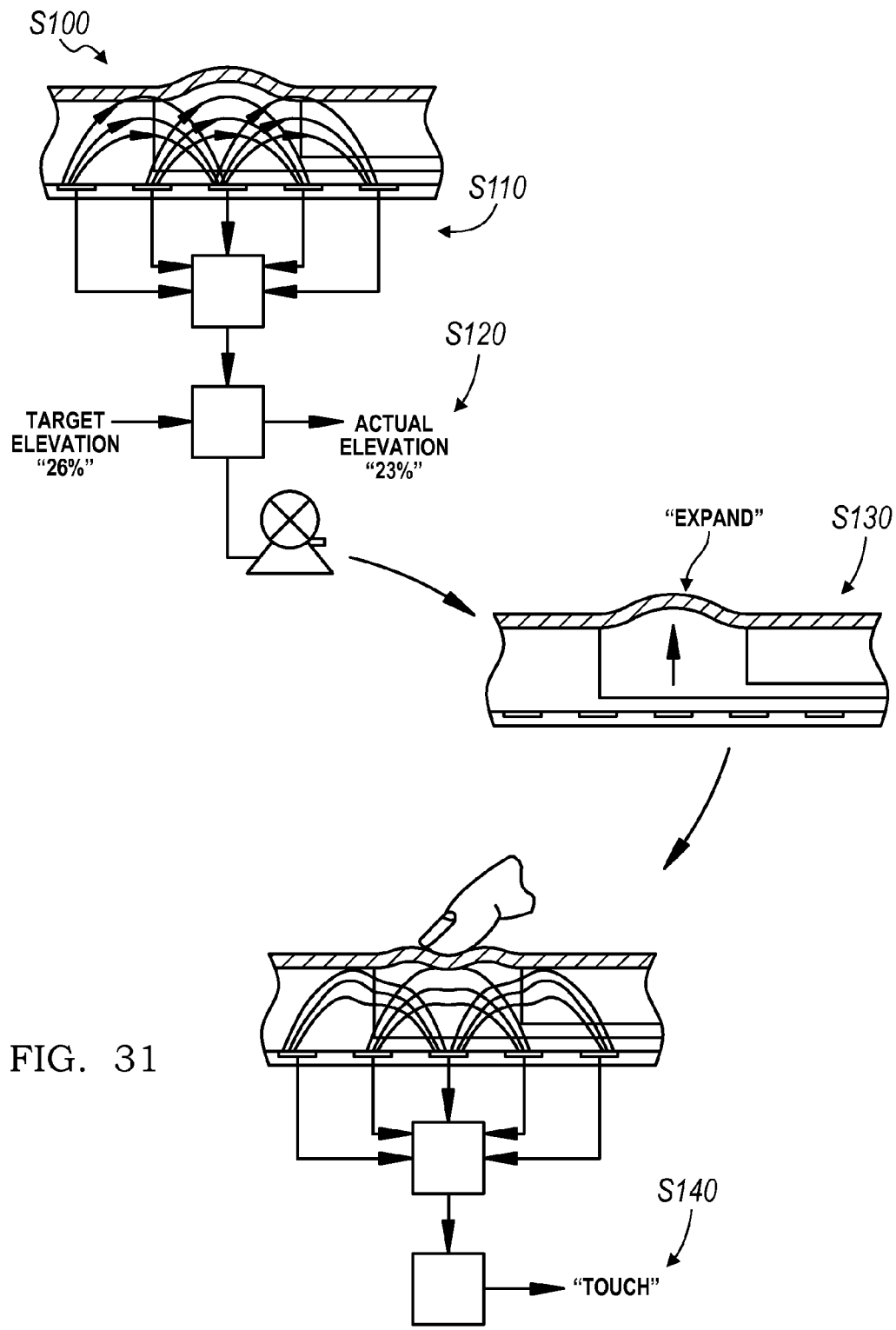
FIG. 31 is a flowchart representation of a method of one embodiment of the invention.
Figure 32:
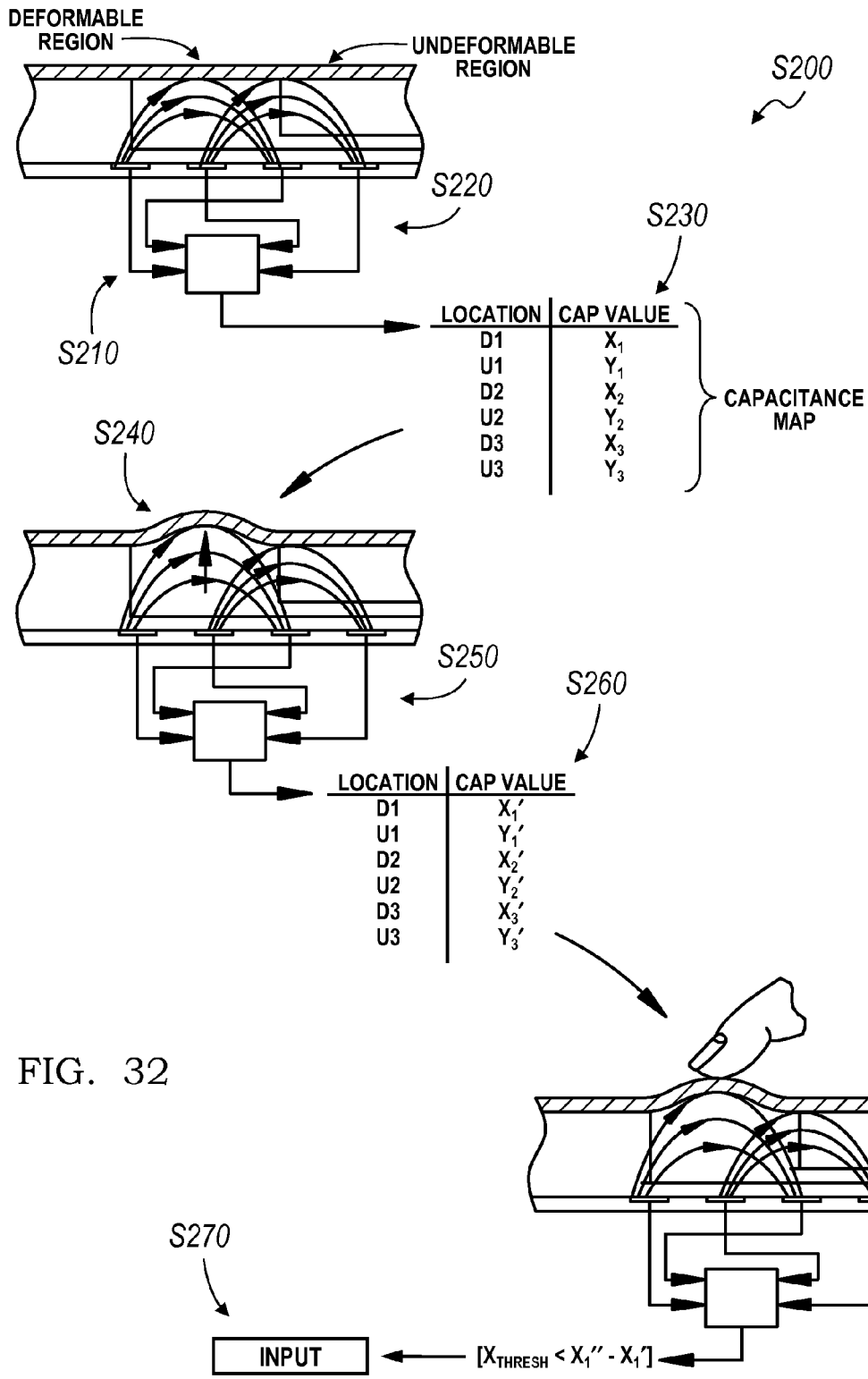
FIG. 32 is a flowchart representation of a method of one embodiment of the invention.

As shown in FIG. 31, a method S100 for controlling a dynamic tactile user interface (including a tactile layer and a substrate) includes: sensing a capacitance value across a portion of a cavity, the tactile layer defining a deformable region and a peripheral region, the peripheral region adjacent the deformable region and coupled to the substrate opposite the tactile surface, and the deformable region cooperating with the substrate to define the cavity in Block S110; estimating a vertical position of the tactile surface at the deformable region based on the sensed capacitance value across the portion of the cavity in Block S120; manipulating a fluid pressure within the cavity to modify a vertical position of the tactile surface at the deformable region according to a difference between the estimated vertical position of the tactile surface at the deformable region and a target vertical position of the tactile surface at the deformable region in Block S130; and sensing an input on the tactile surface at the deformable region based on a change in capacitance value measured across the portion of the cavity in Block S140.

Generally, method S100 functions to implement a closed feedback loop to control the height of a deformable region (i.e., tactile element) of a dynamic tactile user interface described above.

Block S110 of method S100 recites sensing a capacitance value across a portion of a cavity, the tactile layer defining a deformable region and a peripheral region, the peripheral region adjacent the deformable region and coupled to the substrate opposite the tactile surface, and the deformable region cooperating with the substrate to define the cavity. The tactile user interface, cavity, substrate, tactile layer, sensor, etc. can be any configuration or combination of configurations described above. For example, the sensor can include a first conductive pad electrically coupled to a longitudinal array of conductive pads patterned across the substrate and a second conductive pad electrically coupled to a lateral array of conductive pads patterned across the substrate, as described above. In this example, Block S110 can thus sense a capacitance value across the first conductive pad and the second conductive pad adjacent the cavity. Block S110 can also sense multiple capacitance values across various portions of the cavity (and/or tactile layer) simultaneously, such as via multiple sensor elements adjacent the cavity. However, Block S110 can sense one or more capacitance value across any one or more portions of the cavity in any other suitable way and through any other one or more sensor elements. As described above, Block S110 can also sense any one or more of a charge voltage, a charge current, a charge time, a discharge time, a transmit frequency, etc. across the cavity, such as a first conductive pad and a second conductive pad arranged on the substrate proximal the deformable region. However, Block S110 can sense one or more capacitance values across one or more portions of the cavity in any other suitable way.

Block S120 of method S100 recites estimating a vertical position of the tactile surface at the deformable region based on the sensed capacitance value across the portion of the cavity. Block S120 can implement any of the foregoing techniques or methods to correlate a capacitance value output from a sensor element with a vertical position of the deformable region. In one implementation, Block S120 estimates the vertical position of the tactile surface at the deformable region based on a comparison between the sensed capacitance value across the portion of the cavity and a stored capacitance map specifying vertical positions of the tactile surface of various deformable regions of the tactile layer. In this example, the capacitance map can be a static capacitance map, such as specific to a predicted position of various tactile elements of the tactile user interface, barometric pressure, and/or ambient temperature, etc., as described above. For example, Block S120 can estimate the vertical position of the tactile surface at the deformable region based on a capacitance map of an electric field distribution across a portion of the substrate. Therefore, Block S120 can also include selecting a capacitance map, from a set of capacitance maps, based on estimated vertical positions of a set deformable regions of the tactile layer, as described above.

Block S120 can also interface with a pressure sensor fluidly coupled to the cavity to verify or determine the vertical position of the deformable region. For example, Block S120 can verify the estimated vertical position of the tactile surface with a fluid pressure within the cavity, wherein the fluid pressure is correlated with a vertical position of the tactile surface at the deformable region. However, Block S120 can function in any other way to estimate the vertical position of the tactile surface at the deformable region.

Block S130 of method S100 recites manipulating a fluid pressure within the cavity to modify a vertical position of the tactile surface at the deformable region according to a difference between the estimated vertical position of the tactile surface at the deformable region and a target vertical position of the tactile surface at the deformable region. Generally, Block S130 interfaces with a displacement device, as described above, to adjust a height of the deformable region through manipulation of fluid pressure within the cavity. For example, as described above, Block S130 can control the displacement device that includes a pump to displace fluid through a fluid channel and into the cavity to expand the deformable region. Block S130 can therefore implement the estimated vertical position output by Block S120 to control the vertical position of the deformable region and thus achieve a particular tactile formation of a particular size and/or shape on the tactile surface.

In one implementation, Block S130 modifies the vertical position of the tactile surface at the deformable region to approximate the target vertical position that defines an expanded setting. As described above, the tactile surface at the deformable region is elevated above the tactile surface at the peripheral region in the expanded setting. Alternatively, Block S130 can control fluid pressure within the cavity to approximate a target vertical position that defines a percentage of expansion from 0% expanded (i.e., a fully-retracted setting) to 100% expanded (i.e., a fully-expanded setting). However, Block S130 can function in any other way to modify a vertical position of the tactile surface at the deformable region.

Block S130 can further adjust a drive voltage of across a portion of a capacitive touch sensor based on the estimated vertical position of the deformable region. In this implementation, the capacitive touch sensor can include a set of conductive pads patterned across the substrate and cooperating to sense capacitance values across portions of the tactile layer, and Block S130 can adjust a sensor drive voltage to tailor an electric field output by the capacitive touch sensor (i.e., a capacitive sensing element) and passing through the cavity based on a vertical position of the deformable region. For example, Block S130 can implement one or more techniques described above to modify a drive voltage, drive frequency, and/or refresh rate, etc. to tailor an output of a capacitive sensing element adjacent the cavity, thereby enabling detection of an input on the tactile surface 111 various deformable region positions. However, Block S130 can function in any other way to modify a function of a capacitive touch sensor adjacent the deformable region based on an estimated vertical position of the deformable region.

Blocks S110, S120, and S130 can also repeat cyclically to implement proportional (P), proportional-derivative (PD), proportional-integral-derivative (PID), or other closed-loop feedback control of the position of the deformable region (i.e., via the displacement device) respective of a current target vertical position of the deformable region, such as set by the host CPU described above.

Block S140 of method S100 recites sensing an input on the tactile surface at the deformable region based on a change in capacitance value measured across the portion of the cavity. Generally, Block S140 functions to correlate a change in a capacitance value measured across the portion of the cavity with an input on the tactile surface. In one implementation, Block S140 detects the input based on an output of a capacitive sensor coupled to the substrate and an expanded setting sensor input threshold specifying a minimum capacitive value change associated with an input on the deformable region in the expanded setting. For example, Block S140 can generate a current capacitance map based on most-recent outputs of sensing elements of the sensor, compare the most-recent capacitance map with a previous capacitance map, and identify inputs at particular regions associated with particular sensor elements based on differences between the capacitance maps that exceed a threshold capacitance value change. Block S140 can thus access a static threshold capacitance value change, a threshold capacitance value change specific to one or a subset of deformable regions, or a dynamic threshold capacitance value change (e.g., correlated with a position of one or more deformable regions) for one or more deformable regions.

Block S140 can also distinguish a touch on the tactile surface at the deformable region and an inward deformation of the deformable region based on a magnitude of the change in capacitance value measured across the portion of the cavity. For example, Block S140 can identify a soft input (e.g., an input that does not inwardly deform the deformable region) based on a change in threshold capacitance greater than a threshold soft input capacitance value change and less than a threshold hard input capacitance value change. Block S140 can also identify a hard input (e.g., an input that does inwardly deforms the deformable region) based on a change in threshold capacitance greater than the threshold hard input capacitance value change. However, Block S140 can function in any other way to sense an input on the tactile surface at the deformable region.

9. Second Method

As shown in FIG. 31, a method S200 for controlling a dynamic tactile interface (including a tactile layer and a substrate) includes: sensing a first capacitance value across a portion of a cavity in a retracted setting, the tactile layer defining a deformable region and a peripheral region in Block S210, the peripheral region adjacent the deformable region and coupled to the substrate opposite the tactile surface, the deformable region cooperating with the substrate to define the cavity; sensing a second capacitance value across the peripheral region in Block S220; generating a capacitance map according to the first capacitance and the second capacitance in Block S230; modifying a fluid pressure within the cavity to transition the cavity into an expanded setting in Block S240, the deformable region elevated above the peripheral region in the expanded setting; sensing a third capacitance value across the portion of the cavity in the expanded setting in Block S250; updating the capacitance map based on the third capacitance in Block S260; and detecting an input on the tactile surface at the deformable region based on a comparison between a sensed capacitance value across the portion of the cavity and the capacitance map in Block S270.

Generally, method S200 functions to implement capacitance maps to identify inputs on a tactile surface of a dynamic tactile user interface described above.

Block S210 of method S200 recites sensing a first capacitance value across a portion of a cavity in a retracted setting, wherein the tactile layer defines a deformable region and a peripheral region, the peripheral region is adjacent the deformable region and coupled to the substrate opposite the tactile surface, and the deformable region cooperates with the substrate to define the cavity. Generally, Block S210 functions to collect an output from a sensing element adjacent or proximal the deformable region of the tactile layer, as described above. For example, Block S210 can detect a change in a capacitive decay time (or rate) between two conductive pads of a capacitive sensing element. As described above, the conductive pads of the capacitive sensing element can be capacitively coupled and driven to a peak drive voltage, and Block S210 can sense the capacitive decay time from a first percentage of the peak drive voltage to a second (lower) percentage of the peak drive voltage. In this example, Block S210 can thus sense the first capacitance value that includes a magnitude of disruption in a changing electric field across the portion of the cavity. However, Block S210 can function in any other way to sense the first capacitance value across the portion of a cavity in the retracted setting.

Block S220 of method S200 recites sensing a second capacitance value across the peripheral region. Generally, Block S220 can implement techniques similar to those of Block S210 to sense a capacitance value across one or more portions of the peripheral region. However, Block S220 can function in any other way to sense a capacitance value across the peripheral region.

Block S230 of method S200 recites generating a capacitance map according to the first capacitance and the second capacitance. Generally, Block S230 functions to output a capacitance map including capacitance values measured across the deformable region and the peripheral region, as described above. Block S230 can aggregate any number of capacitance values output by any number of sensing elements at substantially the same time to create the capacitance map that defines an image of capacitive coupling between conductive pads of the sensor at a particular time.

In one implementation, Block S230 maps capacitive discharge times across a first set of electrically-coupled conductive pads in a longitudinal array and a second set of electrically-coupled conductive pads in a lateral array patterned across the substrate, wherein the first capacitance value includes a capacitive discharge time between a first conductive pad in the first array and a first conductive pad in the second array proximal the cavity, and the second capacitance value includes a capacitive discharge time between a second conductive pad in the first array and a second conductive pad in the second array proximal the peripheral region, as described above. However, Block S230 can function in any other way to generate the capacitance map.

Block S240 of method S200 recites modifying a fluid pressure within the cavity to transition the cavity into an expanded setting, the deformable region elevated above the peripheral region in the expanded setting. Generally, Block S240 can implement techniques of Block S130 of method S100 and/or any other foregoing or other technique to control a vertical position of the deformable region of the tactile layer. For example, Block S240 can control a displacement device to displace fluid from a reservoir, through a fluid channel, and into the cavity to transition the deformable region from a retracted setting to an expanded setting. However, Block S240 can function in any other way to transition the cavity into an expanded setting.

Block S240 can further modify a drive voltage across the first conductive pad in the first array and the first conductive pad in the second array proximal the cavity in response to transitioning the cavity into the expanded setting. Generally, Block S240 can function like Block S130 described above, though Block S240 can function in any other way to tune or modify a function of one or more capacitive sensing elements of the sensor.

Block S250 of method S200 recites sensing a third capacitance value across the portion of the cavity in the expanded setting. Generally, Block S250 functions to implement one or more techniques described above to detect a capacitance value of a portion of the cavity when the deformable region is in the expanded setting and thus elevated over the peripheral region. Block S250 can further implement a closed feedback loop to control fluid pressure within the cavity based on a height of the tactile surface at the deformable region, wherein the height of the tactile surface at the deformable region is correlated with a capacitance value measured across the portion of the cavity, as described above. However, Block S250 can function in any other way to sense the third capacitance value across the portion of the cavity in the expanded setting.

Block S260 of method S200 recites updating the capacitance map based on the third capacitance. Generally, Block S260 functions to generate a new or modified capacitance map based on a most-current sensor output, such as capacitance values captured substantially simultaneously from various capacitive sensing elements patterned across the substrate. For example, Block S260 can update the capacitance map based on a capacitance value pertaining to both the deformable region and the peripheral region when the deformable region is in the expanded setting, and Block S260 can further update the capacitance map based on a capacitance value pertaining to a set of additional peripheral regions defined by the tactile layer and cavities defined by the substrate. However, Block S260 can function in any other way to update the capacitance map based on one or more recently-sensed capacitance values.

Block S270 of method S200 recites detecting an input on the tactile surface at the deformable region based on a comparison between a sensed capacitance value measured across the portion of the cavity and the capacitance map. Generally, Block S270 functions to implement multiple (e.g., sequential) capacitance maps to identify a change in a capacitance value measured across a portion of the tactile surface and to correlate the change in the capacitance value with an input on the tactile surface proximal the portion of the tactile surface. Block S270 can therefore implement one or more techniques described above to detect an input on the tactile surface.

Block S270 can detect any one or more of a location, magnitude, and/or rate of the input on the tactile surface at the deformable region in the expanded setting. In one implementation, Block S270 calculates a centroid of outputs of a set of capacitive sensing elements adjacent the cavity to determine a location of the input. In this implementation, the sensor can thus include multiple capacitive sensing elements proximal the deformable region. In one example, Block S270 identifies input contact points on the tactile surface based on sensed capacitance values across multiple portions of the cavity, identifies a centroid of the contact points, and detects the input on the tactile surface at the deformable region based on a comparison between the centroid of the contact points and input areas on the tactile surface of known location proximal the deformable region, wherein each input area defines an input confidence interval. As described above, Block S270 can thus apply confidence levels for inputs within one region or spanning multiple regions on the tactile surface, wherein the confidence level of each region can be based on a relative location to a predicted input area or input center.

Additionally or alternatively, Block S270 can detect the input on the tactile surface at the deformable region based on identified centroids of contact points within a particular input area on the tactile surface for a period of time greater than a threshold period of time, wherein the threshold period of time is based on an input confidence interval associated with the particular input area. Block S270 can also calculate a velocity of the input based on a time-dependent change in the sensed capacitance value across the portion of the cavity. In this implementation, Block S270 can further associate a device command with the velocity of the input. For example, Block S270 can correlate a velocity of the input with a magnitude change in volume output or a scroll speed.

Block S270 can further predict an input mode (e.g., finger, stylus), select an input model based on the predicted input mode, and detect the input on the tactile surface at the deformable region based on an output of the input model corresponding to a difference between the sensed capacitance value across the portion of the cavity and the capacitance map, as described above. For example, Block S270 can predict the input mode that is one of a finger input and a stylus input and can select the input model corresponding to the input mode and a current vertical position of the deformable region and of a second deformable region defined by the tactile layer. However, Block S270 can function in any other way to detect an input on the tactile surface at the deformable region.

The systems and methods of the embodiments can be embodied and/or implemented at least in part as a machine configured to receive a computer-readable medium storing computer-readable instructions. The instructions can be executed by computer-executable components integrated with the system, the optical sensor, the processor, the display, hardware/firmware/software elements of a system or handheld electronic device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention defined in the following claims.

We claim:

1. A user interface, comprising:
a substrate;
a continuous tactile layer comprising: a peripheral region coupled to the substrate, a deformable region operable between a retracted position and a deformed position, and a tactile surface extending across the deformable region, wherein the tactile surface is flush with the peripheral region in the retracted position and is offset from the peripheral region in the deformed position;
a deformation device configured to transition the deformable region between the retracted position and the deformed position;
a sensor comprising a set of conductive elements; and
a processor configured to measure a capacitance value of the set of conductive elements and identify a touch event on the tactile surface in response to a change in the capacitance value measured by the sensor, wherein:
the sensor comprises a first and second conductive element, wherein the processor is configured to measure a capacitance between the first and second conductive elements,
the first conductive element comprises a flexible electrode connected to the deformable region of the tactile layer, and
the processor stores a capacitance map for the set of conductive elements, the capacitance map comprising a sensor setting for each of a plurality of deformable region positions between the retracted and deformed positions.

2. The user interface of claim 1, wherein the first conductive element is arranged perpendicular and offset from the second conductive element.

3. The user interface of claim 2, wherein the first conductive element is one of a first plurality of conductive elements, and the second conductive element is one of a second plurality of conductive elements separate from the first set, wherein the first and second pluralities of conductive elements are substantially uniformly distributed relative to the tactile layer.

4. The user interface of claim 1, wherein the first and second conductive elements are coplanar.

5. The user interface of claim 1, wherein the deformable region comprises an elastic material.

6. The user interface of claim 5, wherein the elastic material comprises an elastomer.

7. The user interface of claim 1, further comprising a volume of fluid, wherein:
the deformable region of the tactile layer cooperatively defines a cavity with the substrate;
the volume of fluid is arranged within the cavity; and
the displacement device is configured to manipulate the volume of fluid to transition the deformable region between the retracted position and deformed position.

8. The user interface of claim 1, further comprising a display coupled to the substrate opposing the tactile layer, the display configured to display an input graphic substantially aligned with the deformable region, wherein the processor comprises a touchscreen processing unit configured to detect inputs on the tactile surface, a tactile processing unit configured to control the displacement device, and a host processing unit configured to implement a command according to inputs detected by the tactile processing unit.

9. A method of dynamic tactile user interface control, the dynamic tactile user interface including a continuous tactile layer coupled to a substrate, the tactile layer defining a static peripheral region and a deformable region operable between an expanded and retracted position, and a set of electrodes associated with the deformable region, the method comprising:
determining a height of the deformable region based on the measured capacitance value and a predetermined baseline capacitance value for the deformable region;
measuring a capacitance value of the set of electrodes;
measuring a change in the capacitance value of the set of electrodes; and
detecting a touch event based on the change in the capacitance value and the height of the deformable region.

10. The method of claim 9, wherein the set of electrodes comprises an electrode pair, wherein measuring the capacitance value for the electrodes comprises measuring a capacitance value between an electrode pair.

11. The method of claim 10, wherein measuring the capacitance value of the electrode pair comprises measuring at least one of a charge voltage, charge current, a charge time, a discharge time, and a transmit frequency between a first and second electrode of the electrode pair.

12. The method of claim 10, wherein measuring a capacitance value of the electrodes comprises applying a first voltage across the electrodes in response to determination of a first deformable region height, and applying a second voltage across the electrodes in response to determination of a second deformable region height.

13. The method of claim 9, further comprising: distinguishing between button deformation and finger proximity based on the change in capacitance value.

14. The method of claim 9, wherein detecting the touch event further comprises:
classifying the touch event as a first touch type in response to the change in capacitance value comprising a first capacitance value change, based on a capacitance map for the deformable region height stored by the dynamic tactile user interface; and
classifying the touch event as a second touch type in response to the change in capacitance value comprising a second capacitance value change different from the first capacitance value change, based on the capacitance map for the deformable region height.

15. The method of claim 9, further comprising:
classifying the touch event as a first touch type in response to the change in capacitance value comprising a first capacitance value change;
controlling the deformable region to deform to a second height, different from the determined height;
detecting a second touch event in response to measurement of a second change in the capacitance value of the set of electrodes; and
classifying the second touch event as a second touch type, different from the first touch type, in response to the change in capacitance value comprising the first capacitance value change.

16. The method of claim 15, wherein the deformable region and the substrate cooperatively define a fluid-filled cavity therebetween, wherein controlling the deformable region to deform to a second height comprises manipulating a pressure of the fluid within the cavity.

\* \* \* \* \*